US010807635B2

(12) United States Patent
Takase et al.

(10) Patent No.: US 10,807,635 B2
(45) Date of Patent: Oct. 20, 2020

(54) ELECTRIC POWER STEERING APPARATUS

(71) Applicant: NSK LTD., Tokyo (JP)

(72) Inventors: Hiroaki Takase, Tokyo (JP); Ryo Minaki, Tokyo (JP); Hideki Sawada, Tokyo (JP); Takayoshi Sugawara, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/479,254

(22) PCT Filed: Feb. 13, 2018

(86) PCT No.: PCT/JP2018/004928
§ 371 (c)(1),
(2) Date: Jul. 19, 2019

(87) PCT Pub. No.: WO2018/147465
PCT Pub. Date: Aug. 16, 2018

(65) Prior Publication Data
US 2019/0375449 A1 Dec. 12, 2019

(30) Foreign Application Priority Data

Feb. 13, 2017 (JP) .................. 2017-024164
Dec. 26, 2017 (JP) .................. 2017-250197
Feb. 9, 2018 (JP) .................. 2018-021736

(51) Int. Cl.
B62D 5/00 (2006.01)
B62D 5/04 (2006.01)
(Continued)

(52) U.S. Cl.
CPC ......... B62D 5/0463 (2013.01); B62D 5/0496 (2013.01); H02M 1/38 (2013.01);
(Continued)

(58) Field of Classification Search
CPC .... B62D 5/0463; B62D 5/0496; B62D 5/046; H02P 21/22; H02P 29/66; H02P 21/06;
(Continued)

(56) References Cited

U.S. PATENT DOCUMENTS

2013/0013154 A1* 1/2013 Aoki .................... B62D 5/0481
701/42
2016/0068066 A1 3/2016 Kinomura et al.

FOREIGN PATENT DOCUMENTS

JP 05-103473 A 4/1993
JP 2006-320122 A 11/2006
(Continued)

OTHER PUBLICATIONS

Written Opinion for PCT/JP2018/004928, dated May 22, 2018.
International Search Report for PCT/JP2018/004928, dated May 22, 2018.

Primary Examiner — Ian Jen
(74) Attorney, Agent, or Firm — Sughrue Mion, PLLC

(57) ABSTRACT

An electric power steering apparatus of a vector control system that drives and controls a motor by an inverter and applies an assist torque to a steering system of a vehicle, including the first compensation function to perform a dead time (DT) compensation based on respective phase motor terminal voltages and respective phase duty command values, the second compensation function to perform a DT compensation based on steering assist command values, the third compensation function to perform the DT compensation based on dq-axis current command values, and a temperature detecting section to detect temperature of ECU, wherein the correction of the DT compensation is performed based on the temperature, wherein switches of the compensation functions are performed by using a conditional branch due to software and a gradual-changing switch, wherein the dq-axis DT compensation values after the conditional (Continued)

branch and the gradual-changing switch are performed are calculated, and wherein the dq-axis voltage command values are compensated by the dq-axis DT compensation values.

16 Claims, 38 Drawing Sheets

(51) Int. Cl.
*H02P 21/22* (2016.01)
*H02P 29/66* (2016.01)
*H02M 1/38* (2007.01)
*H02P 21/06* (2016.01)
*H02P 27/08* (2006.01)

(52) U.S. Cl.
CPC .............. *H02P 21/06* (2013.01); *H02P 21/22* (2016.02); *H02P 27/08* (2013.01); *H02P 29/66* (2016.02); *B60L 2240/12* (2013.01); *B60L 2240/423* (2013.01); *H02M 2001/385* (2013.01)

(58) Field of Classification Search
CPC .......... H02P 27/08; H02P 21/05; H02M 1/38; H02M 2001/385; B60L 2240/12; B60L 2240/423

See application file for complete search history.

(56) References Cited

FOREIGN PATENT DOCUMENTS

| | | |
|---|---|---|
| JP | 4681453 B2 | 5/2011 |
| JP | 2014-212612 A | 11/2014 |
| JP | 2015-171251 A | 9/2015 |

* cited by examiner

PRIOR ART

PRIOR ART

FIG.15A
FIG.15B
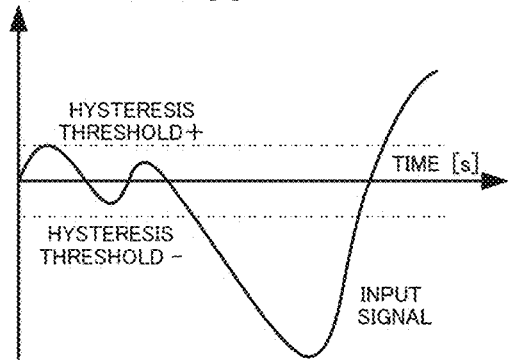
FIG.16
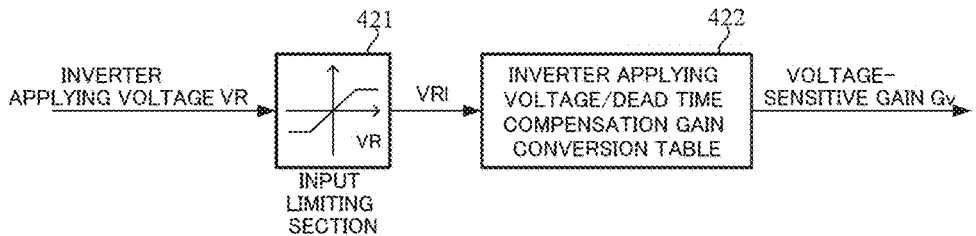
FIG.17
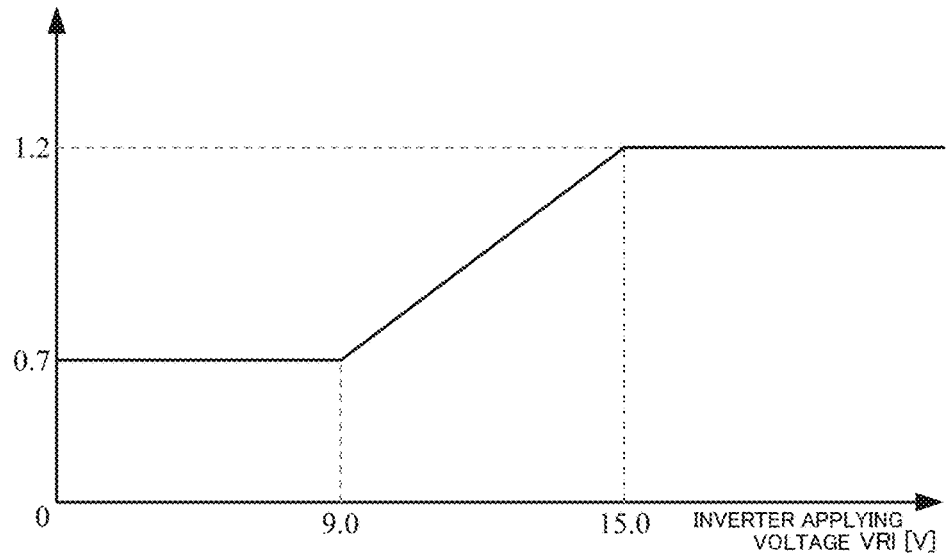

GRADUAL-CHANGING RATIO
CHARACTERISTIC
CONVERTING SECTION

FIG.52A
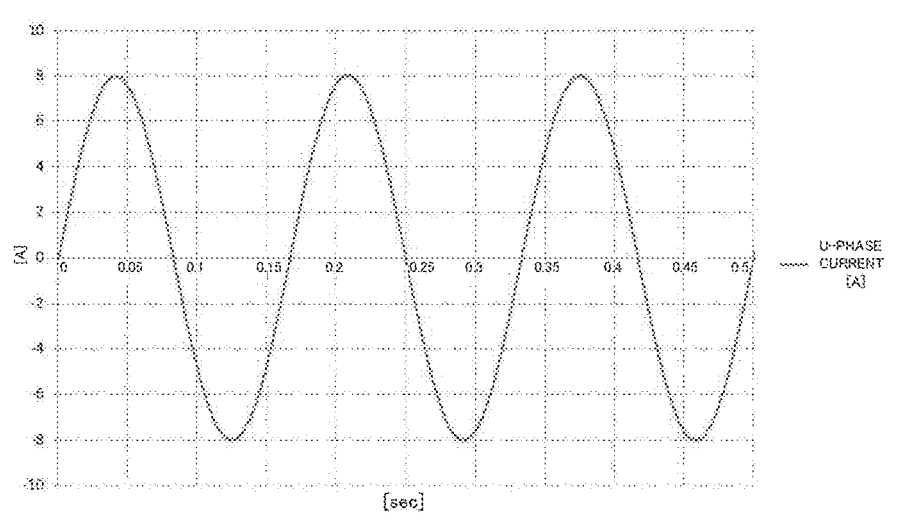
+20°C U-PHASE CURRENT WAVEFORM (WITHOUT TEMPERATURE CORRECTION)
FIG.52B +20°C q-AXIS CURRENT WAVEFORM (WITHOUT TEMPERATURE CORRECTION)
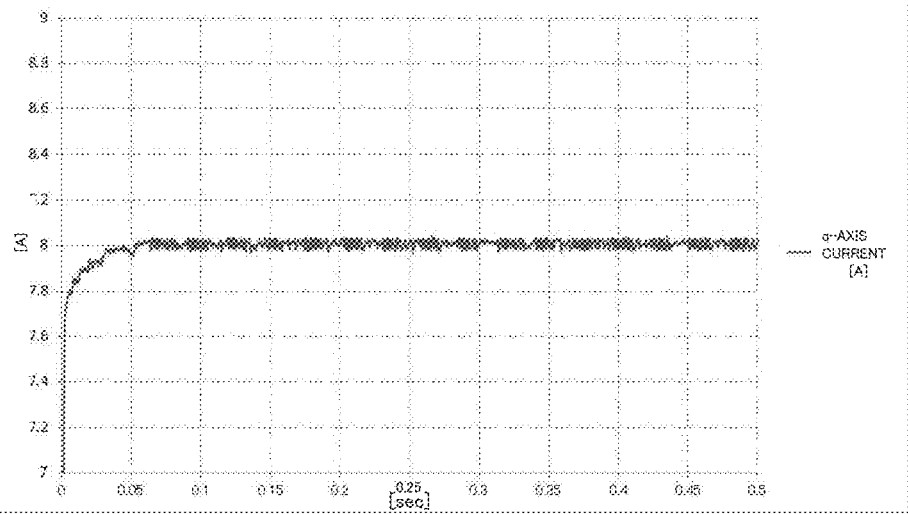
FIG.52C +20°C d-AXIS CURRENT WAVEFORM (WITHOUT TEMPERATURE CORRENTION)
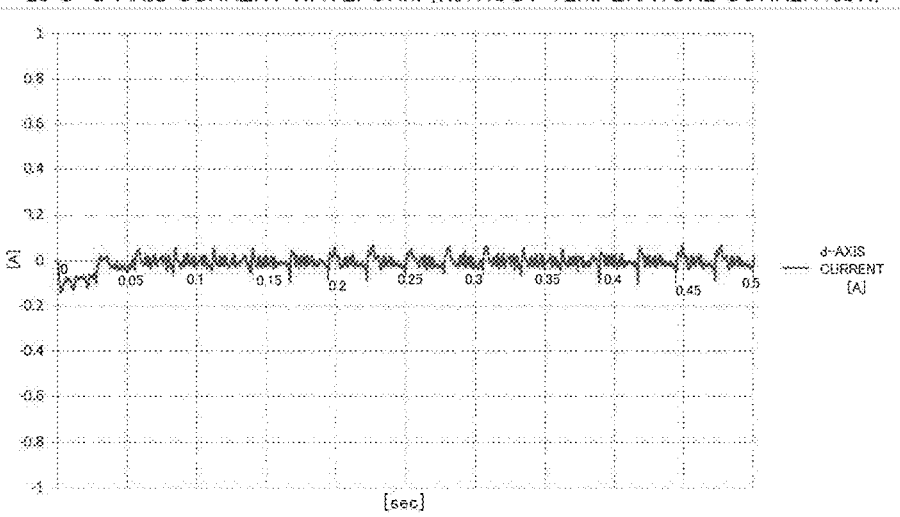

ELECTRIC POWER STEERING APPARATUS

This application is a National Stage of International Application No. PCT/JP2018/004928 filed Feb. 13, 2018, claiming priorities based on Japanese Patent Application Nos. 2017-024164 filed Feb. 13, 2017, 2017-250197 filed Dec. 26, 2017 and 2018-021736 filed Feb. 9, 2018.

TECHNICAL FIELD

The present invention relates to an electric power steering apparatus that vector-controls a driving of a three-phase brushless motor with a dq-axis rotational coordinate system, switches plural dead time compensation values depending on predetermined conditions and corrects (correction of the dead time compensation values by an instantaneous conditional branch due to software and gradual-changing switch which gradually switches the dead time compensation values), improves a steering performance and enables to smoothly assist-control without a steering sound. The present invention also relates to a high performance electric power steering apparatus considering a temperature compensation.

BACKGROUND ART

An electric power steering apparatus (EPS) which provides a steering system of a vehicle with a steering assist torque (an assist torque) by a rotational torque of a motor, applies the steering assist torque to a steering shaft or a rack shaft by means of a transmission mechanism such as gears or a belt by using a driving force of the motor as an actuator. In order to accurately generate the steering assist torque, such a conventional electric power steering apparatus performs a feed-back control of a motor current. The feed-back control adjusts a voltage supplied to the motor so that a difference between a steering assist command value (a current command value) and a detected motor current value becomes small, and the adjustment of the voltage supplied to the motor is generally performed by an adjustment of duty command values of a pulse width modulation (PWM) control.

A general configuration of the conventional electric power steering apparatus will be described with reference to FIG. 1. As shown in FIG. 1, a column shaft (a steering shaft or a handle shaft) 2 connected to a handle (a steering wheel) 1 is connected to steered wheels 8L and 8R through reduction gears 3, universal joints 4a and 4b, a pinion-and-rack mechanism 5, and tie rods 6a and 6b, further via hub units 7a and 7b. In addition, the steering shaft 2 is provided with a steering angle sensor 14 for detecting a steering angle θ and a torque sensor 10 for detecting a steering torque Th of the handle 1, and a motor 20 for assisting the steering torque of the handle 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist command (a steering assist command) based on the steering torque Th detected by the torque sensor 10 and a vehicle speed Vs detected by a vehicle speed sensor 12, and controls a current supplied to the motor 20 by means of a voltage control command value Vref obtained by performing compensation or the like to the calculated current command value. A steering angle sensor 14 is not indispensable and may not be provided. It is possible to obtain the steering angle (a motor rotational angle) θ from a rotational position sensor such as a resolver which is connected to the motor 20.

A controller area network (CAN) 40 to send/receive various information and signals on the vehicle is connected to the control unit 30, and it is also possible to receive the vehicle speed Vs from the CAN 40. Further, a Non-CAN 41 is also possible to connect to the control unit 30, and the Non-CAN 41 sends and receives a communication, analogue/digital signals, electric wave or the like except for the CAN 40.

In such an electric power steering apparatus, the control unit 30 mainly comprises a central processing unit (CPU) (including a micro processor unit (MPU), a micro controller unit (MCU) and so on), and general functions performed by programs within the CPU are, for example, shown in FIG. 2.

Functions and operations of the control unit 30 will be described with reference to FIG. 2. The steering torque Th from the torque sensor 10 and the vehicle speed Vs from the vehicle speed sensor 12 are inputted into a steering assist command value calculating section 31. The steering assist command value calculating section 31 calculates a steering assist command value Iref1 based on the steering torque Th and the vehicle speed Vs using an assist map or the like. The calculated steering assist command value Iref1 is added with a compensation signal CM for improving characteristics from a compensating section 34 at an adding section 32A. The steering assist command value Iref2 after the addition is limited to the maximum value thereof at a current limiting section 33. The current command value Irefm limited the maximum value is inputted into a subtracting section 32B, whereat a detected motor current value Im is subtracted from the current command value Irefm.

The subtracted result ΔI (=Irefm−Im) in the subtracting section 32B is current-controlled such as a proportional integral (PI) at a PI-control section 35. The voltage control command value Vref obtained by the current-control, and a modulation signal (a triangle wave carrier) CF are inputted into a PWM-control section 36, whereat a duty command value thereof is calculated. The motor 20 is PWM-driven by an inverter 37 with a PWM signal calculated the duty command value. The motor current value Im of the motor 20 is detected by a motor current detector 38 and is inputted into the subtracting section 32B for the feed-back.

The compensating section 34 adds a self-aligning torque (SAT) detected or estimated and an inertia compensation value 342 at an adding section 344. The added result is further added with a convergence control value 341 at an adding section 345. The added result is inputted into the adding section 32A as the compensation signal CM, thereby to improve the control characteristics.

Recently, a three-phase brushless motor is mainly used as an actuator of the electric power steering apparatus, and since the electric power steering apparatus is automotive products, the operating temperature range is wide. From a view point of a fail-safe, a dead time of the inverter to drive the motor needs greater than that for general industrial purposes that home appliances (industrial equipment<EPS). Generally, since a switching device (for example, a field-effect transistor (FET)) has a delay time when it is turned-OFF, a direct current link is shorted when the switching devices of an upper-arm and a lower-arm are simultaneously turned-ON or turned-OFF. In order to prevent the above problem, a time (a dead time) that the switching devices of both arms are turned-OFF, is set.

As a result, a current waveform is distorted, and a responsibility of the current control and a steering feeling are badly affected. For example, in a state that the handle is near on-center of the steering, a discontinuous steering feeling and the like due to the torque ripple are occurred. Further, since the back-EMF (electromotive force) of the motor in a middle speed steering or a high speed steering, and the interference voltage between the windings operate as the disturbance against the current control, the steering follow-up performance and the steering feeling in turn-back steering are badly affected.

A q-axis to control the torque being the coordinate axis of a rotor of the three-phase brushless motor and a d-axis to control the magnetic field strength are independently set and have a relation that the d-axis and the q-axis is 90°. In this connection, a vector control system to control the currents (the d-axis current command value and the q-axis current command value) corresponding to respective axes with a vector, is known.

FIG. 3 shows a configuration example in a case that a three-phase brushless motor 100 is driven and is controlled by the vector control system. A steering assist command values (Iref2 (idref and iqref)) of two-axes (the dq-axis coordinate system) are calculated based on the steering torque Th, the vehicle speed Vs and so on. A d-axis current command value $i_d^*$ and a q-axis current command value $i_q^*$ of the two-axes whose maximum values are limited are respectively inputted into subtracting sections 131d and 131q, and current deviations $\Delta i_d^*$ and $\Delta i_q^*$ obtained in the subtracting sections 131d and 131q are respectively inputted into PI-control sections 120d and 120q. Voltage command values $v_d$ and $v_q$ PI-controlled at the PI-control sections 120d and 120q are respectively inputted into a subtracting section 141d and an adding section 141q, and command voltages $\Delta v_d$ and $\Delta v_q$ obtained at the subtracting section 141d and the adding section 141q are inputted into a dq-axes/three-phase alternating current (AC) converting section 150. Voltage command values $V_u^*$, $V_v^*$ and $V_w^*$ converted into three-phases at the dq-axes/three-phase AC converting section 150 are inputted into a PWM-control section 160, and the motor 100 is driven with PWM-signals $U_{PWN}$, $V_{PWN}$, $W_{PWN}$ based on calculated three-phase duty command values ($Duty_u$, $Duty_v$, $Duty_w$) via the inverter (an inverter applying voltage VR) 161 constituted by a bridge configuration of an upper-arm and a lower-arm as shown in FIG. 4. The upper-arm comprises FETs Q1, Q3, Q5 serving as switching devices and the lower-arm comprises FETs Q2, Q4, Q6.

Three-phase motor currents $i_u$, $i_v$ and $i_w$ of the motor 100 are detected by current detectors 162, and the detected three-phase motor currents $i_u$, $i_d$ and $i_w$ are inputted into the three-phase AC/dq-axes converting section 130. The two-phase feedback current $i_d$ and $i_q$ that are converted at the three-phase AC/dq-axes converting section 130 are respectively subtraction-inputted into subtracting sections 131d and 131q, and further are inputted into a d-q non-interference control section 140. Further, a rotational sensor or the like is attached to the motor 100, and a motor rotational angle θ and a motor rotational velocity (a motor rotational number) ω are outputted from an angle detecting section 110 to process the sensor signal. The motor rotational angle θ is inputted into the dq-axes/three-phase AC converting section 150 and the three-phase AC/dq-axes converting section 130, and the motor rotational velocity ω is inputted into the d-q non-interference control section 140. Two-phase voltages $v_{d1}^*$ and $v_{q1}^*$ from the d-q non-interference control section 140 are respectively inputted into the subtracting section 141d and the adding section 141q, and the command volt-ages $\Delta v_d$ and $\Delta v_q$ are calculated at the subtracting section 141d and the adding section 141q.

The electric power steering apparatus of the vector control system described above is an apparatus to assist a steering of a driver, and a sound and a vibration of the motor, a torque ripple and the like are transmitted to the driver as a force sense via the handle. The FETs are generally used as the power devices to drive the inverter, and the current is applied to the motor. In a case that the three-phase motor is used, FETs, which are connected in series for respective phases, of the upper-arm and the lower-arm are used as shown in FIG. 4. Although the FETs of the upper-arm and the lower-arm are alternatively turned-ON and turned-OFF, the FET does not simultaneously turn-ON and turn-OFF in accordance with a gate signal since the FET is not an ideal switching device. Therefore, a turn-ON time and a turn-OFF time are needed. Consequently, if an ON-command for the upper-arm FET and an OFF-command for the lower-arm FET are simultaneously inputted, there is a problem that the upper-arm FET and the lower-arm FET simultaneously turn-ON and the upper-arm and the lower-arm become short circuits. There is a difference between the turn-ON time and the turn-OFF time of the FET. Thus, when the command is inputted into the FETs at the same time, the FET immediately turns-ON in a case that the turn-ON time is short (for example, 100 [ns]) by inputting the ON-command to the upper-FET, and reversely, the FET does not immediately turn-OFF in a case that the turn-OFF time is long (for example, 400 [ns]) by inputting the OFF-command to the lower-FET. In this way, a state (for example, between 400 [ns]-100 [ns], "ON"-"ON") that the upper-FET is "ON" and the lower FET is "ON", often momentarily occurs.

In this connection, in order that the upper-arm FET and the lower-arm FET do not simultaneously turn-ON, the ON-signal is usually given to the gate driving circuit with a predetermined period being a dead time. Since the dead time is nonlinear, the current waveform is distorted, the response of the control is badly affected and the sound, the vibration and the torque ripple are generated. In a column type electric power steering apparatus, since an arrangement of the motor directly connected to a gear box which is connected by the handle and the column shaft made of steel is extremely near the driver in the mechanism, it is necessary to especially consider the sound, the vibration, the torque ripple and the like due to the motor in comparison with a downstream type electric power steering apparatus.

Conventionally, as a method to compensate the dead time of the inverter, there are methods to add the compensation value to the dead time by detecting a timing occurring the dead time and to compensate the dead time by a disturbance observer on the dq-axes in the current control.

The electric power steering apparatus to compensate the dead time is disclosed in, for example, Japanese Patent No. 4681453 B2 (Patent Document 1) and Japanese Unexamined Patent Publication No. 2015-171251 A (Patent Document 2). In Patent Document 1, there is provided a dead band compensating circuit that generates a model current based on the current command values by inputting the current command values into a reference model circuit of the current control loop including the motor and the inverter, and compensates the influence of the dead time of the inverter based on the model current. Further, in Patent Document 2, there is provided a dead time compensating sect ion to correct based on the dead time compensation value for the duty command value, and the dead time compensating section comprises a basic compensation value calculating section to calculate a basic compensation value being a basic value of the dead time compensation value based on the current command value and a filtering section to perform a filtering-process corresponding to a low pass filter (LPF) for the basic compensation value.

THE LIST OF PRIOR ART DOCUMENTS

Patent Documents

Patent Document 1: Japanese Patent No. 4681453 B2
Patent Document 2: Japanese Unexamined Patent Publication No. 2015-171251 A

SUMMARY OF THE INVENTION

Problems to be Solved by the Invention

The apparatus disclosed in Patent Document 1 is a system that estimates the compensation sign by using a calculation of the dead time compensation amount due to the q-axis current command value and the three-phase current reference model. The output value of the compensating circuit is a changing value in proportion to the model current in a region being a predetermined fixed value or less, and is an addition value of the changing values in proportion to the fixed value and the model current in a region being the predetermined fixed value or more. In this way, the output value of the compensating circuit is outputted from the current command to the voltage command. However, the tuning operation for determining the hysteresis characteristic to output the predetermined fixed value is necessary.

In the apparatus disclosed in Patent Document 2, when the dead time compensation value is determined, the dead time compensation is performed by using the q-axis current command value and the compensation value LPF-processed the q-axis current command value. Thus, the delay occurs due to the LPF-process, and there is a problem that the dead time compensation value is not operated for the final voltage command to the motor.

Further, there is a case that the plural dead time compensation functions are switched in specific regions for improving the steering performance. For example, in the low load state and the low-speed steering state, when the dead time compensation functions are switched by using the switch, since the compensation values are changed in a step shape or discontinuously from the differences among the compensation values of the respective functions, the torque ripple can be occurred. In the high-speed steering state, when the dead time compensation functions are switched by the gradual-changing, the phase of the compensation values can be deviated during the period of the gradual-changing switch. In a case that the dead time compensation having a single function is compensated in a whole region, the compensation accuracy becomes worse in the specific region, and then the torque ripple, the sound and the vibration can be occurred.

The present invention has been developed in view of the above-described circumstances, and an object of the present invention is to provide the electric power steering apparatus of the vector control system that has the plural dead time compensation functions to compensate the dead time of the inverter, compensates the dead time by switching the dead time compensation functions depending on the steering state and the functions, improves the distortion of the current waveform and the responsibility of the current control, and suppresses the sound and the vibration of the motor, and the torque ripple. Another object of the present invention is to provide the high performance electric power steering apparatus that performs the correction depending on the temperature of the control unit (the ECU, the inverter and the like), and enables to accurately perform the dead time compensation.

Means for Solving the Problems

The present invention relates to an electric power steering apparatus of a vector control system that calculates dq-axis steering assist command values based on at least a steering torque, calculates dq-axis current command values from the dq-axis steering assist command values, converts dq-axis voltage command values calculated from the dq-axis current command values into duty command values of three phases, drives and controls a three-phase brushless motor by an inverter of a pulse width modulation (PWM) control, and applies an assist torque to a steering system of a vehicle, the above-described object of the present invention is achieved by that: comprising a first compensation function to perform a dead time compensation "A" based on respective phase motor terminal voltages and the duty command values, a second compensation function to perform a dead time compensation "B" based on the dq-axis steering assist command values, a third compensation function to perform a dead time compensation "C" based on the dq-axis current command values, and a temperature detecting section to detect a temperature of the inverter or a temperature near the inverter, wherein dead time corrections of the dead time compensation "B" and the dead time compensation "C" are performed based on the temperature, wherein switches of the first compensation function, the second compensation function and the third compensation function are performed by using a conditional branch due to software, a gradual-change switch based on the dq-axis steering assist command values and a motor rotational number, wherein dq-axis dead time compensation values after the conditional branch and the gradual-change switch are performed are calculated, and wherein the dq-axis voltage command values are compensated by the dq-axis dead time compensation values.

The present invention relates to an electric power steering apparatus of a vector control system that calculates dq-axis steering assist command values based on at least a steering torque, calculates dq-axis current command values from the dq-axis steering assist command values, converts dq-axis voltage command values calculated from the dq-axis current command values into duty command values of three phases, drives and controls a three-phase brushless motor by an inverter of a PWM control, and applies an assist torque to a steering system of a vehicle, the above-described object of the present invention is achieved by that: comprising a temperature detecting section to detect a temperature of the inverter or a temperature near the inverter, a dead time compensating section "A" to calculate a compensation value "CA" based on respective phase motor terminal voltages, the duty command values, a motor rotational angle, a motor rotational velocity and an inverter applying voltage, a dead time compensating section "B" to calculate a compensation value "CB" based on the dq-axis steering assist command values, the motor rotational angle, the motor rotational velocity, the inverter applying voltage and the temperature, a dead time compensating section "C" to calculate a compensation value "CC" based on the dq-axis current command values, the motor rotational angle, the motor rotational velocity, the inverter applying voltage and the temperature, and a compensation value switching section to input the compensation value "CA", the temperature-corrected compensation value "CB", the temperature-corrected compensation value "CC", and a switch condition which is determined by the dq-axis steering assist command values, the dq-axis current command values and the motor rotational velocity, to perform a switching of the compensation value "CA", the compensation value "CB" and the compensation value "CC" using a conditional branch due to software and a gradual-changing switch based on the steering assist command values and a motor rotational number, and to calculate dq-axis dead time compensation values, wherein the dq-axis voltage command values are compensated by the temperature-corrected dq-axis dead time correction values.

Further, the present invention relates to an electric power steering apparatus of a vector control system that calculates dq-axis steering assist command values based on at least a steering torque, calculates dq-axis current command values from the dq-axis steering assist command values, converts dq-axis voltage command values calculated from the dq-axis current command values into duty command values of three phases, drives and controls a three-phase brushless motor by an inverter of a PWM control, and applies an assist torque to a steering system of a vehicle, the above-described object of the present invention is achieved by that: comprising a temperature detecting section to detect a temperature of the inverter or a temperature near the inverter, a dead time compensating section "A" to calculate a compensation value "CA" based on respective phase motor terminal voltages, the duty command values, a motor rotational angle, a motor rotational velocity and an inverter applying voltage, a dead time compensating section "B" to calculate a compensation value "CB" based on the dq-axis steering assist command values, the motor rotational angle, the motor rotational velocity, the inverter applying voltage and the temperature, a dead time compensating section "C" to calculate a compensation value "CC" based on the dq-axis current command values, the motor rotational angle, the motor rotational velocity, the inverter applying voltage and the temperature, and a compensation value switching section to input the compensation value "CA", the temperature-corrected compensation value "CB", the temperature-corrected compensation value "CC", and a switch condition which is determined by the dq-axis steering assist command values, the dq-axis current command values and the motor rotational velocity, to perform a switching of the compensation value "CA", the compensation value "CB" and the compensation value "CC" using a conditional branch due to software and a gradual-changing switch based on the dq-axis steering assist command values and motor rotational number depending on a judged condition, and to calculate dq-axis dead time compensation values, wherein the dq-axis voltage command values are compensated by the temperature-corrected dq-axis dead time correction values.

Furthermore, the present invention relates to an electric power steering apparatus of a vector control system that calculates dq-axis steering assist command values based on at least a steering torque, calculates dq-axis current command values from the dq-axis steering assist command values, converts dq-axis voltage command values calculated from the dq-axis current command values into duty command values of three phases, drives and controls a three-phase brushless motor by an inverter of a PWM control, and applies an assist torque to a steering system of a vehicle, the above-described object of the present invention is achieved by that: comprising a first compensation function to perform a dead time compensation "A" based on respective phase motor terminal voltages and the duty command values, a second compensation function to perform a dead time compensation "B" based on the dq-axis steering assist command values, and a third compensation function to perform a dead time compensation "C" based on the dq-axis current command values, wherein switches of the first compensation function, the second compensation function and the third compensation function are performed by using a conditional branch due to software and a gradual-changing switch based on the dq-axis steering assist command values and a motor rotational number, wherein the gradual-changing switch is performed by a nonlinear function, wherein dq-axis dead time compensation values after the conditional branch and the gradual-changing switch are performed are calculated, and wherein the dq-axis voltage command values are compensated by the dq-axis dead time compensation values.

Effects of the Invention

The electric power steering apparatus according to the present invention enables to improve the steering performance since the plural dead time compensation functions (for example, the dead time compensation function (A) of the inverter based on the respective phase motor terminal voltages, the dead time compensation function (B) of the inverter based on the function of the motor rotational angle (the electrical angle), and the dead time compensation function (C) based on the current command value model) switch under the predetermined conditions, the gradual-changing switch and the conditional branch due to the software are separately used by the functions of the control (an accuracy-weight or a speed-weight), and the dead time compensation is performed under the optimal state. With respect to the dead time compensation function (A) of the inverter based on the respective phase motor terminal voltages, because the compensation sign and the compensation amount are automatically calculated, the compensation can be performed without chattering even in the low load and low speed steering state near an on-center position of the handle. Because the automatic calculation is performed, the compensation by the dead time compensation function (A) can be performed even in a case that the three-phase compensation waveforms are not a rectangular wave. The dead time compensation function (B) of the inverter based on the function of the motor rotational angle (the electrical angle) has a characteristic that the compensation accuracy is high in the low speed steering region and the medium speed steering region that the angle is coincident with the phase of the phase current, and the compensation can be performed even in a case that the three-phase compensation waveforms are not a rectangular wave. The dead time compensation function (C) based on the current command value model has a characteristic that the simple dead time compensation that the phase deviation is small even in a high speed steering can be performed.

According to the present invention, since the compensation functions (A), (B) and (C) are switched in accordance with the steering condition, and the gradual-changing switch and the conditional branch due to the software are separately used with the functions, the optimal steering that both characteristics are utilized can be realized. Thereby, the dead time of the inverter can be compensated without a tuning operation, and improvements in the distortion of the current waveform and the responsibility of the current control can be performed.

Further, since the dead time compensation function (B) and the dead time compensation function (C) are corrected depending on the temperature of the ECU (the temperature of the inverter or the temperature around the inverter), and the motor rotational number (the motor rotational velocity) is considered in the gradual-changing switch, the finer and more accurate dead time compensation can be realized.

BRIEF DESCRIPTION OF THE DRAWINGS

In the accompanying drawings:

FIGS. 15A and 15B are waveform charts showing an operation example of a compensation sign estimating section;

FIG. 16 is a block diagram showing a configuration example of an inverter applying voltage-sensitive gain calculating section;

FIG. 17 is a characteristic diagram showing a characteristic example of the inverter applying voltage-sensitive gain calculating section;

FIGS. 52A, 52B and 52C are waveform charts showing current waveform examples in a case that temperature compensation is not performed;

MODE FOR CARRYING OUT THE INVENTION

Figure 1:
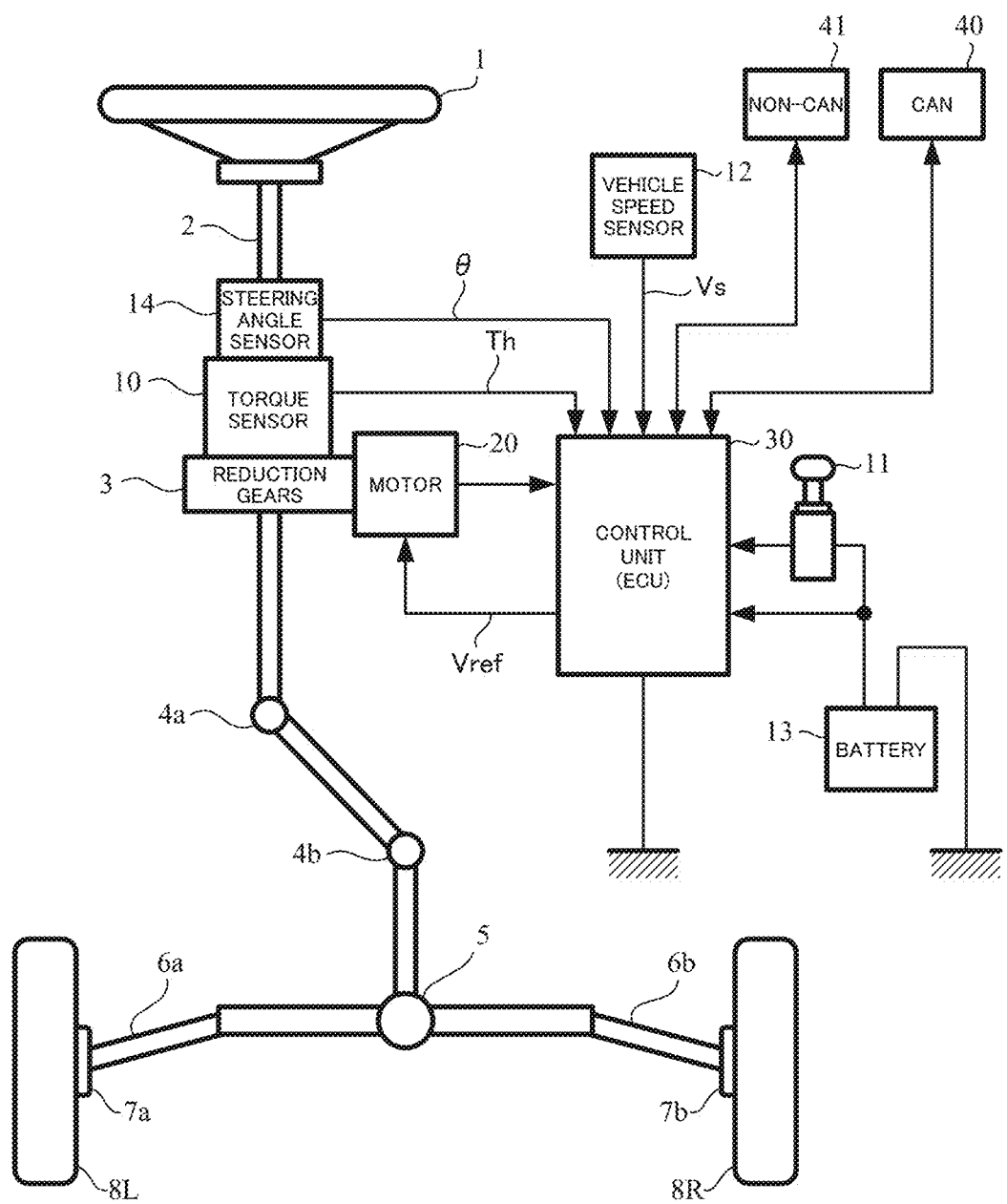
FIG. 1 is a configuration diagram showing a general outline of an electric power steering apparatus.
Figure 2:
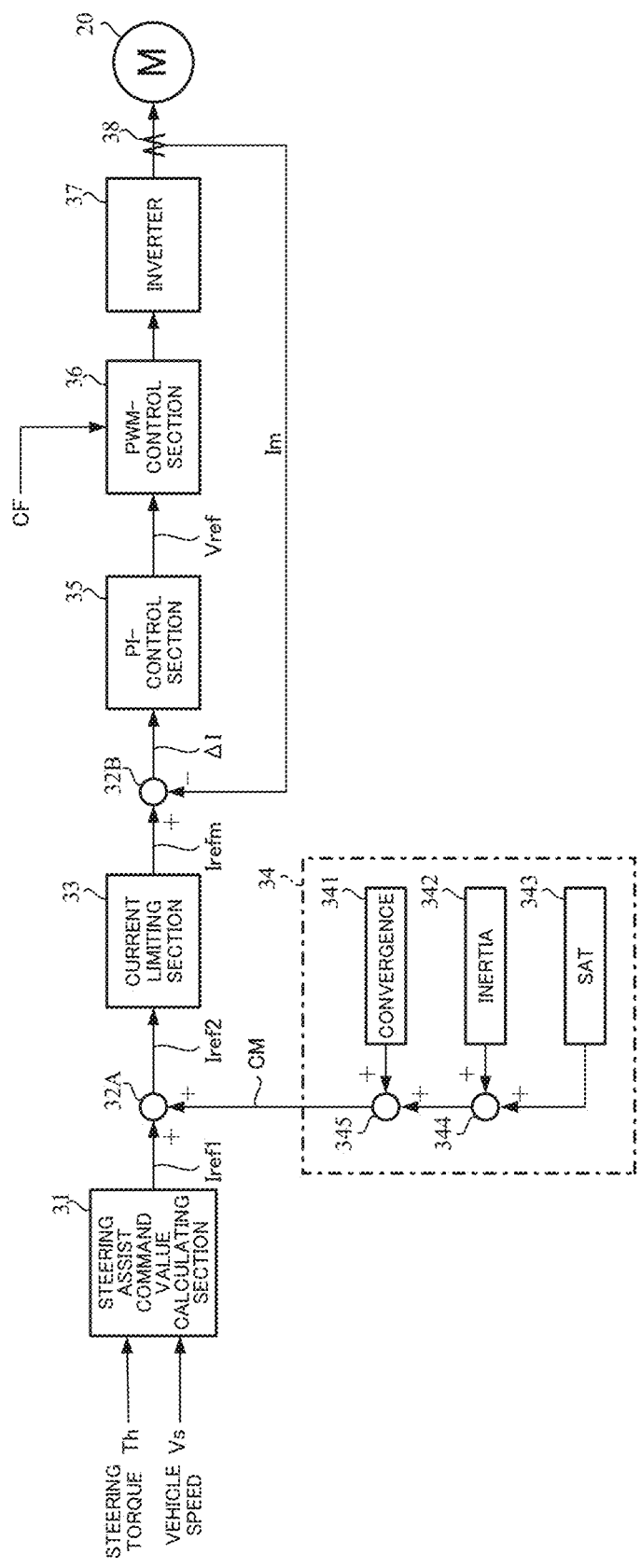
FIG. 2 is a block diagram showing a configuration example of a control unit (ECU) of the electric power steering apparatus.

In order to resolve a problem that a current distortion and a torque ripple occur due to an influence of a dead time of an inverter in a control unit (ECU) and a steering sound is louder, in calculating a dead time compensation value of the inverter, the present invention switches a dead time compensation function to the dead time compensation function (A) of the inverter based on respective phase motor terminal voltages and respective phase duty command values, the dead time compensation function (B) based on functions depending on a motor rotational angle (an electrical angle) or the dead time compensation function (C) based on a current command value model, under the predetermined conditions. That is, the present invention calculates the dead time compensation value by using the gradual-changing switch for the accuracy-weight when a difference between the switching compensation amounts is large, and by using a conditional branch due to software (a switch type) for a speed-weight when the speed of the switch timing is required, and compensates the dead time compensation value on the dq-axis by using a feed-forward control.

In the dead time compensation function with a single function and a single algorithm, the dead time compensation value is accurately compensated during the low speed steering. However, the compensation accuracy decreases during the high speed steering. Conversely, the dead time compensation value can be accurately compensated during the high speed steering, and the compensation accuracy can decrease during the low speed steering. In the low load and the low speed steering state, in a case that the switch is instantaneously switched, since the dead time compensation values are changed in a step shape or discontinuously from the differences among the compensation values of the respective functions, the torque ripple can be occurred. In the high speed steering state, when the dead time compensation functions are switched by the gradual-changing, the phase of the compensation values can be deviated during the period of the gradual-changing switch. Therefore, in the dead time compensation function with a single function and a single algorithm, it is difficult to accurately compensate the compensation value in a whole steering region. In a case that the switch of the compensation value is performed by the single function (the single switch), the performance can be deteriorated. However, the present invention prepares the plural dead time compensation functions having the high compensation accuracy depending on the steering conditions, switches to the optimal dead time compensation function depending on the steering state, and separately uses the switch means of the instantaneous conditional branch due to the software and that of the gradual-changing switch. Thereby, the present invention can perform the dead time compensation having the high compensation accuracy over all steering regions.

The present invention performs the dead time compensation based on the plural compensation functions for the d-axis and q-axis voltage command values of the dq-axis vector control system independently and respectively, and switches the plural dead time compensation functions depending on the predetermined conditions which are determined by the d-axis current command value, the q-axis current command value and the motor rotational velocity. Thereby, the optimal dead time compensation value can be selected over all steering regions which include the low speed steering region, the medium speed steering region and the high speed steering region.

In embodiments of the present invention, the dead time compensation function (A) based on the respective phase motor terminal voltages, the respective phase duty command values, the motor rotational angle, the motor rotational velocity and the inverter applying voltage, the dead time compensation function (B) based on steering assist command values, the motor rotational angle, the motor rotational velocity and the inverter applying voltage, and the dead time compensation function (C) based on the dq-axis current command values, the motor rotational angle, the motor rotational velocity and the inverter applying voltage are used, the switch judgment by using the dq-axis current command values and the motor rotational velocity is performed, the dead time compensation functions (B) and (C) are switched by the conditional branch due to the software, and the switch between the dead time compensation function (A) and the dead time compensation (B) or (C) is performed by the gradual-changing using the steering assist command value. In the switch between the dead time compensation functions (B) and (C), the conditional branch due to the software (the switch type) which can instantaneously be switched for the speed-weight is used. In the switch between the dead time compensation function (A) and the dead time compensation function (B) or (C), the gradual-changing which is for an accuracy-weight and is required for the constant time in switching is used.

In the present invention, since the dead time compensation functions (B) and (C) are corrected depending on the temperature of the ECU (the temperature of the inverter or the temperature near the inverter), and the motor rotational velocity (the motor rotational number) and the steering assist command value (iqref) are considered in the gradual-changing switch operation, the finer and more accurate dead time compensation can be realized.

Typical motor rotational numbers are depending on the kind of the motor and the reduction ratio of the reduction gears 3 of the EPS. For example, the motor rotational number of the low speed steering region is in a range of 0 [rpm] to 300 [rpm], the motor rotational number of the middle speed steering region is in a range of 300 [rpm] to 1800 [rpm], and the motor rotational number of the high speed steering region is in a range of 1800 [rpm] to 4000 [rpm]. The above high motor rotational number is equal to or more than the rated rotational number of the motor and is a rotational number region that a weak-field control is required.

Embodiments according to the present invention will be described with reference to the accompanying drawings.

Figure 3:
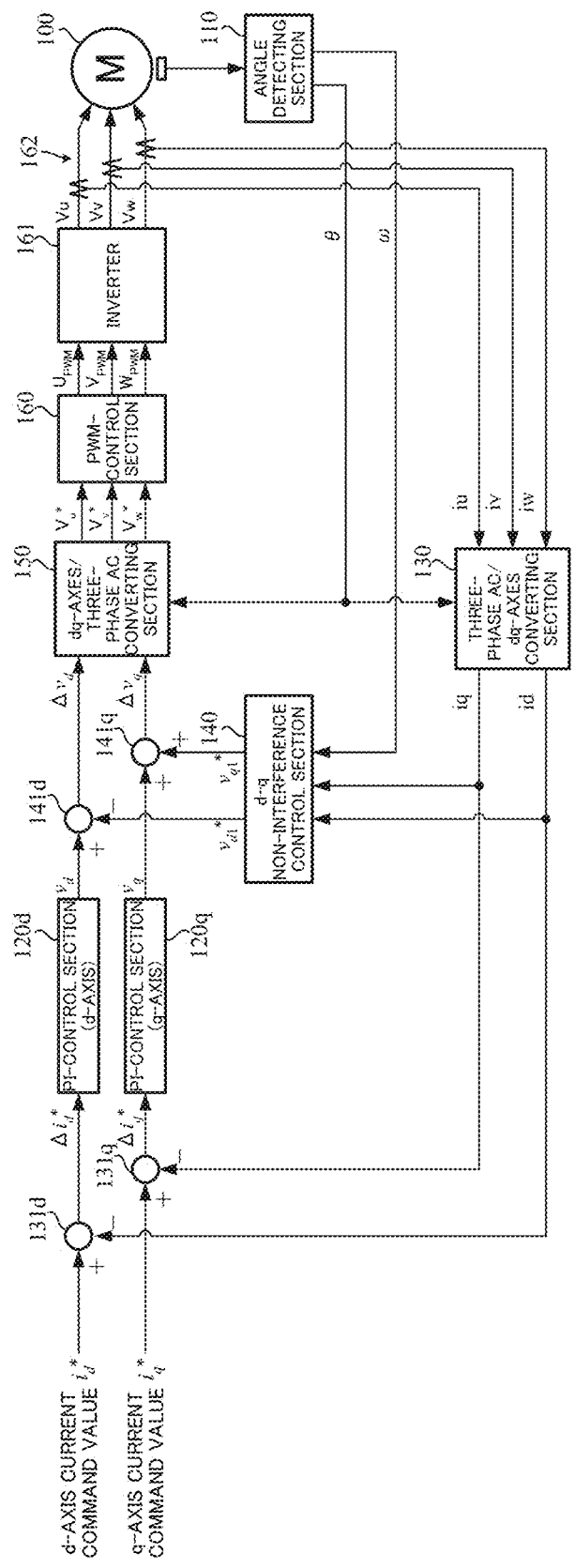
FIG. 3 is a block diagram showing a configuration example of a vector control system.
Figure 4:
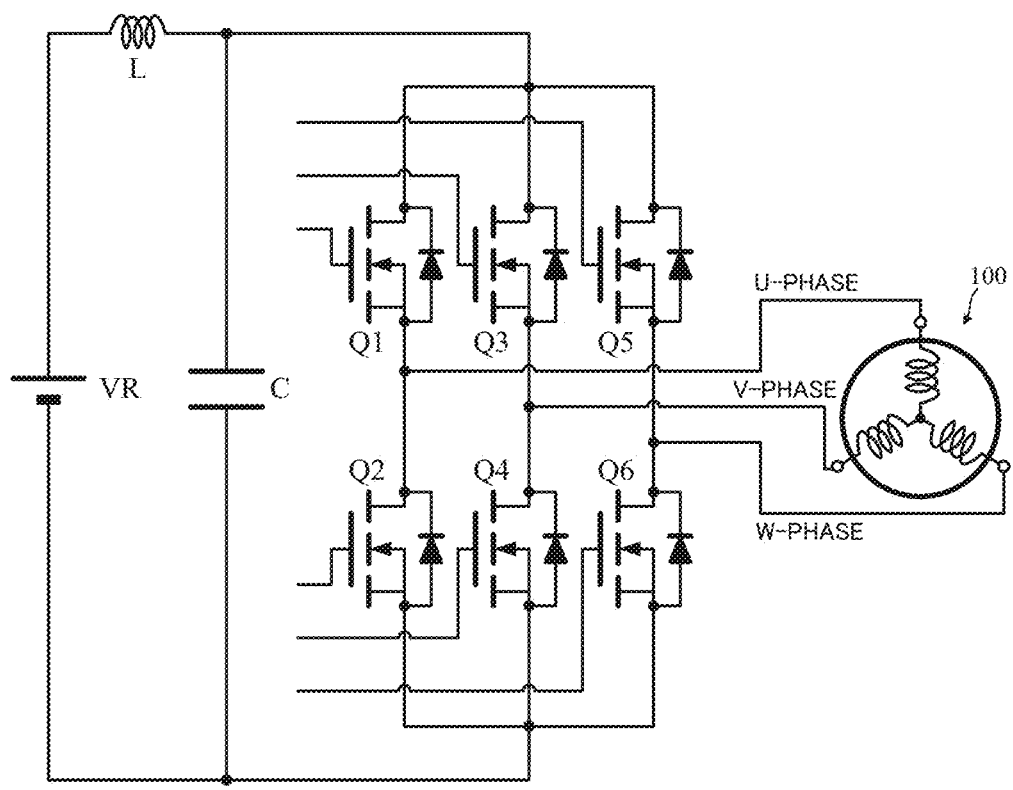
FIG. 4 is a wiring diagram showing a configuration example of a general inverter.
Figure 5:
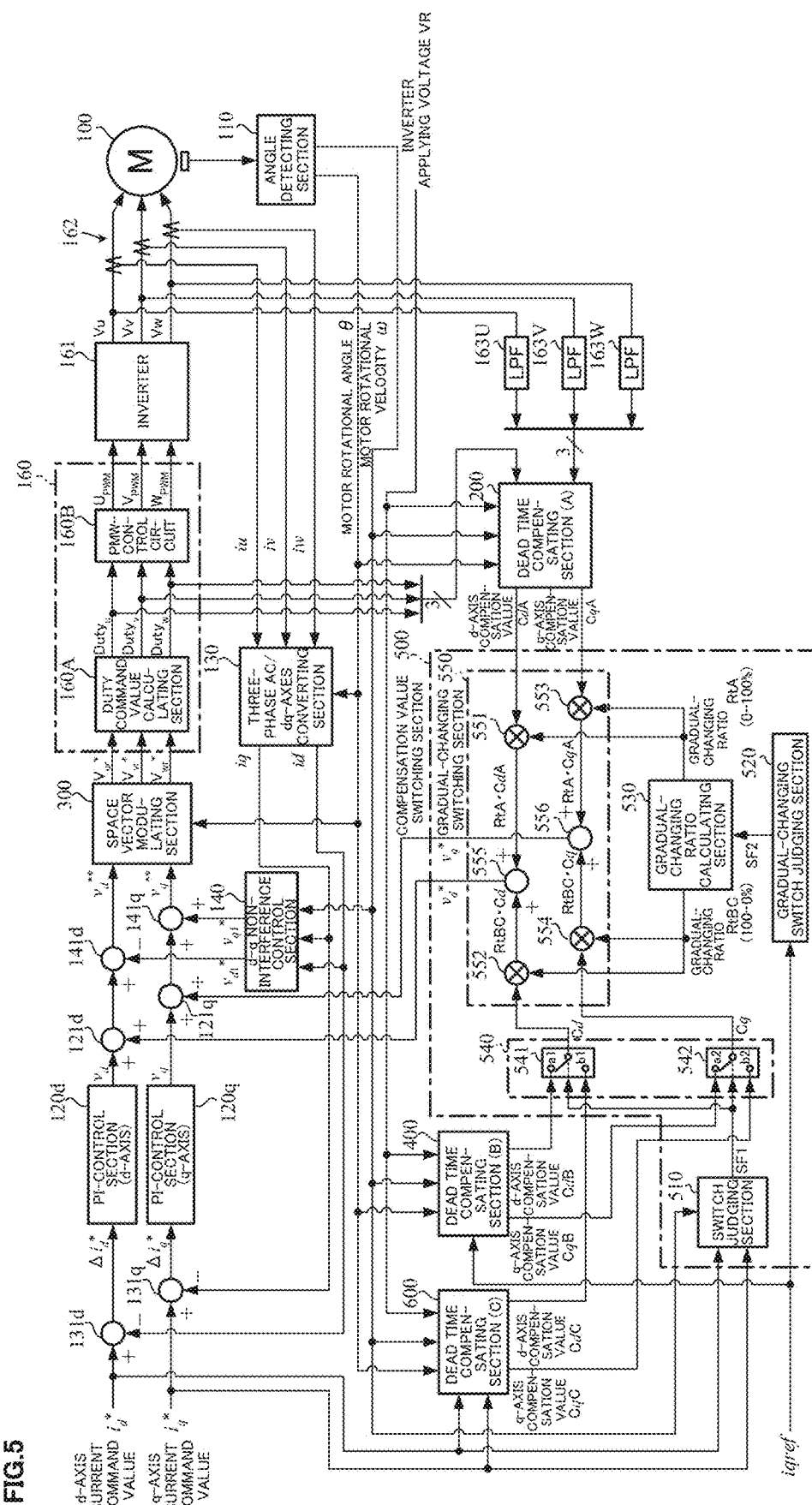
FIG. 5 is a block diagram showing a configuration example (the first embodiment) of the present invention.

FIG. 5 shows a whole configuration example (the first embodiment) of the present invention corresponding to FIG. 3, and there is provided a dead time compensating section (A) 200 to calculate compensation values CdA and CqA on the dq-axes, a dead time compensating section (B) 400 to calculate compensation values CdB and CqB on the dq-axis, a dead time compensating section (C) 600 to calculate compensation values CdC and CqC on the dq-axes, and a compensation value switching section 500 to switch the compensation values CdA and CqA, the compensation values CdB and CqB and the compensation values CdC and CqC depending on the predetermined conditions and the functions, calculate the dead time compensation values $v_d^*$ and $v_q^*$ on the dq-axes and output the dead time compensation values $v_d^*$ and $v_q^*$ on the dq-axes. The compensation function of the dead time compensating section (A) 200 enables to compensate without chattering in the low load and low speed steering state near the on-center position of the handle, the compensation function of the dead time compensating section (B) 400 has the high compensation accuracy in the low speed steering region and the middle speed steering region, and the compensation function of the dead time compensating section (C) 600 has the high compensation accuracy characteristic in the high speed steering region.

Motor terminal voltages $V_u$, $V_v$ and $V_w$ are inputted into the dead time compensating section 200 (the detail is described as below) via lowpass filters (LPFs) 163U, 163V and 163W for removing the noise. Duty command values $Duty_u$, $Duty_v$ and $Duty_w$ from the duty command value calculating section 160A in the PWM-control section 160 are also inputted into the dead time compensating section (A) 200. Further, the motor rotational angle θ, the motor rotational velocity ω and the inverter applying voltage VR which is applied to the inverter 161 are inputted into the dead time compensating section (A) 200. The q-axis steering assist command value iqref corresponding to the steering assist command value Iref2, the inverter applying voltage VR, the motor rotational angle θ and the motor rotational velocity ω are inputted into the dead time compensating section (B) 400 (the detail is described as below). The d-axis current command value $i_d^*$, the q-axis current command value $i_q^*$, the motor rotational angle θ, the inverter applying voltage VR and the motor rotational velocity ω are inputted into the dead time compensating section (C) 600 (the detail is described as below).

The compensation value switching section 500 comprises a switch judging section 510 to judge the switch (the switch of a conditional branch section) and output a switch judgment flag SF1, a conditional branch section 540 due to software (switch sections 541 and 542) to switch the compensation values CdB and CqB from the dead time compensating section (B) 400 or the compensation values CdC and CqC from the dead time compensating section (C) 600 and output the switched compensation values, and a gradual-changing switching section 550 which includes a gradual-changing switch judging section 520 to judge the gradual-changing switch based on the steering assist command value iqref and output an UP/DOWN judgment flag SF2, a gradual-changing ratio calculating section 530 to calculate the compensation values Cd and Cq from the conditional branch section 540 by the UP/DOWN judgment flag SF2, a gradual-changing ratio RtA (for example, 0 [%] to 100 [%]) of the compensation values CdA and CqA from the dead time compensating section (A) 200 and a gradual-changing ratio RtBC (for example, 100 [%] to 0 [%]), multiplying sections 551 to 554 and adding sections 555 and 556. A gradual-changing section comprises the gradual-changing switch judging section 520 and the gradual-changing ratio calculating section 530.

The switch sections 541 and 542 of the conditional branch section 540 functionally have the contact points a1 and b1 and the contact points a2 and b2. The compensation value CdB is inputted into the contact point a1, the compensation value CdC is inputted into the contact point b1, the compensation value CqB is inputted into the contact point a2, and the compensation value CqC is inputted into the contact point b2. The contact points a1 and b1 of the switch section 541 and the contact points a2 and b2 of the switch section 542 are synchronously switched by the switch judgment flag SF1 from the switch judging section 510. That is, when the switch judgment flag SF1 is not inputted (for example, the logic is "L"), the contact points a1 and a2 are connected. When the switch judgment flag SF1 is inputted (for example, the logic is "H"), the contact points b1 and b2 are connected. The compensation values Cd and Cq are outputted from the conditional branch section 540, and are inputted into the multiplying section 552 and 554 in the gradual-changing switching section 550, respectively.

Next, the dead time compensating section (A) 200 will be described.

Figure 6:
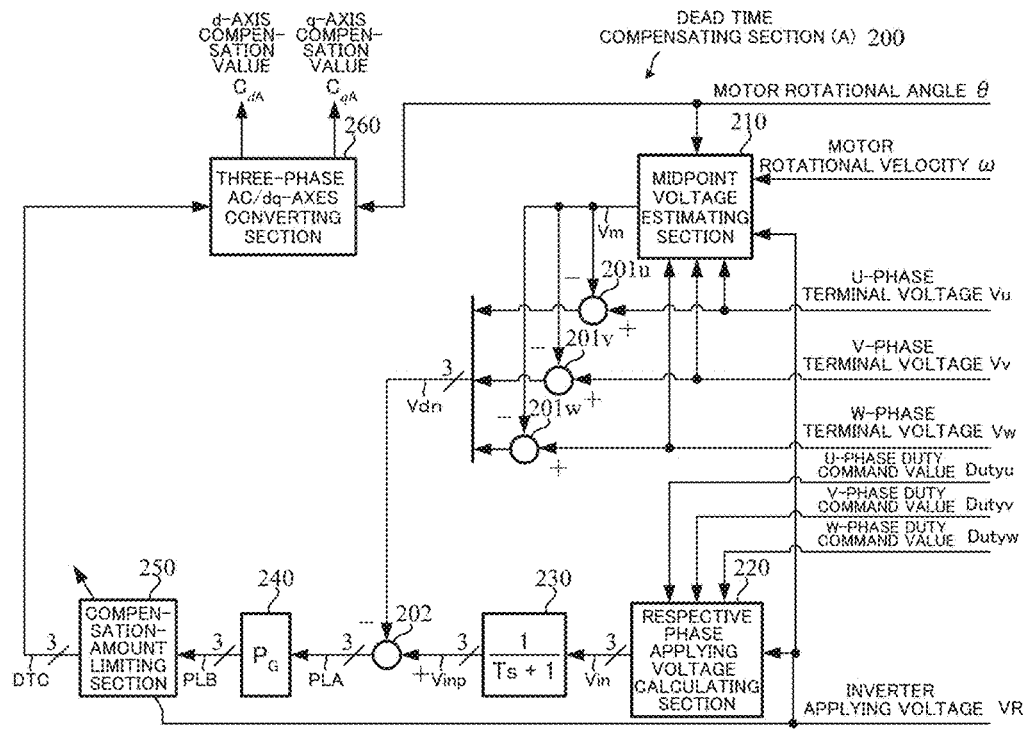
FIG. 6 is a block diagram showing a configuration example of a dead time compensating section (A)

As shown in FIG. 6, the dead time compensating section (A) 200 comprises subtracting sections 201 (201u, 201v and 201w) and 202, a midpoint voltage estimating section 210, a respective phase applying voltage calculating section 220, a voltage detection delay model 230, a gain section 240, a compensation-amount limiting section 250 and a three-phase AC/dq-axes converting section 260. The motor rotational angle θ is inputted into the midpoint voltage estimating section 210 and the three-phase AC/dq-axes converting section 260, and the motor rotational velocity ω is inputted into the midpoint voltage estimating section 210. The motor terminal voltages $V_u$, $V_v$ and $V_w$ are inputted into the midpoint voltage estimating section 210 and the subtracting sections 201u, 201v and 201w via the LPFs 163U, 163V and 163W. Further, the duties $Duty_u$, $Duty_v$ and $Duty_w$ from the duty command value calculating section 160A in the PWM-control section 160 are inputted into the three-phase command voltage calculating section 220, and the inverter applying voltage VR is inputted into the midpoint voltage estimating section 210, the respective phase applying voltage calculating section 220 and the compensation amount limiting section 250.

Figure 7:
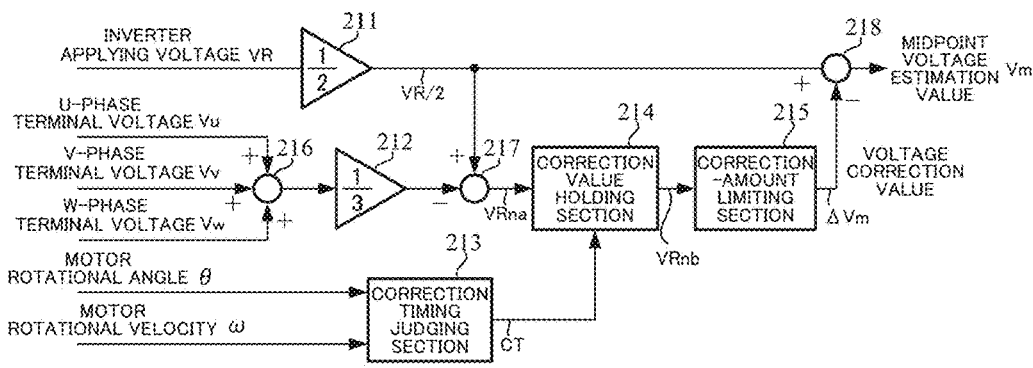
FIG. 7 is a block diagram showing a configuration example of a midpoint voltage estimating section.

The midpoint voltage estimating section 210 calculates a reference voltage of midpoint voltages by using the inverter applying voltage VR. The detail configuration is shown in FIG. 7, since the midpoint voltages vary depending on the influence of a hardware configuration, a detection error and so on, the correction is performed based on the differences between the inverter applying voltage VR and the motor terminal voltages $V_u$, $V_v$ and $V_w$. The correction timing is adjusted under conditions of a specific motor rotational angle θ and a specific motor rotational velocity ω. Namely, the inverter applying voltage VR is reduced by half (VR/2) in a half reducing section 211 and the half-reduced value (VR/2) is addition-inputted into subtracting sections 217 and 218. The motor terminal voltages $V_u$, $V_v$ and $V_w$ are inputted into the adding section 216 and are added, the added result "$V_u+V_v+V_w$" is ⅓-multiplied at a dividing section (⅓) 212, and a ⅓-multiplied voltage "$(V_u+V_v+V_w)/3$" is subtraction-inputted into the subtracting section 217. The subtracting section 217 subtracts the voltage "$(V_u+V_v+V_w)/3$" from the half-reduced value VR/2, and the subtracted result $VR_{na}$, is inputted into a correction value holding section 214. A correction timing judging section 213 judges a correction timing based on the motor rotational angle θ and the motor rotational velocity ω and inputs a correction signal CT to the correction value holding section 214. The correction-amount limiting section 215 calculates a voltage correction value $\Delta V_m$ based on a voltage $VR_{nb}$ held in the correction value holding section 214.

Figure 8:
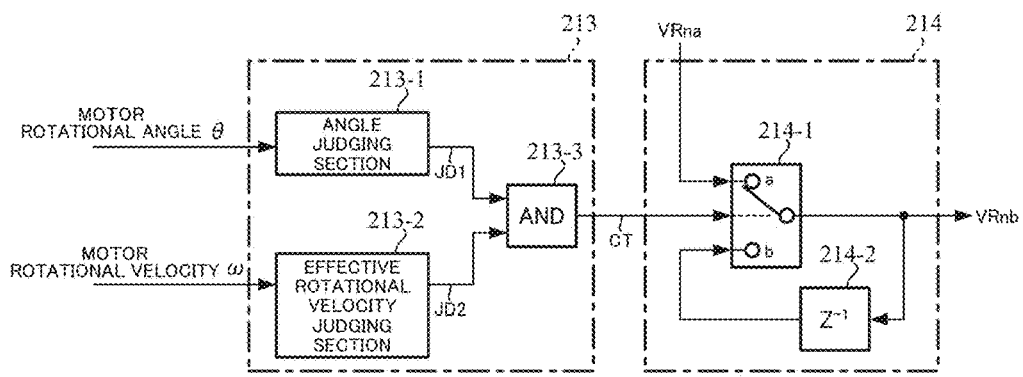
FIG. 8 is a block diagram showing a detail configuration example of the correction timing judging section and the correction value holding section.

The details of the correction timing judging section 213 and the correction value holding section 214 are shown in FIG. 8, the correction timing judging section 213 comprises an angle judging section 213-1, an effective rotational velocity judging section 213-2 and an AND-circuit 213-3, and the correction value holding section 214 comprises a switching section 214-1 and a holding unit ($Z^{-1}$) 214-2. That is, the motor rotational angle θ is inputted into the angle judging section 213-1 and the judgment is performed by using the below Expression 1. When the Expression 1 is established, the angle judging section 213-1 outputs a judging signal JD1.

$$179[deg] < \theta < 180[deg] \quad \text{[Expression 1]}$$

Since the calculation at the point where the phase voltage is zero-crossed as the midpoint correction value has a high accuracy, the angle near 180 [deg] of the motor rotational angle θ where the U-phase voltage is zero-crossed is set as the correction condition. Further, when the motor rotational velocity ω is high, since the influence of the back-EMF increases, it is impossible to perform the accurate correction calculation. Thus, the effective rotational velocity judging section 213-2 judges whether the motor rotational velocity ω is equal to or less than an effective rotational velocity $\omega_0$ being capable of correction-calculating, or not. When the motor rotational velocity ω is equal to or less than the effective rotational velocity $\omega_0$, the effective rotational velocity judging section 213-2 outputs the judging signal JD2.

$$\omega \leq \omega_0 \quad \text{[Expression 2]}$$

The judging signals JD1 and JD2 are inputted into the AND-circuit 213-3, and the correction signal CT is outputted in accordance with the AND-condition that the judging signals JD1 and JD2 are inputted. The correction signal CT is inputted into the switching section 214-1 in the correction value holding section 214 as a switching signal and switches contact points "a" and "b". The subtracted result $VR_{na}$ is inputted into the contact point "a", and the output voltage $VR_{nb}$ is inputted into the contact point "b" via the holding unit ($Z^{-1}$) 214-2. The correction value holding section 214 holds a value in order to output a stable correction value till a next timing. Further, in a case that the correction amount is clearly greater than a normal value due to the noise, the back-EMF, the correction timing miss-judgment and so on, the correction-amount limiting section 215 judges that the present correction amount is not right and limits the maximum correction value. The voltage correction value $\Delta V_m$ which is limited by the maximum correction value is inputted into the subtracting section 218, and the midpoint voltage estimation value $V_m$ calculated in accordance with the below Expression 3 at the subtracting section 218 is outputted. The midpoint voltage estimation value $V_m$ is subtraction-inputted into the subtracting sections 201u, 201v and 201w.

$$V_m = \frac{VR}{2} - \Delta V_m \quad \text{[Expression 3]}$$

Furthermore, the respective phase duty command values $Duty_u$, $Duty_v$ and $Duty_w$ and the inverter applying voltage VR are inputted into the respective phase applying voltage calculating section 220, and the respective phase applying voltage calculating section 220 calculates the respective phase applying voltages $V_{in}$ by using the below Expression 4 in accordance with the respective phase duty command values $Duty_u$, $Duty_v$ and $Duty_w$ and the inverter applying voltage VR. The respective phase applying voltages $V_{in}$ are inputted into the voltage detection delay model 230. As well, "$Duty_{ref}$" in the Expression 4 denotes $Duty_u$, $Duty_v$ and $Duty_w$.

$$V_{in} = VR \times \frac{(Duty_{ref} - Duty_{50\%})}{Duty_{100\%}} \quad \text{[Expression 4]}$$

The midpoint voltage estimation value $V_m$ is subtraction-inputted into the subtracting section 201 (201u, 201v and 201w), and further the terminal voltages $V_u$, $V_v$ and $V_w$ passed the LPFs 163U, 163V and 163W are addition-inputted into the subtracting section 201 (201u, 201v and 201w). The subtracting sections 201u, 201v and 201w subtract the midpoint voltage estimation value $V_m$ from the respective phase terminal voltages $V_u$, $V_v$ and $V_w$ in accordance with the below Expression 5. Thereby, respective phase detection voltages $V_{dn}$ ($V_{du}$, $V_{dv}$ and $V_{dw}$) are calculated. The respective phase detection voltages $V_{dn}$ ($V_{du}$, $V_{dv}$ and $V_{dw}$) are inputted into the subtracting section 202 serving as a respective phase loss voltage calculating section.

$$V_{du} = V_u - V_m$$
$$V_{dv} = V_v - V_m$$
$$V_{dw} = V_w - V_m \quad \text{[Expression 5]}$$

The detection of the terminal voltages $V_u$, $V_v$ and $V_w$ has a delay due to a noise filter or the like in the ECU. Consequently, in a case that the loss voltages are directly calculated by obtaining the differences between the respective phase applying voltages $V_{in}$ and the respective phase detection voltages $V_{dn}$, the error occurs due to the phase difference. In order to resolve this problem, the present embodiment approximates the detection delay of the hardware such as a filter circuit as a first order filter model and improves the phase difference. The voltage detection delay model 230 of the present embodiment is a primary filter of the below Expression 6 and "T" denotes a filter time constant. The voltage detection delay model 230 may be a model of a secondary filter or higher order filter.

$$\frac{1}{Ts+1} \quad \text{[Expression 6]}$$

The respective phase applying voltages $V_{in}$ are addition-inputted to the subtracting section 202, and the respective phase detection voltages $V_{dn}$ are subtraction-inputted into the subtracting section 202. The respective phase loss voltages PLA ($V_{loss\_n}$) are calculated by subtracting the respective phase detection voltages $V_{dn}$ from the respective phase applying voltages $V_{in}$. Namely, the below Expression 7 is performed in the subtracting section 202.

$$V_{loss\_u} = V_{inu} - V_{du}$$

$$V_{loss\_v} = V_{inv} - V_{dv}$$

$$V_{loss\_w} = V_{inw} - V_{dw} \quad \text{[Expression 7]}$$

The respective phase loss voltages PLA ($V_{loss\_n}$) are multiplied with a gain $P_G$ (for example, $P_G$=0.8) at the gain section 240, and the respective phase loss voltages PLA multiplied with the gain $P_G$ are inputted into the compensation-amount limiting section 250. Although the gain $P_G$ is not basically needed to adjust, the gain $P_G$ is changed in a case that an output adjustment is needed when the adjustment for another compensator is performed, actual vehicle tuning is performed, or parts of the ECU are changed.

Figure 9:
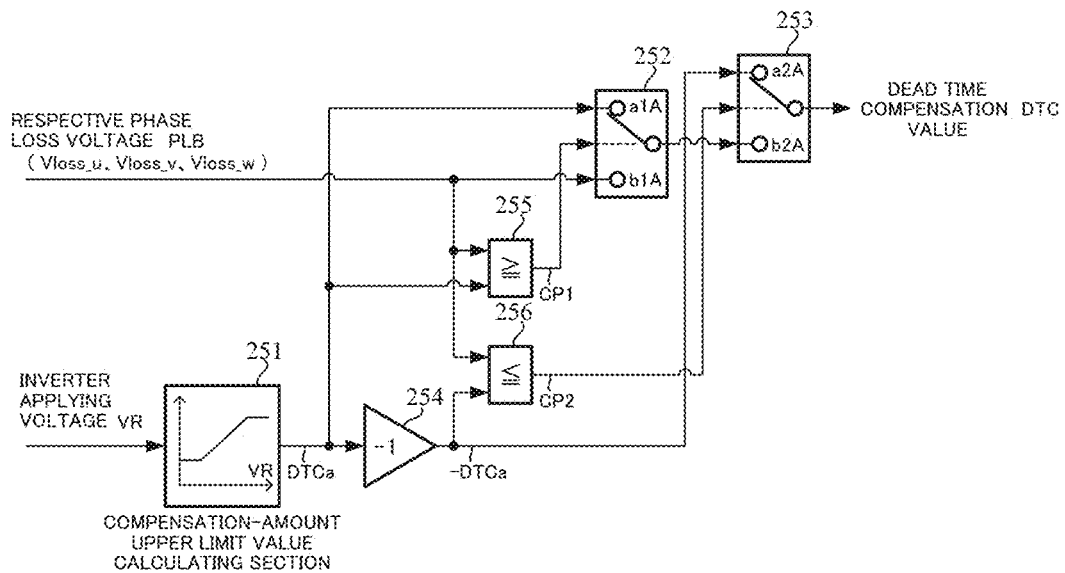
FIG. 9 is a block diagram showing a detail configuration example of the correction-amount limiting section.
Figure 10:
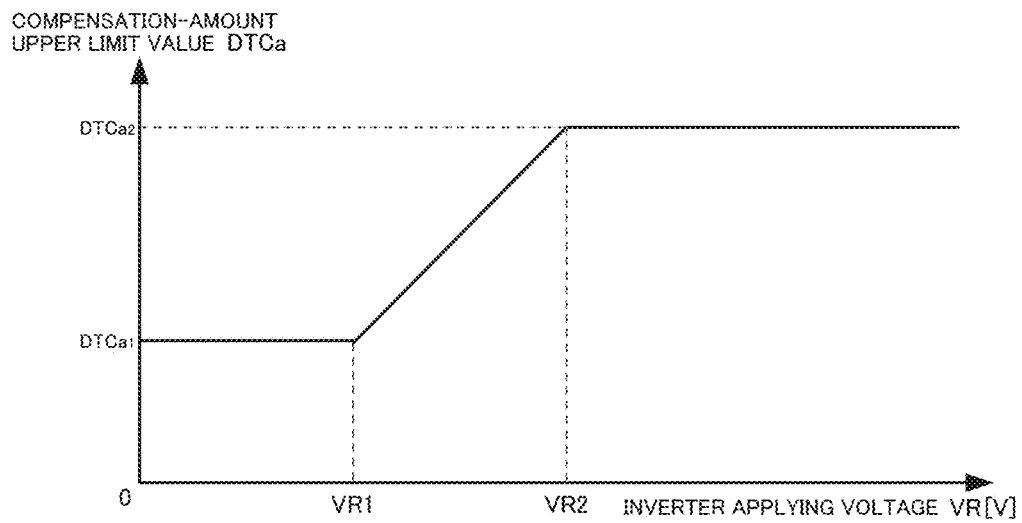
FIG. 10 is a characteristic chart showing an example of an upper limit value of the compensation amount.

The compensation-amount limiting section 250 is sensitive to the inverter applying voltage VR, and the detail configuration is shown in FIG. 9. The inverter applying voltage VR is inputted into a compensation-amount upper limit value calculating section 251 in the compensation-amount limiting section 250, and a compensation-amount upper limit value DTCa is calculated with a characteristic as shown in FIG. 10. The compensation-amount upper limit value DTCa is a constant limit value DTCa1 when the inverter applying voltage VR is lower than a predetermined voltage VR1, linearly (or non-linearly) increases when the inverter applying voltage VR is equal to or higher than the predetermined voltage VR1 and is lower than a predetermined voltage VR2 (>VR1), and holds a constant limit value DTCa2 when the inverter applying voltage VR is equal to or higher than the predetermined voltage VR2. The compensation-amount upper limit value DTCa is inputted into a contact point a1A of the switching section 252, a comparing section 255 and an inverting section 254. Further, the respective phase loss voltages PLB ($V_{loss\_u}$, $V_{loss\_v}$, $V_{loss\_w}$) are inputted into the comparing sections 255 and 256, and a contact point b1A of the switching section 252. An output "−DTCa" of the inverting section 254 is inputted into a contact point a2A of the switching section 253. The contact points a1A and b1A are switched based on a compared result CP1 of the comparing section 255, and the contact points a2 and b2 are switched based on a compared result CP2 of the comparing section 256.

The comparing section 255 compares the compensation-amount upper limit value DTCa with the respective phase loss voltages PLB and switches the contact points a1A and b1A of the switching section 252 in accordance with the below Expression 8. Further, the comparing section 256 compares the compensation-amount upper limit value "−DTCa" with the respective phase loss voltages PLB and switches the contact points a2A and b2A of the switching section 253 in accordance with the below Expression 9.

When the respective phase loss voltages PLB≥the compensation-amount upper limit value DTCa, the contact point a1A of the switching section 252 is "ON".

When the respective phase loss voltages PLB<the compensation-amount upper limit value DTCa, the contact point b1A of the switching section 252 is "ON". [Expression 8]

When the respective phase loss voltages PLB≥the compensation-amount upper limit value −DTCa, the contact point a2A of the switching section 253 is "ON" (the dead time compensation value DTC=−DTCa).

When the respective phase loss voltages PLB<the compensation-amount lower-limit value −DTCa, the contact point b2A of the switching section 253 is "ON" (the dead time compensation value DTC=the output of the switching section 252). [Expression 9]

Next, the dead time compensating section (B) 400 (the first example) will be described.

Figure 11:
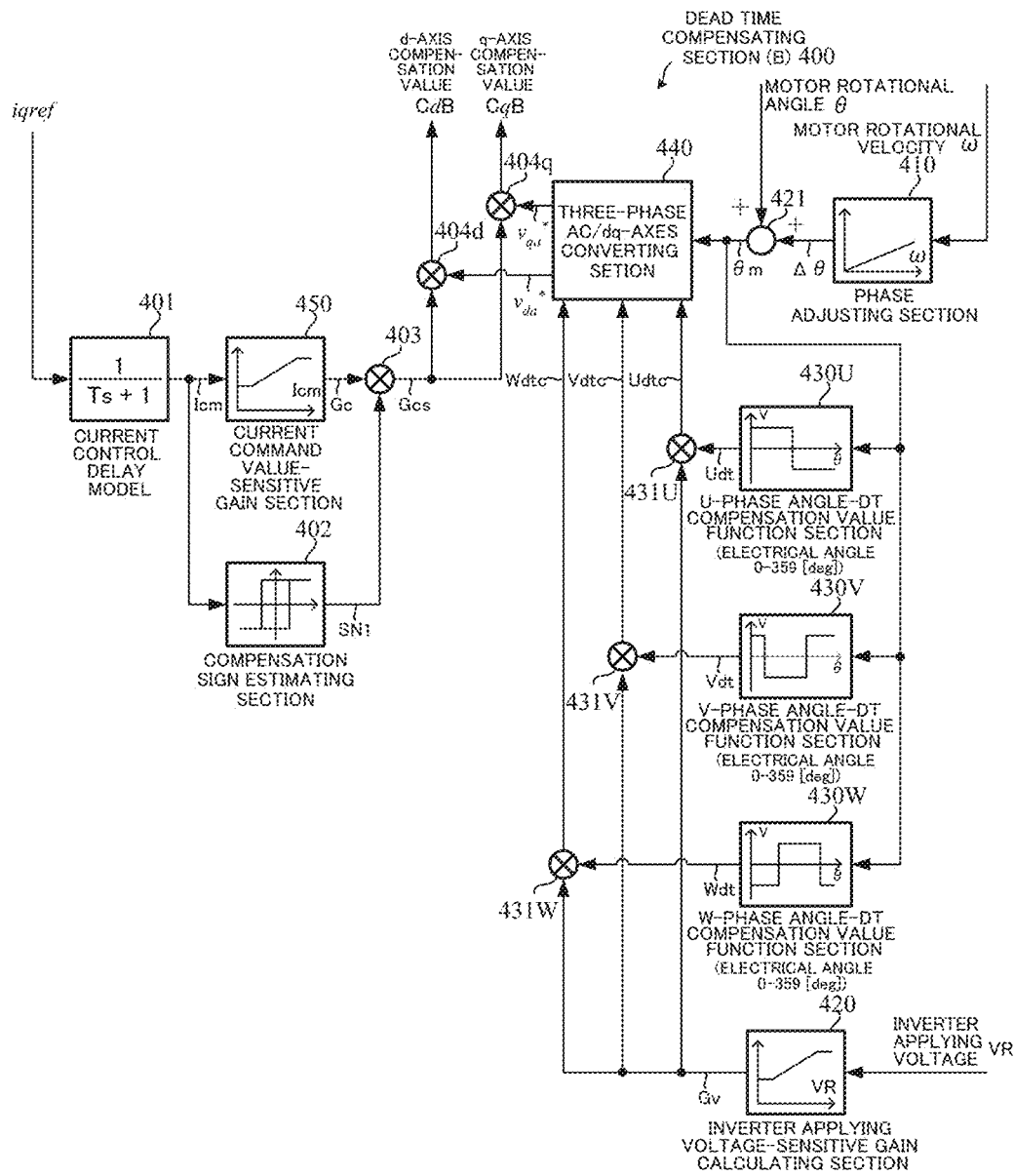
FIG. 11 is a block diagram showing a configuration example (the first example) of a dead time compensating section (B)

As shown in FIG. 11, the dead time compensating section (B) 400 comprises a current control delay model 401, a compensation sign estimating section 402, multiplying sections 403, 404d and 404q, an adding section 421, a phase adjusting section 410, an inverter applying voltage-sensitive gain section 420, angle-dead time compensation value function sections 430U, 430V and 430W, multiplying sections 431U, 431V and 431W, a three-phase alternating current (AC)/dq-axes converting section 440 and a current command value-sensitive gain calculating section 450.

The q-axis steering assist command value iqref is inputted into the current control delay model 401. A delay due to a noise filter or the like in the ECU is occurred until the dq-axis current command values $i_d$ and $i_q^*$ are corrected in the actual currents.

When the sign is directly judged from the current command value $i_q^*$, the timing deviation can be occurred. In order to resolve this problem, the first example approximates the delay of the overall current control as a first order filter model and improves the phase difference. The current control delay model 401 is a primary filter of the above Expression 6 and "T" denotes a filter time constant. The current control delay model 401 may be a model of a secondary filter or higher order filter.

The current command value $I_{cm}$ outputted from the current control delay model 401 is inputted into the current command value-sensitive gain section 450 and the compensation sign estimating section 402. In a low current region, a case that the dead time compensation amount is overcompensated is occurred. The current command value-sensitive gain section 450 has a function that a gain, which the compensation amount is reduced depending on the magnitude of the current command value $I_{cm}$ (the steering assist command value iqref), is calculated. In order that the gain, which the compensation amount is reduced, is not largely changed due to a noise from the current command value $I_{cm}$ (the steering assist command value iqref) or the like, a noise reduction process is performed by using a weighted average filter.

Figure 12:
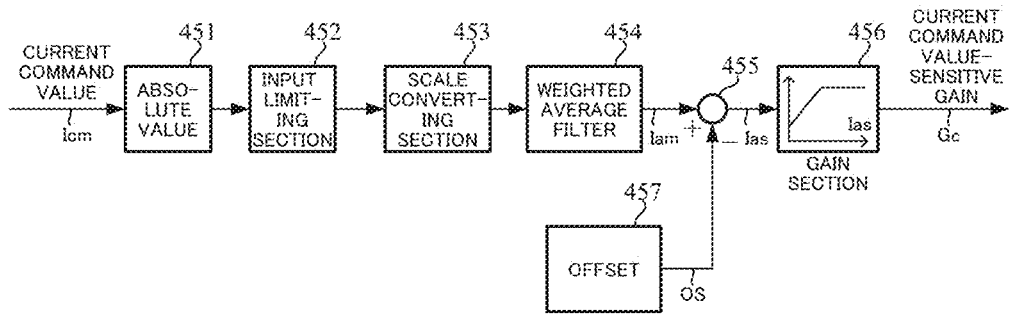
FIG. 12 is a block diagram showing a configuration example of a current command value-sensitive gain section.
Figure 13:
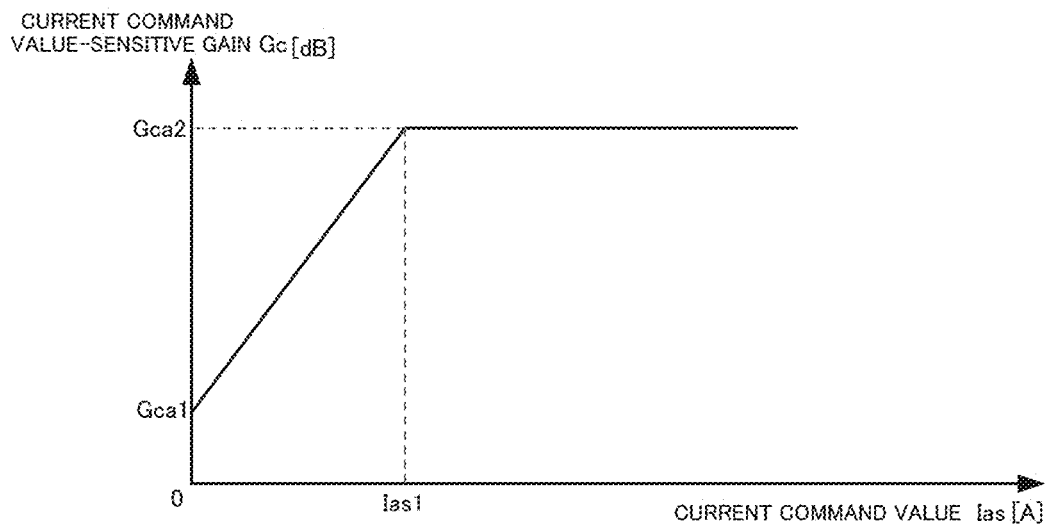
FIG. 13 is a characteristic diagram showing a gain section in the current command value-sensitive gain section.

The current command value-sensitive gain section 450 has a configuration shown in FIG. 12. An absolute value of the current command value $I_{cm}$ is calculated at an absolute value section 451. The absolute value of the current command value $I_{cm}$ whose maximum value is limited is inputted into a weighted average filter 454 via a scale converting section 453. The current command value $I_{am}$ that the noise is reduced at the weighted average filter 454 is addition-inputted into a subtracting section 455, and an offset OS having a constant value is subtracted from the current command value $I_{am}$ at the subtracting section 455. The reason for subtracting the offset OS having the constant value is to prevent a chattering due to a minute current command value, and the input value that is equal to or smaller than the offset OS is fixed to the minimum gain. The current command value $I_{as}$ that the offset OS is subtracted at the subtracting section 455 is inputted into a gain section 456, and the current command value-sensitive gain $G_c$ is outputted in accordance with a gain characteristic as shown in FIG. 13.

Figure 14:
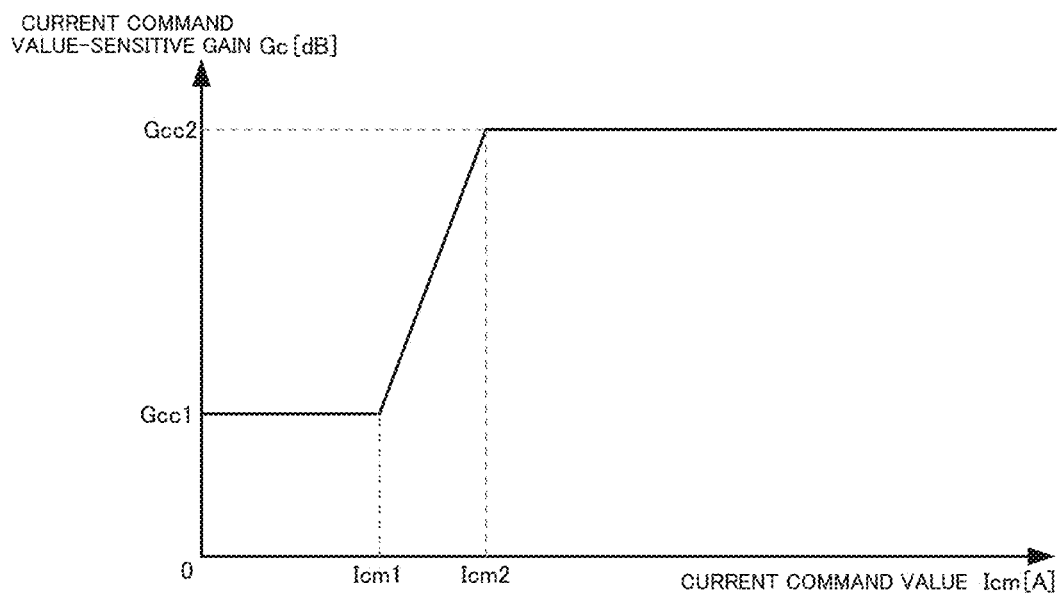
FIG. 14 is a characteristic diagram showing a characteristic example of the current command value-sensitive gain section.

The current command value-sensitive gain $G_c$ outputted from the current command value-sensitive gain section 450 has a characteristic, for example, as shown in FIG. 14, to the inputted current command value $I_{cm}$. That is, the current command value-sensitive gain $G_c$ is a constant gain $G_{cc1}$ when the current command value $I_{cm}$ is smaller than a predetermined current $I_{cm1}$, linearly (or nonlinearly) increases when the current command value $I_{cm}$ is equal to or larger than the predetermined current $I_{cm1}$ and is smaller than a predetermined current $I_{cm2}$ ($>I_{cm1}$), and holds a constant gain $G_{cc2}$ when the current command value $I_{cm}$ is equal to or larger than the predetermined current $I_{cm2}$. The predetermined current $I_{cm1}$ may be 0 [A].

The compensation sign estimating section 402 outputs a compensation sign SN1, which has a positive value (+1) or a negative value (−1) and indicates a hysteresis characteristic shown in FIGS. 15A and 15B, against the inputted current command value $I_{cm}$. The compensation sign SN1 is estimated based on zero-cross points of the current command value $I_{cm}$ as a reference. In order to suppress the chattering, the compensation sign SN1 has the hysteresis characteristic. The estimated compensation sign SN1 is inputted into the multiplying section 403.

The current command value-sensitive gain $G_o$ from the current command value-sensitive gain section 450 is inputted into the multiplying section 403. The multiplying section 403 outputs the current command value-sensitive gain $G_{cs}$ (=$G_c$×SN1) that the compensation sign SN1 is multiplied with the current command value-sensitive gain $G_c$. The current command value-sensitive gain $G_c$, is inputted into the multiplying sections 404d and 404q.

Since the optimal dead time compensation amount varies depending on the inverter applying voltage VR, the present example (the first example) calculates the dead time compensation amount depending on the inverter applying voltage VR and changes the dead time compensation amount. The configuration of the inverter applying voltage-sensitive gain calculating section 420 to output the voltage-sensitive gain $G_v$ by inputting the inverter applying voltage VR is shown in FIG. 16. The positive maximum value and the negative maximum value of the inverter applying voltage VR are limited in an input limiting section 421 and the inverter applying voltage VRI whose maximum value is limited is inputted into an inverter applying voltage/dead time compensation gain conversion table 422. The characteristic of the inverter applying voltage/dead time compensation gain conversion table 422 is shown, for example, in FIG. 17. The inverter applying voltages 9.0[V] and 15.0 [V] of inflection points and the voltage-sensitive gains "0.7" and "1.2" are presented as examples and are appropriately changeable. The calculated voltage-sensitive gain $G_v$ is inputted into the multiplying sections 431U, 431V and 431W.

Figure 18:
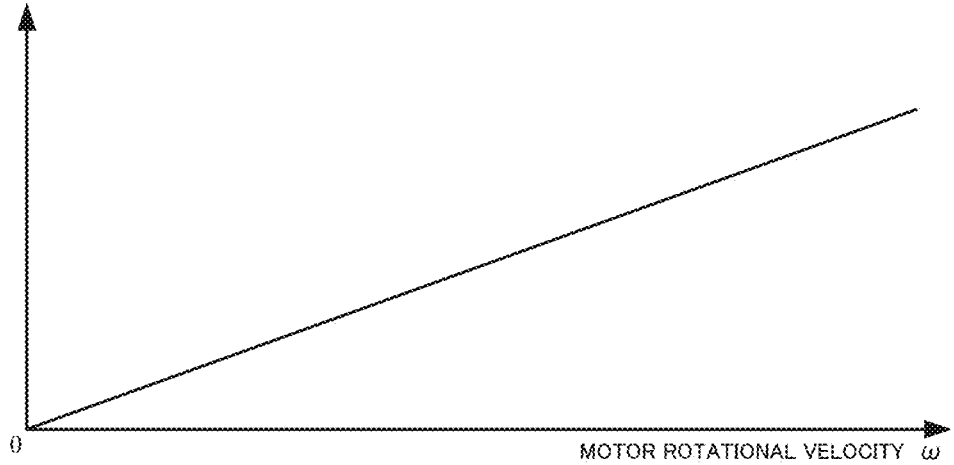
FIG. 18 is a characteristic diagram showing a characteristic example of a phase adjusting section.

In a case that the dead time compensation timing is hastened or is delayed in response to the motor rotational velocity co, the phase adjusting section 410 has a function to calculate the adjustment angle depending on the motor rotational velocity co. The phase adjusting section 410 has a characteristic as shown in FIG. 18 in a case of a lead angle control. The calculated phase adjustment angle Δθ is inputted into the adding section 421 and is added to the detected motor rotational angle θ. The motor rotational angle $\theta_m$ (=θ+Δθ) that is an added result at the adding section 421 is inputted into the angle-dead time compensation value function sections 430U, 430V and 430W, and the three-phase AC/dq-axes converting section 440.

Figure 19:
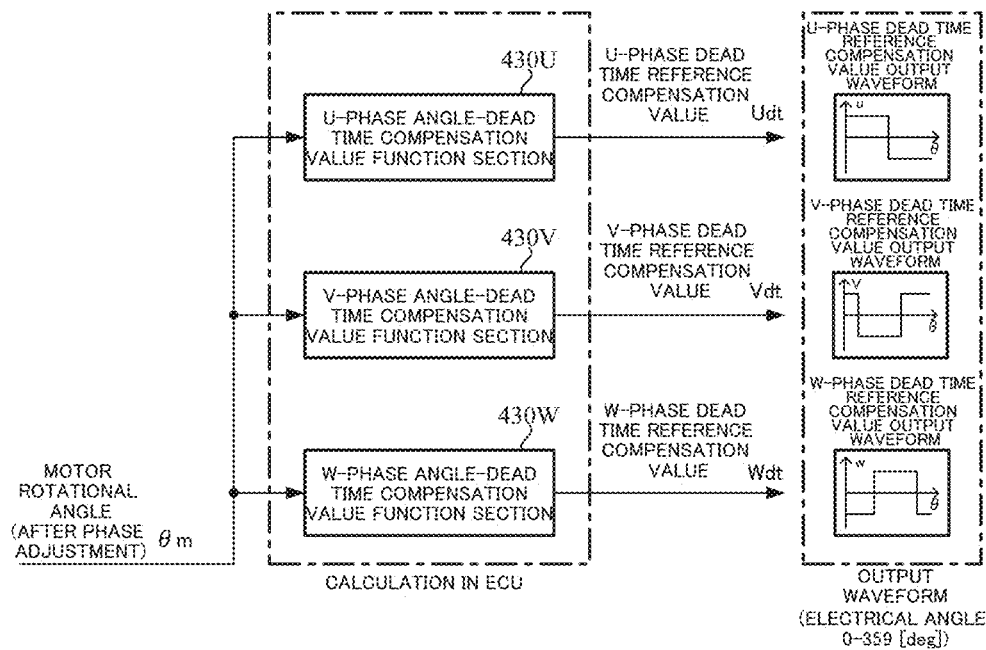
FIG. 19 is a diagram showing an operation example of a respective phase angle-dead time compensation value function section.

The angle-dead time compensation value function sections 430U, 430V and 430W, as shown in FIG. 19 in detail, respectively output respective phase rectangular wave dead time reference compensation values $U_{dt}$, $V_{dt}$ and $W_{dt}$ whose phases are shifted each other by 120 [deg] in a range of 0 [deg] to 359 [deg] in the electric angle, to the phase-adjusted motor rotational angle $\theta_m$. The angle-dead time compensation value function sections 430U, 430V and 430W treat the dead time compensation values, which are needed in the three-phases, as functions depending on the angle, calculates the dead time compensation values in the actual time of the ECU, and outputs the three-phase dead time reference compensation values $U_{dt}$, $V_{dt}$ and $W_{dt}$. The angle functions of the dead time reference compensation values are different depending on the characteristic of the dead time in the ECU.

The dead time reference compensation values $U_{dt}$, $V_{dt}$ and $W_{dt}$ are respectively inputted into multiplying sections 431U, 431V and 431W, and are multiplied with the voltage-sensitive gain $G_c$. The three-phase dead time compensation values $U_{dtc}$ (=$G_c \cdot U_{dt}$), $V_{dtc}$ (=$G_c \cdot V_{dt}$) and $W_{dtc}$ (=$G_c \cdot W_{dt}$) which are multiplied with the voltage-sensitive gain $G_c$ are inputted into the three-phase AC/dq-axis converting section 440. The three-phase AC/dq-axes converting section 440 converts the three-phase dead time compensation values $U_{dtc}$, $V_{dtc}$, and $W_{dtc}$ into the two-phase dq-axis compensation values $v_{da}^*$ and $v_{qa}^*$, synchronized with the motor rotational angle $\theta_m$. The compensation values $v_{da}^*$ and $v_{qa}^*$ are respectively inputted into the multiplying sections 404d and 404q, and are multiplied with the current command value-sensitive gain $G_{cs}$. The multiplied results in the multiplying sections 404d and 404q are the dq-axis compensation values CdB and CqB, and the compensation values CdB and CqB are respectively inputted into the switch sections 541 and 542 in the compensation value switching section 500.

Next, the dead time compensating section (C) 600 (the first example) will be described.

Figure 20:
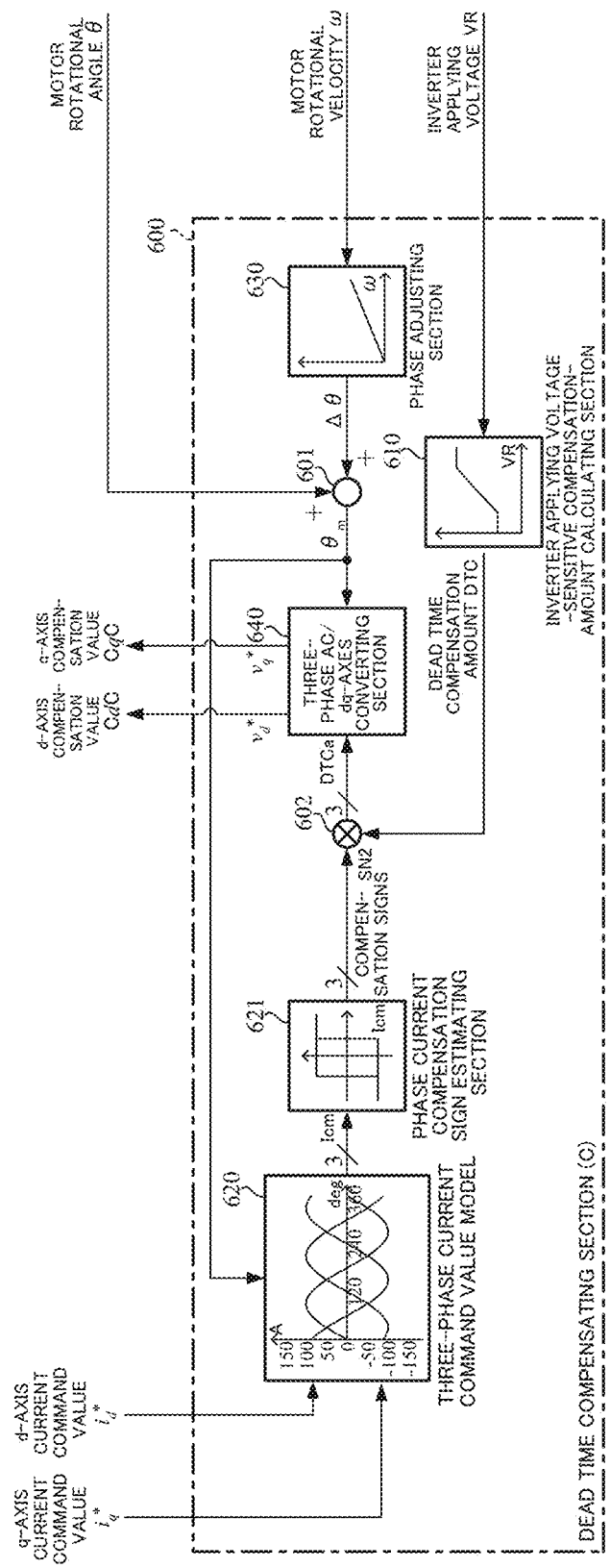
FIG. 20 is a block diagram showing a configuration example (the first example) of a dead time compensating section (C)

As shown in FIG. 20, the dead time compensating section (C) 600 comprises an adding section 601, a multiplying section 602, an inverter applying voltage-sensitive compensation-amount calculating section 610, a three-phase current command value model 620, a phase current compensation sign estimating section 621, a phase adjusting section 630 and a three-phase AC/dq-axes converting section 640. The motor rotational angle θ is inputted into the adding section 601, and the motor rotational velocity ω is inputted into the phase adjusting section 630. The inverter applying voltage VR is inputted into the inverter applying voltage-sensitive compensation-amount calculating section 610, and the phase-adjusted motor rotational angle $\theta_m$ calculated at the adding section 601 is inputted into the three-phase current command value model 620.

In a case that the dead time compensation timing is hastened or is delayed in response to the motor rotational velocity ω, the phase adjusting section 630 has a function to calculate the adjustment angle depending on the motor rotational velocity ω. The phase adjusting section 630 has a characteristic as shown in FIG. 18 in a case of a lead angle control. The calculated phase adjustment angle Δθ is inputted into the adding section 601 and is added with the detected motor rotational angle θ. The phase-adjusted motor rotational angle $\theta_m$ (=θ+Δθ) that is an added result at the adding section 601 is inputted into the three-phase current command value model 620 and the three-phase AC/dq-axes converting section 640.

Figure 21:
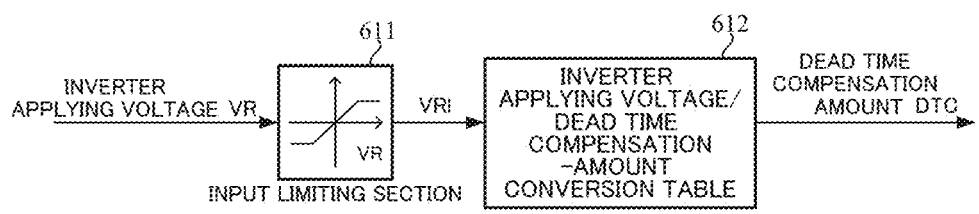
FIG. 21 is a block diagram showing a configuration example of an inverter applying voltage-sensitive compensation-amount calculating section.
Figure 22:
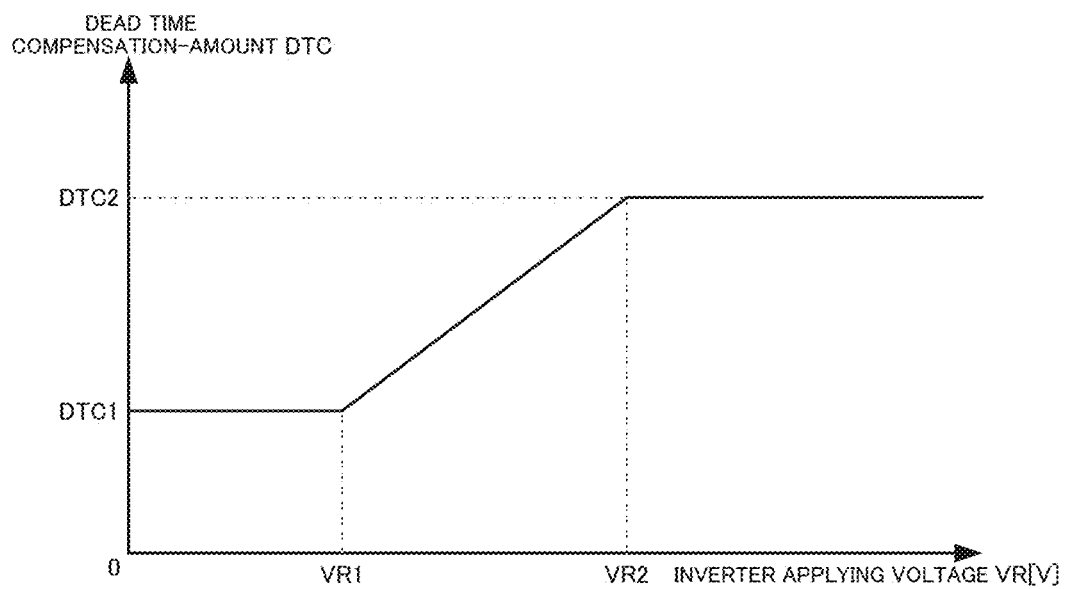
FIG. 22 is a characteristic diagram showing a characteristic example of the inverter applying voltage-sensitive compensation-amount calculating section.

Since the optimal dead time compensation amount varies depending on the inverter applying voltage VR, the present example (the first example) calculates the dead time compensation amount DTC depending on the inverter applying voltage VR and changes the dead time compensation amount DTC. The configuration of the inverter applying voltage-sensitive compensation-amount calculating section 610 to output the dead time compensation amount DTC by inputting the inverter applying voltage VR is shown in FIG. 21. The positive maximum value and the negative maximum value of the inverter applying voltage VR are limited at an input limiting section 611 and the inverter applying voltage VRI whose maximum value is limited is inputted into an inverter applying voltage/dead time compensation-amount conversion table 612. The characteristic of the inverter applying voltage/dead time compensation-amount conversion table 612 is shown, for example, in FIG. 22. That is, the dead time compensation amount DTC is a constant dead time compensation amount DTC1 when the inverter applying voltage VR is lower than a predetermined inverter applying voltage VR1, linearly (or nonlinearly) increase when the inverter applying voltage VR is equal to or higher than a predetermined inverter applying voltage VR2 (>VR1), and holds a constant dead time compensation amount DTC2 when the inverter applying voltage VR is equal to or higher than the predetermined inverter applying voltage VR2.

Figure 23:
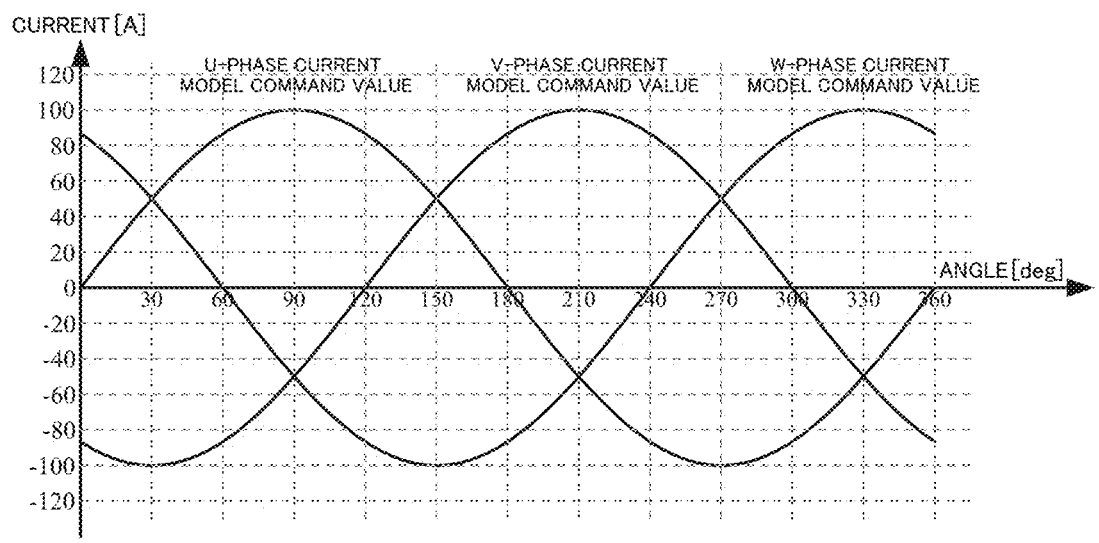
FIG. 23 is a waveform chart showing an example of an output waveform of a three-phase current command value model.

The d-axis current command value $i_d^*$, the q-axis current command value $i_q^*$ and the motor rotational angle $\theta_m$ are inputted into the three-phase current command value model 620. The three-phase current command value model 620 calculates the sinusoidal three-phase current model command values $I_{cm}$ whose phases are shifted each other by 120 [deg] as shown in FIG. 23 or obtains the three-phase current model command values $I_{cm}$ by using a table, from the dq-axis current command values $i_d^*$ and $i_q^*$ and the motor rotational angle $\theta_m$. The three-phase current model command values $I_{cm}$ are different depending on the motor type.

Figures 24A, 24B:
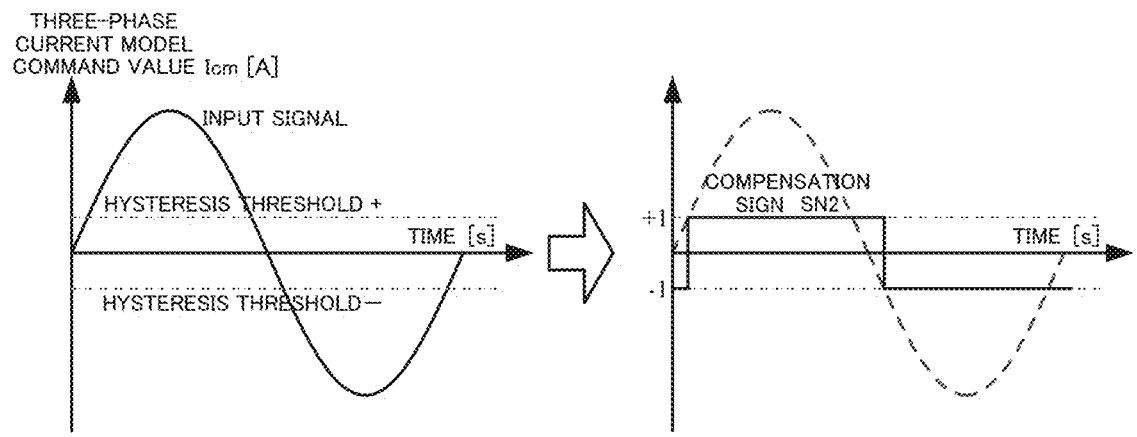
FIGS. 24A and 24B are waveform charts showing an operation example of a phase current compensation sign estimating section.

The three-phase current model command values $I_{cm}$ are inputted into a phase current compensation sign estimating section 621. The phase current compensation sign estimating section 621 outputs compensation signs SN2, which have a positive value (+1) or a negative value (−1) and indicate a hysteresis characteristic shown in FIGS. 24A and 24B, against the inputted three-phase current model command values $I_{cm}$. The compensation signs SN2 are estimated based on zero-cross points of the three-phase current model command values $I_{cm}$ as a reference. In order to suppress the chattering, the compensation signs SN2 have the hysteresis characteristic. The estimated compensation signs SN2 are inputted into the multiplying section 602.

The dead time compensation amount DTC from the inverter applying voltage-sensitive compensation-amount calculating section 610 is inputted into the multiplying section 602, and the multiplying section 602 outputs the dead time compensation amounts DTCa (=DTC×SN2) that the compensation signs SN2 are multiplied with the dead time compensation amount DTC. The dead time compensation amounts DTCa are inputted into the three-phase AC/dq-axis converting section 640, and the three-phase AC/dq-axes converting section 640 outputs the dq-axes compensation values CdC and CqC, synchronized with the motor rotational angle $\theta_m$. The compensation values CdC and CqC are respectively inputted into the switch sections 541 and 542 in the compensation value switching section 500.

Figure 25:
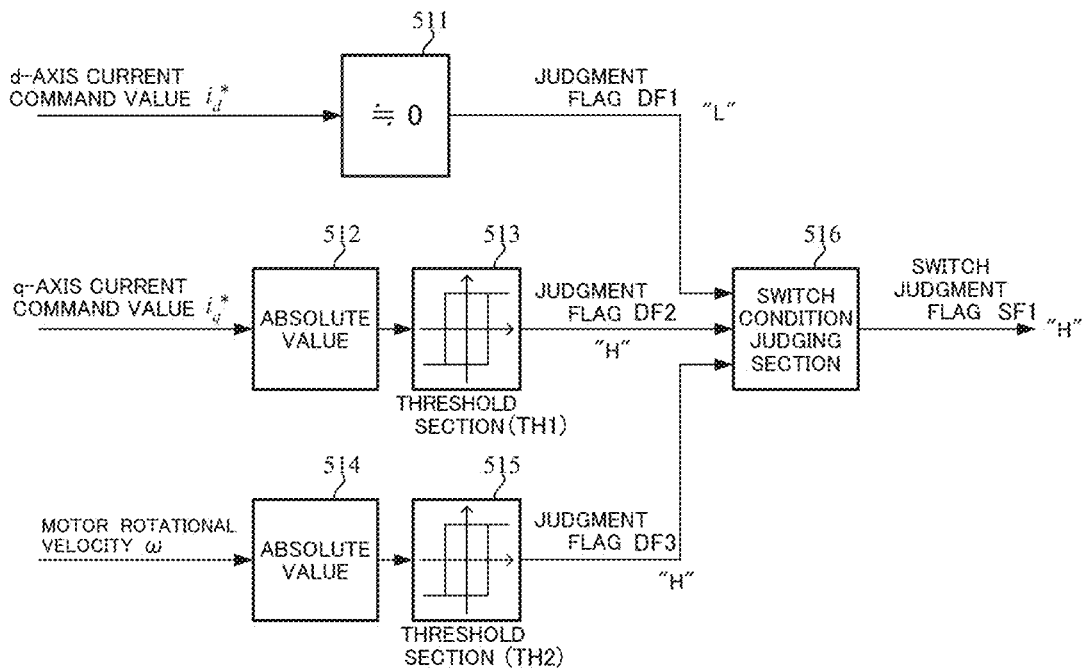
FIG. 25 is a block diagram showing a configuration example of a switch judging section.

The switch judging section 510 in the compensation value switching section 500 has a configuration shown in FIG. 25, and comprises a zero judging section 511 to output a judgment flag DF1 when the d-axis current command value $i_d^*$ is near zero (for example, the d-axis current command value $i_d^*$ is equal to or smaller than 0.1 [A]), an absolute value section 512 to obtain the absolute value $|i_q^*|$ of the q-axis current command value $i_q^*$, a threshold section 513 to have the hysteresis characteristic and output a judgment flag DF2 when the absolute value $|i_q^*|$ is equal to or larger than a predetermined threshold TH1, an absolute value section 514 to obtain the absolute value $|\omega|$ of the motor rotational velocity co, and a threshold section 515 to have the hysteresis characteristic and output a judgment flag DF3 when the absolute value $|\omega|$ is equal to or larger than a predetermined threshold TH2. The judgment flags DF1 to DF3 are inputted into a switch condition judging section 516, and the switch condition judging section 516 outputs a switch judgment flag SF1 when all the judgment flags DF1 to DF3 were inputted. For example, in a case that the judgment flag DF1 is "L", the judgment flag DF2 is "H" and the judgment flag DF3 is "H", the switch condition judging section 516 outputs the switch judgment flag SF1 that indicates "H". Here, "H" and "L" indicate an example of the logical value, and the logical values "H" and "L" may be inverted.

When the switch judgment flag SF1 is not outputted (is "OFF") (for example, SF1 is "L"), as shown in FIG. 5, the contact points of the switch sections 541 and 542 of the conditional branch section 540 are respectively connected to a1 and a2, and the compensation values CdB and CqB from the dead time compensating section (B) 400 are respectively outputted as the compensation values Cd and Cq. When the switch judgment flag SF1 is outputted (is "ON") (for example, SF1 is "H"), the contact points of the switch sections 541 and 542 are respectively switched from a1 and a2 to b1 and b2. As a result, the compensation values CdC and CqC from the dead time compensating section (C) 600 are respectively outputted as the compensation values Cd and Cq. The compensation values Cd and Cq from the conditional branch section 540 are inputted into the multiplying sections 552 and 554 in the gradual-changing switching section 550.

Figure 26:
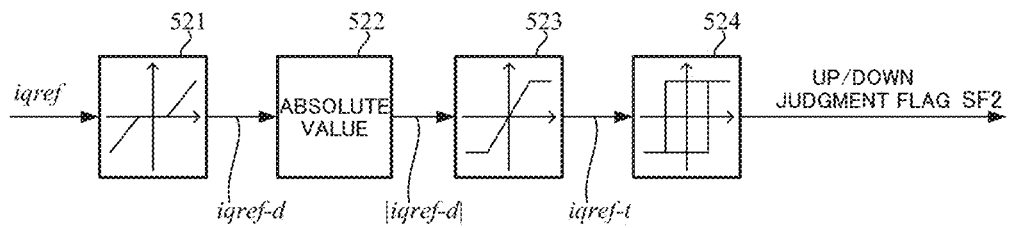
FIG. 26 is a block diagram showing a detail configuration example of a gradual-changing switch judging section (the first example)

The gradual-changing switch judging section 520 serves the steering assist command value iqref as the switch condition, has a dead band region to the input signal, and outputs the UP/DOWN judgment flag SF2 under the judgment condition having a hysteresis. The configuration example of the gradual-changing switch judging section 520 is shown in FIG. 26. The steering assist command value iqref is inputted into the dead band section 521 and is performed by the dead band process (for example, ±0.5 [A]). The dead-band-processed steering assist command value iqref-d is inputted into the absolute value section 522. The upper limit value and the lower limit value of the absolute value |iqref-d| from the absolute value section 522 are limited at the limiter 523. The steering assist command value iqref-t whose upper limit value and lower limit value are limited is inputted into the threshold section 524 having a hysteresis characteristic, and the threshold section 524 outputs the UP/DOWN judgment flag SF2 based on a magnitude relationship to the predetermined threshold. The UP/DOWN judgment flag SF2 is inputted into the gradual-changing ratio calculating section 530.

Since the signal is fluctuated due to the external factors (such as the road surface state (a gravel road, a slop or the like) and vibration of the handle, the vehicle body) near the on-center position of the handle, the dead band section 521 is disposed for avoid these external factors. The dead band section 521 removes the vibration component of the inputted steering assist command value iqref. The hysteresis characteristic of the threshold section 524 has functions that the chattering after the dead band process is prevented and the stabilization of the output is realized.

Figure 27:
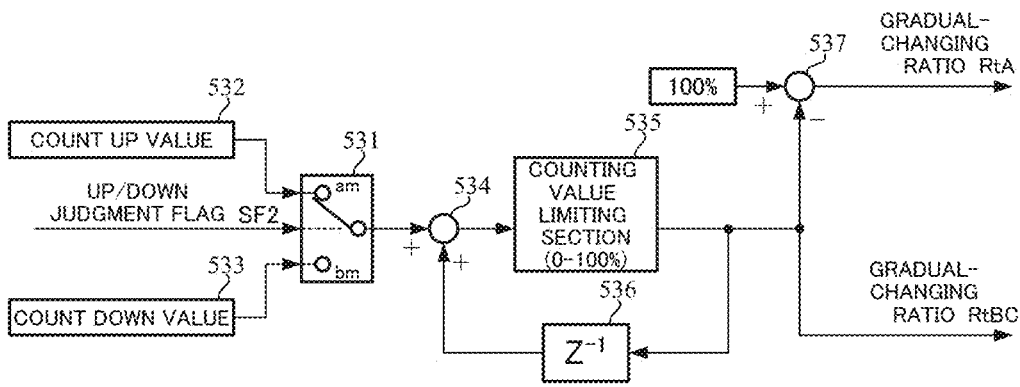
FIG. 27 is a block diagram showing a detail configuration example of a gradual-changing ratio calculating section (the first example)
Figure 28:
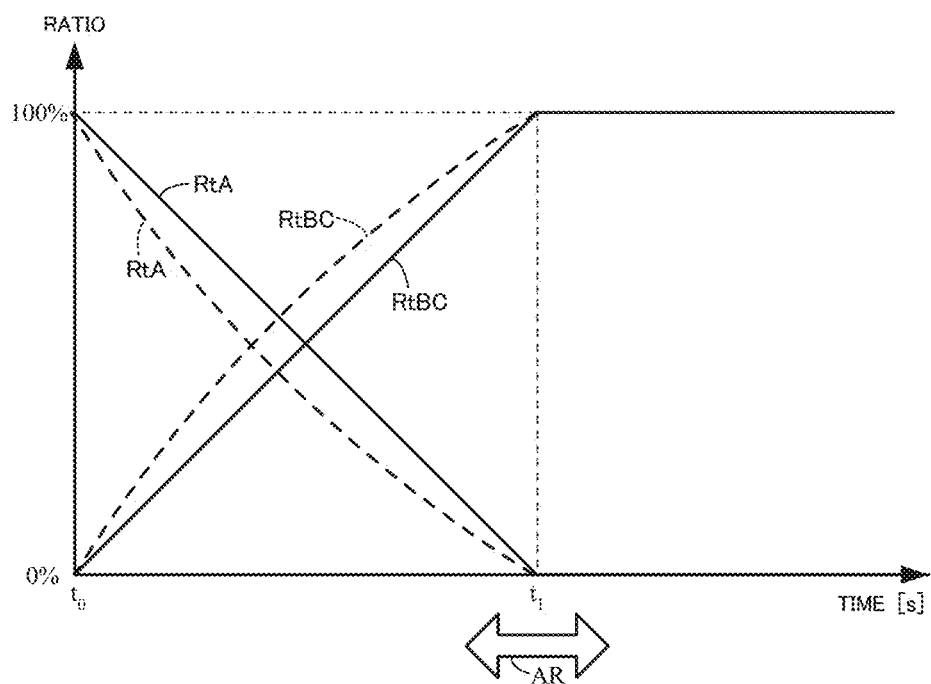
FIG. 28 is a characteristic diagram showing a characteristic example of the gradual-changing ratio.

The gradual-changing ratio calculating section 530 has a configuration shown in, for example, FIG. 27, and comprises a switch 531 that is switched to the contact point "am" or the contact point "bm" depending on "ON" (e.g., "H") or "OFF" (e.g., "L") of the UP/DOWN judgment flag SF2. For example, when the UP/DOWN judgment flag SF2 is inputted (SF2 is ON), the switch 531 is connected to the contact point am and outputs the COUNT-UP value 532 (e.g., +0.5%). When the UP/DOWN judgment flag SF2 is not inputted (SF2 is "OFF"), the switch 531 is switched to the contact point "bm" and outputs the COUNT-DOWN value 533 (e.g., −0.5%). The output of the switch 531 is inputted into an adding section 534, the maximum value of the added value is limited at a count value limiting section (0 to 100%) 535, and the limited added value is outputted as the gradual-changing ratio RtBC (%), is subtraction-inputted into a subtracting section 537 and is inputted into the adding section 534 via a holding unit ($Z^{-1}$) 536. The gradual-changing ratio RtBC is inputted into the subtracting section 537, and the subtracting section 537 outputs the gradual-changing ratio RtA (%) obtained by subtracting the gradual-changing ratio RtBC from a fixed value 100%. As a result, the gradual-changing ratio RtA linearly changes from 100% to 0%, the gradual-changing ratio RtBC linearly changes from 0% to 100% and the gradual-changing ratios RtA and RtBC can be obtained as shown in FIG. 28 by solid lines. The relationship which is represented by the below Expression 10 is always satisfied between the gradual-changing ratios RtA and RtBC. The gradual-changing ratios RtA and RtBC are inputted into the gradual-changing switching section 550.

$$RtA (\%)+RtBC (\%)=100\% \quad \text{[Expression 10]}$$

The switch term by the gradual-changing switch is from a time point $t_0$ to a time point $t_1$ in FIG. 28. The switch term is changeable by varying the magnitude of the counting value. For example, by respectively setting the COUNT-UP value 532 and the COUNT-DOWN value 533 to "+0.5%" and "−2%", the switch from the dead time compensation A to the dead time compensation B can be slow, the switch from the dead time compensation B to the dead time compensation A can be fast and the switch term can non-linearly be changed. By setting the COUNT-UP value 532 and the COUNT-DOWN value 533 to be larger or smaller, the switching speed can be adjusted.

As show in FIG. 28 by broken lines, the COUNT-UP value 532 and the COUNT-DOWN value 533 are nonlinearly changeable. The above nonlinearly changeable example is described below.

As shown in FIG. 5, the gradual-changing switching section 550 comprises the multiplying sections 551 to 554 and the adding sections 555 and 556. The compensation values CdA and CqA from the dead time compensating section (A) 200 are respectively inputted into the multiplying sections 551 and 553, and the gradual-changing ratio RtA from the gradual-changing ratio calculating section 530 is inputted into the multiplying sections 551 and 553. The compensation values Cd and Cq from the conditional branch section 540 are respectively inputted into the multiplying sections 552 and 554, and the gradual-changing ratio RtBC from the gradual-changing ratio calculating section 530 is inputted into the multiplying sections 552 and 554. The compensation value RtA·CdA that the compensation value CdA is multiplied with the gradual-changing ratio RtA is inputted into the adding section 555, and the compensation value RtBC·Cd that the compensation value Cd is multiplied with the gradual-changing ratio RtBC is inputted into the adding section 555. The d-axis dead time compensation value $v_d^*$ that is added with the compensation values RtA·CdA and RtBC. Cd at the adding section 555 is inputted into the adding section 121d. The compensation value "RtA·CqA" that compensation value CqA is multiplied with the gradual-changing ratio RtA is inputted into the adding section 556, and the compensation value "RtBC·Cq" that the compensation value Cq is multiplied with the gradual-changing ratio RtBC is inputted into the adding section 556. The q-axis dead time compensation value $v_q^*$ that is added with the compensation values "RtA·CqA" and "RtBC·Cq" at the adding section 556 is inputted into the adding section 121q.

In such a configuration, the operation example of the dead time compensation will be described with reference to a flowchart of FIG. 29.

In such a configuration, the operation example of the dead time compensation will be described with reference to a flowchart of FIG. 29. The dead time compensation is performed only once a control period (for example, 250 [μs]) at the same timing of the current control.

When the operation of the dead time compensation is started, the compensation values CdA and CqA are calculated at the dead time compensating section (A) 200 (Step S1), the compensation values CdB and CqB are calculated at the dead time compensating section (B) 400 (Step S2) and the compensation values CdC and CqC are calculated at the dead time compensating section (C) 600 (Step S3). These calculation orders are appropriately changeable.

The switch judging section 510 judges the switch based on the d-axis current command value $i_d^*$, the q-axis current command value $i_q^*$ and the motor rotational velocity co (Step S10), and judges whether the switch judgment flag SF1 is not outputted (is "OFF") or not (Step S11). When the switch judgment flag SF1 is "OFF", the compensation values CdB and CqB of the dead time compensating section (B) 400 are outputted from the conditional branch section 540 (Step S12). When the switch judgment flag SF1 is "ON", the compensation values CdC and CqC of the dead time compensating section (C) 600 are outputted from the conditional branch section 540 (Step S13). Under the middle speed or high speed steering condition that the compensation value "B" (CdB and CqB) or the compensation value "C" (CdC and CqC) is outputted, the gradual-changing ratio becomes "RtA=0%" and "RtBC=100%", "the compensation value "A"×0%+the compensation value "B or C"×100%" is calculated, and the switch compensation value "B or C" is outputted.

The steering assist command value iqref is inputted into the gradual-changing switch judging section 520, and the gradual-changing switch judging section 520 calculates the judgement of the gradual-changing switch based on the steering assist command value iqref (Step S14) and judges whether the UP/DOWN judgment flag SF2 is "ON" or not (Step S15). In a case that the UP/DOWN judgment flag SF2 is "ON", the COUNT-UP value 532 is outputted (Step 16), and in a case that the UP/DOWN judgment flag SF2 is "OFF", the COUNT-DOWN value 533 is outputted (Step S17). The output value is added to the previous counting value stored in the memory (the holding unit 536) at the adding section 534 (Step S20). The counting value which is added at the adding section 534 is limited at the counting value limiting section 535 (Step S21), and the limited counting value is stored in the memory (the holding unit

536) (Step S22). The UP/DOWN count process is performed only once a control period (e.g., 250 [μs]), the counting value is stored in the memory, and the UP process or the DOWN process to the stored counting value is performed once at the next control period.

The gradual-changing ratio calculating section 530 calculates the gradual-changing ratios RtA and RtBC based on the outputted counting value (Step S23). The gradual-changing ratio RtA is inputted into the multiplying sections 551 and 553 in the gradual-changing switching section 550, the gradual-changing ratio RtBC is inputted into the multiplying sections 552 and 554 in the gradual-changing switching section 550, and the gradual-changing switch is performed (Step S24). The respective multiplied results at the multiplying sections 551 and 552 are added at the adding section 555, and the added result is outputted as the dead time compensation value $v_d^*$. The respective multiplied results at the multiplying sections 553 and 554 are added at the adding section 556, and the added result is outputted as the dead time compensation value $v_q^*$ (Step S25).

Figure 29:
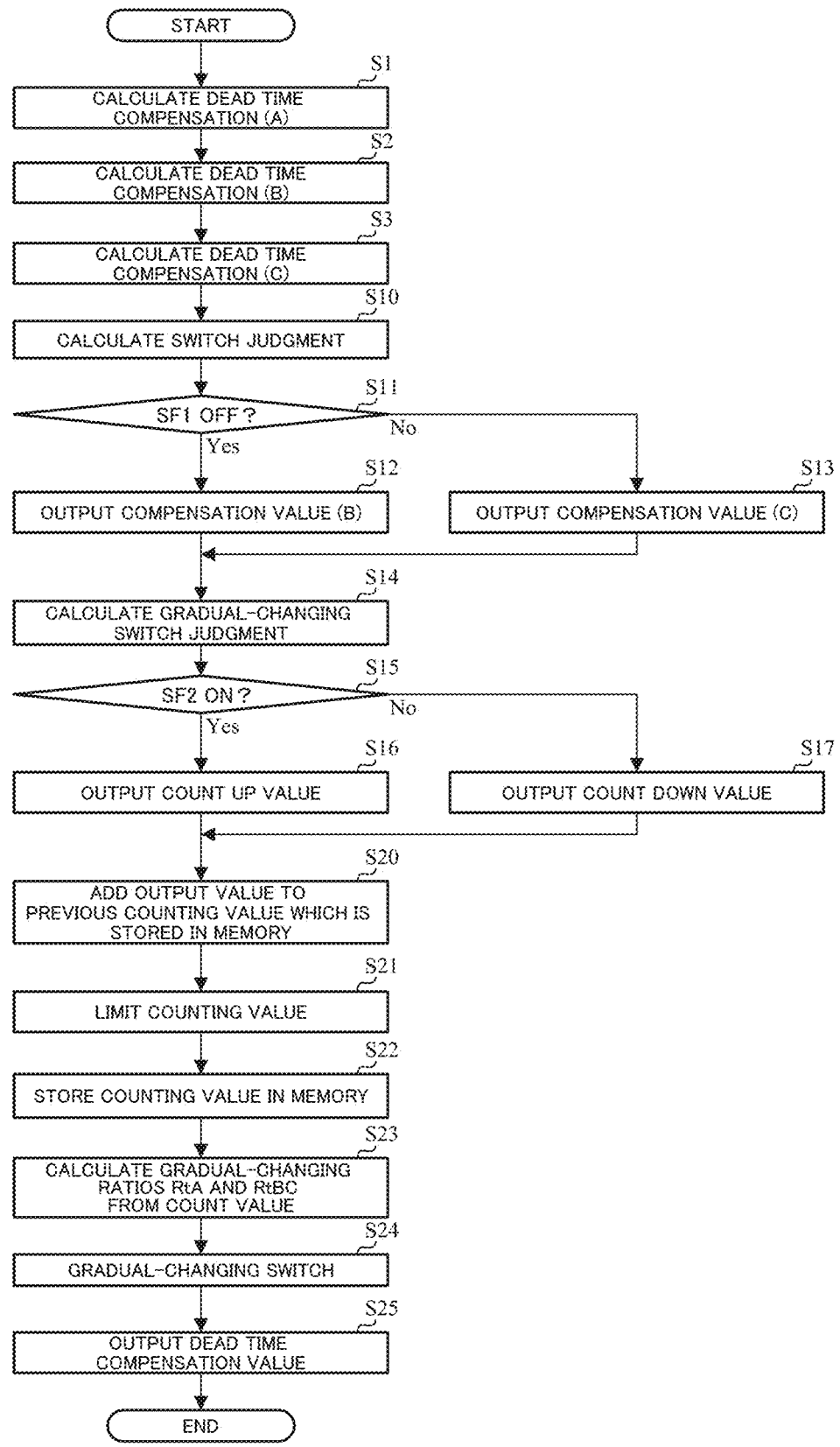
FIG. 29 is a flowchart showing an operation example of dead time compensation.
Figure 30:
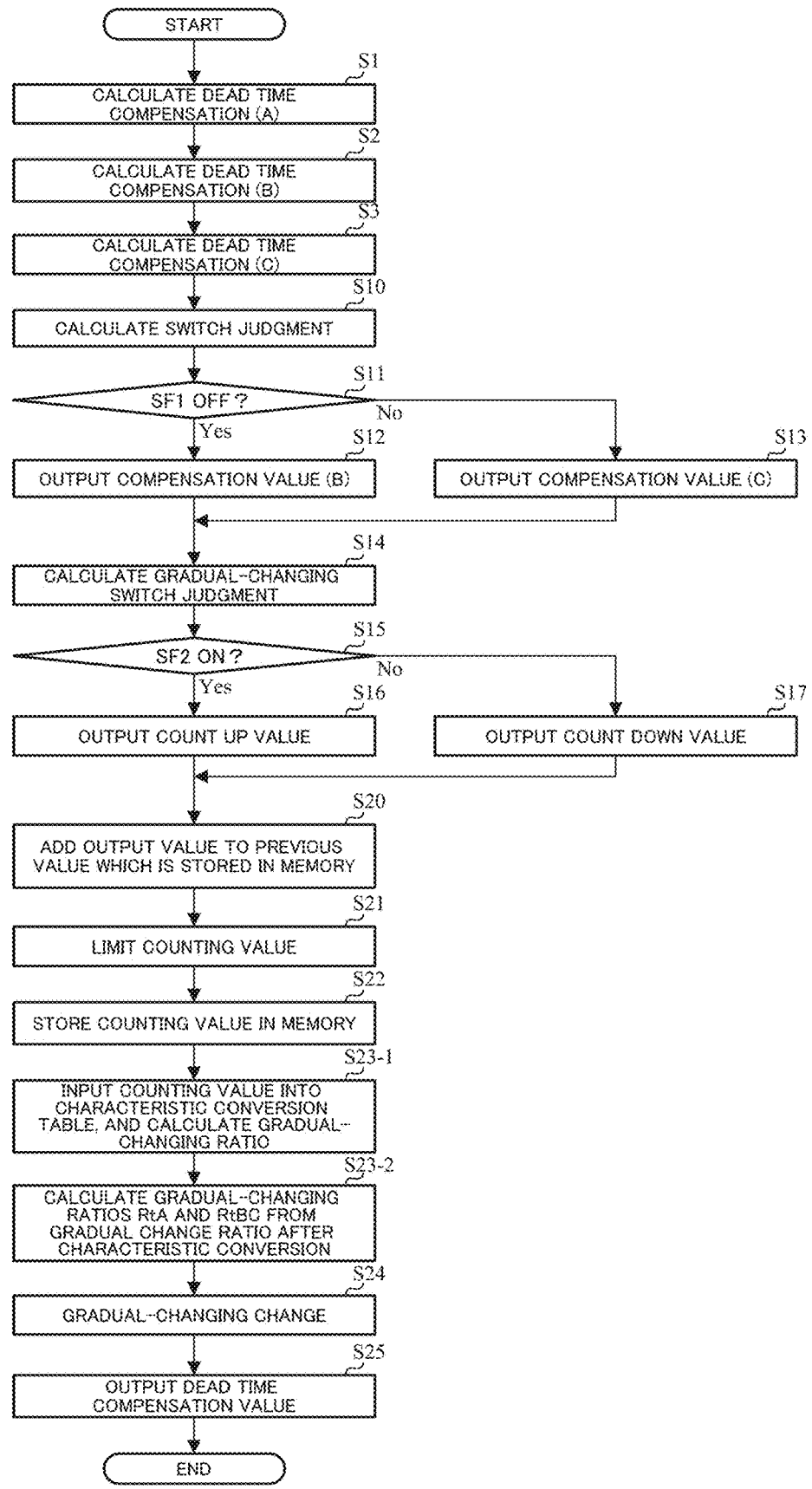
FIG. 30 is a flowchart showing another operation example of the dead time compensation.

With respect to the calculation of the gradual-changing ratio, as shown in FIG. 30 corresponding to FIG. 29, the counting value from the counting value limiting section 535 is inputted into the characteristic conversion table, the gradual-changing ratios are calculated (Step S23-1), and the gradual-changing ratios RtA and RtBC may be calculated from the gradual-changing ratios after the characteristic conversion is performed (Step S23-2).

Figure 31:
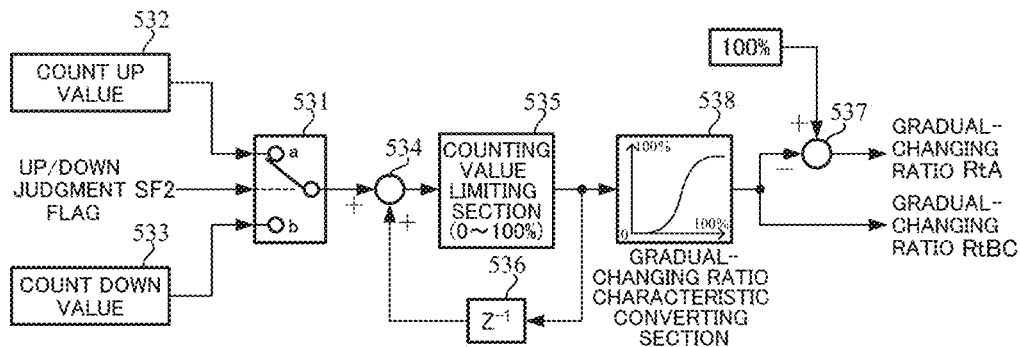
FIG. 31 is a block diagram showing a detail configuration example of the gradual-changing ratio calculating section (the second example)
Figure 32:
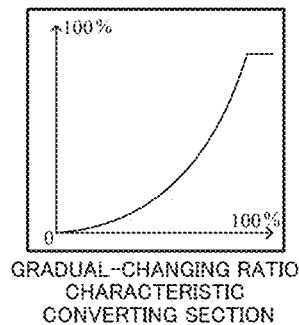
FIG. 32 is a block diagram showing a detail configuration example of the gradual-changing ratio calculating section (the third example)

In order to achieve the excellent grip feeling and the appropriate switching speed, the gradual-changing ratios can be changed nonlinearly. That is, in a case that the grip feeling is important, the change of the gradual-changing ratios may be slow, and in a case that the grip feeling is not important, the change of the gradual-changing ratios may be fast. As shown in FIG. 28 by the broken line, in a case that the gradual-changing ratios at the gradual-changing ratio calculating section 530 change nonlinearly, the configuration of FIG. 31 can be served as the nonlinear function (the second example). In the second example of FIG. 31, a gradual-changing ratio characteristic converting section 538 which is configured as the nonlinear element is disposed at a subsequent stage of the counting value limiting section 535, the gradual-changing ratio RtBC is outputted from the gradual-changing ratio characteristic converting section 538 and is subtraction-inputted into the subtracting section 537. The gradual-changing ratio characteristic converting section 538 may have a characteristic that the ratios change nonlinearly over the all regions as shown in FIG. 31, or may have a characteristic that the ratios saturate in a part of the regions as shown in FIG. 32 (the third example).

Figure 33:
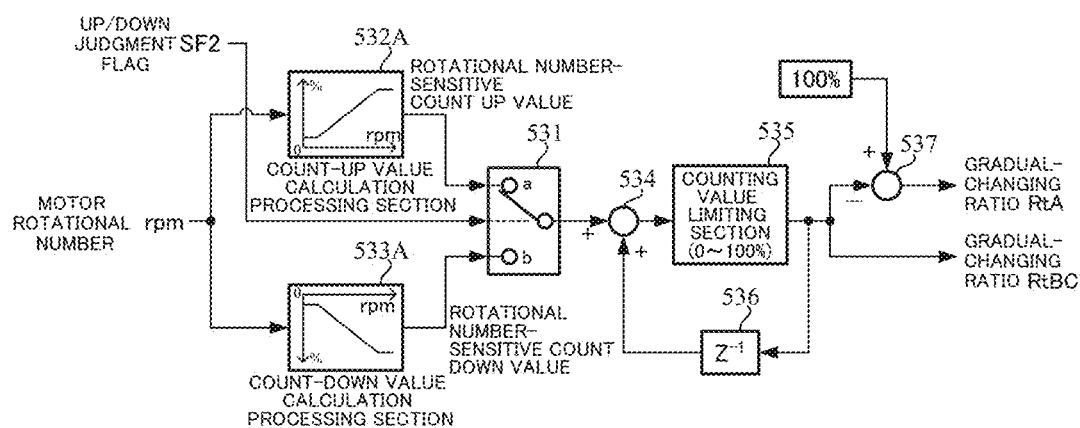
FIG. 33 is a block diagram showing a detail configuration example of the gradual-changing ratio calculating section (the fourth example)

As shown in FIG. 33, with respect to the dead time compensation value switch, the increase or the decrease of the UP/DOWN counting value can be adjusted by the conditions such as the motor rotational number rpm, the switch speed can also be adjusted by increasing or decreasing the counting value, and then the time point t1 can be changed along the arrow AR. In a case of the region of the motor rotational number rpm where the grip feeling is important, the changes of the gradual-changing ratios become slow. In a case of the region of the motor rotational number rpm where the grip feeling is not important, the changes of the gradual-changing ratios become fast. FIG. 33 shows a configuration example (the fourth example) of the above case, and the fourth example includes a COUNT-UP value calculation processing section 532A to input the motor rotational number rpm and output the rotational number-sensitive COUNT-UP value, a COUNT-DOWN value calculation processing section 533A to input the motor rotational number rpm and output the rotational number-sensitive COUNT-DOWN value. The rotational number-sensitive COUNT-UP value is inputted into the contact point "a" and the rotational number COUNT-DOWN value is inputted into the contact point "b". As shown in FIG. 33, the COUNT-UP value calculation processing section 532A has a characteristic that the COUNT-UP value is a constant value until the motor rotational number rpm becomes a predetermined value, and increases when the motor rotational number rpm is equal to or higher than the predetermined value. As shown in FIG. 33, the COUNT-DOWN value calculation processing section 533A has a characteristic that the COUNT-DOWN value is a constant value until the motor rotational number rpm becomes a predetermined value, and decreases when the motor rotational number rpm is equal to or higher than the predetermined value.

Figure 34:
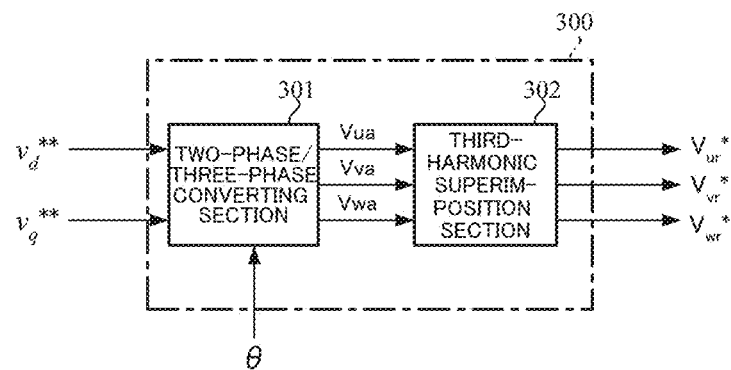
FIG. 34 is a block diagram showing a configuration example of a space vector modulating section.

Next, the space vector modulation will be described. As shown in FIG. 34, the space vector modulating section 300 may have a function that converts the two-phase voltages $v_d^{}$ and $v_q^{}$ in the d-q space into the three-phase voltages $V_{ua}$, $V_{va}$ and $V_{wa}$, and superimposes the third-harmonic on the three-phase voltages $V_{ua}$, $V_{va}$ and $V_{wa}$. For example, the method of the space vector modulation that the applicant proposes in Japanese Unexamined Patent Publication No. 2017-70066, WO/2017/098840 and the like may be used.

Figure 35:
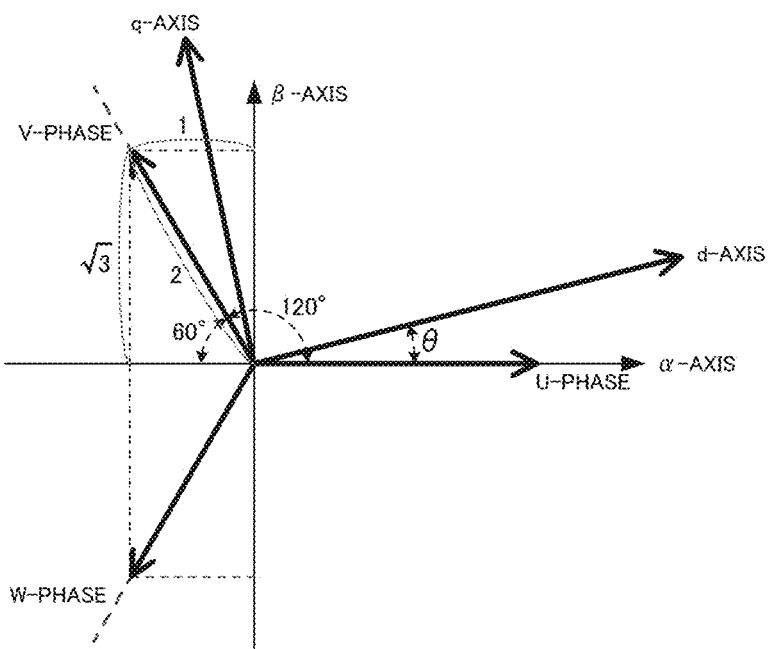
FIG. 35 is a diagram showing an operation example of the space vector modulating section.

That is, the space vector modulation has a function that performs a following coordinate transformation based on the voltage command values $v_d^{}$ and $v_q^{}$ in the d-q space, the motor rotational angle θ and sector number n (#1 to #6), and controls the rotation of the motor by supplying switching patterns S1 to S6 to the motor. The switching patterns S1 to S6 are corresponding to the sectors #1 to #6, and control turning-ON/turning-OFF of the switching devices (the upper arm Q1, Q3 and Q5, and the lower arm Q2, Q4 and Q6) of the inverter with the bridge configuration. With respect to the coordinate transformation, in the space vector modulation, the voltage command values $v_d^{}$ and $v_q^{}$ perform the coordinate transformation to the voltage vectors Vα and Vβ in the α-β coordinate system based on an Expression 11. A relationship between the coordinate axes that are used in this coordinate transformation and the motor rotational angle θ is shown in FIG. 35.

$$\begin{bmatrix} V\alpha \\ V\beta \end{bmatrix} = \begin{bmatrix} \cos\theta & -\sin\theta \\ \sin\theta & \cos\theta \end{bmatrix} \begin{bmatrix} v_d^{} \\ v_q^{} \end{bmatrix} \quad \text{[Expression 11]}$$

A relationship shown in an Expression 12 between a target voltage vector in the d-q coordinate system and a target voltage vector in the α-β coordinate system is existed. The absolute value of the target voltage vector is conserved.

$$|V| = \sqrt{(v_d^{})^2 + (v_q^{})^2} = \sqrt{V\alpha^2 + V\beta^2} \quad \text{[Expression 12]}$$

Figure 36:
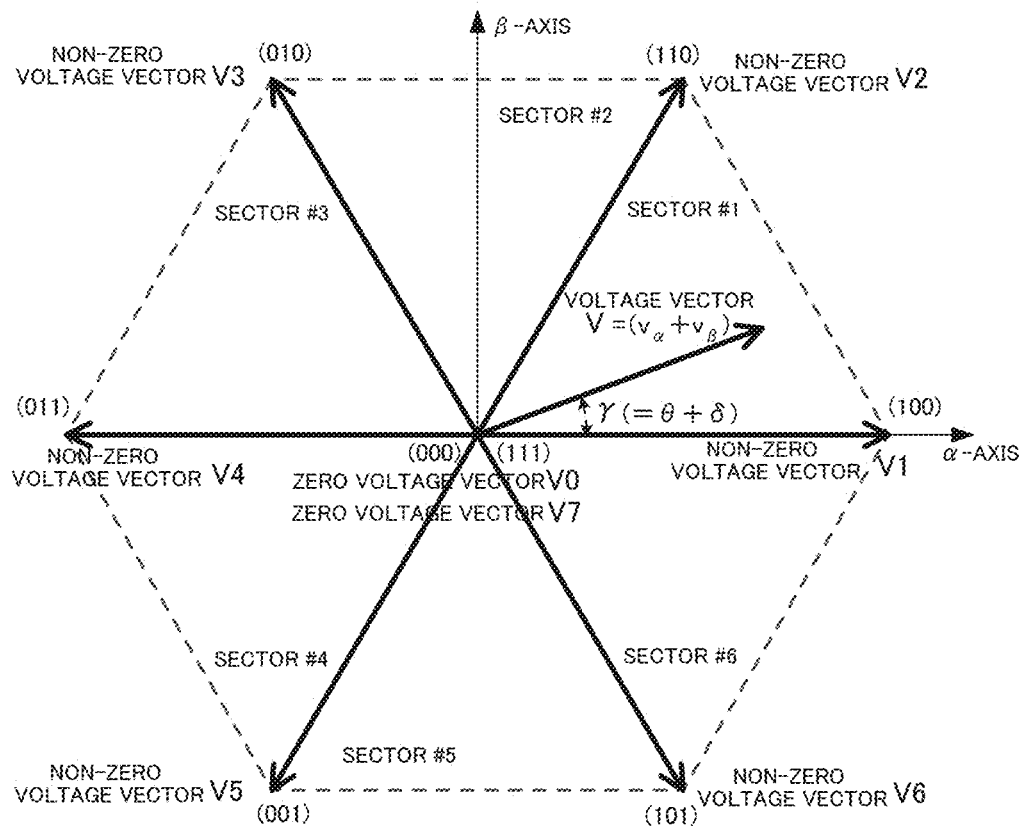
FIG. 36 is a diagram showing an operation example of the space vector modulating section.

In the switching pattern of the space vector control, the output voltage is defined by using eight discrete reference voltage vectors V0 to V7 (non-zero voltage vectors V1 to V6 that the phase differs every π/3 [rad] and zero voltage vectors V0 and V7) that are shown in the space vector diagram of FIG. 36, depending on the switching patterns S1 to S6 of the switching devices (the FETs) (Q1 to Q6). The selection of these reference output voltage vectors V0 to V7 and the occurring time are controlled. By using six regions sandwiched between adjacent reference output voltage vectors, the space vector can be divided into the six sectors #1 to #6, and the target voltage vector V is belong to any one of the sectors #1 to #6, and can be assigned to the sector number. The rotational angle γ in the α-β coordinate system of the target voltage vector V can determine which sector that is separated into a regular hexagon in the α-β space, as shown in FIG. 36, is existed in the target voltage vector V that is a synthetic vector of Vα and Vβ. The rotational angle γ is determined by a sum of the rotational angle θ of the motor and a phase δ obtained from the relationship of the voltage command values $v_d^{}$ and $v_q^{}$ in the d-q coordinate system (γ=θ+δ).

Figure 37:
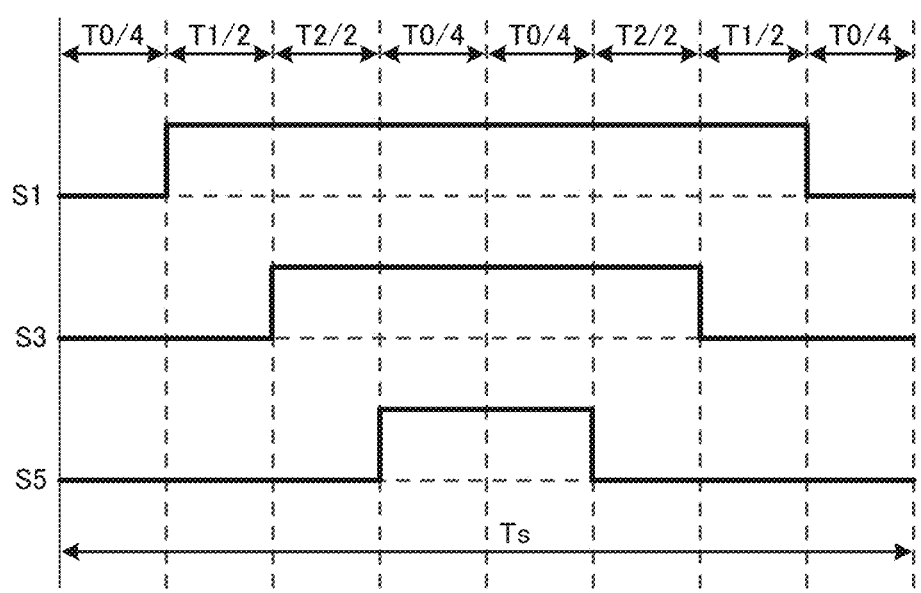
FIG. 37 is a timing chart showing an operation example of the space vector modulating section.

FIG. 37 shows a basic timing chart that the switching pulse width and the timing in the turning-ON/turning-OFF signals S1 to S6 to the switching devices (the FETs) are determined in order to output the target voltage vector from the inverter by a digital control by means of the switching patterns S1, S3 and S5 of the inverter in the space vector control. The space vector modulation performs the calculation and the like in every defined sampling period Ts, and outputs the respective pulse widths and the timings in the switching patterns S1 to S6 to which the calculation result is transformed in the next sampling period Ts.

The space vector modulation generates the switching patterns S1 to S6 depending on the sector number that is obtained based on the target voltage vector V. In FIG. 37, in a case of the sector number #1 (n=1), one example of the switching patterns S1 to S6 of the switching devices (the FETs) in the inverter is shown. The signals S1, S3 and S5 show the gate signals of the switching devices Q1, Q3 and Q5 that are corresponding to the upper arm. The horizontal axis denotes a time, and Ts is corresponding to the switching period and is divided into eight periods, T0/4, T1/2, T2/2, T0/4, T0/4, T2/2, T1/2 and T0/4. The periods T1 and T2 are the time depending on the sector number n and the rotational angle γ.

Figure 38:
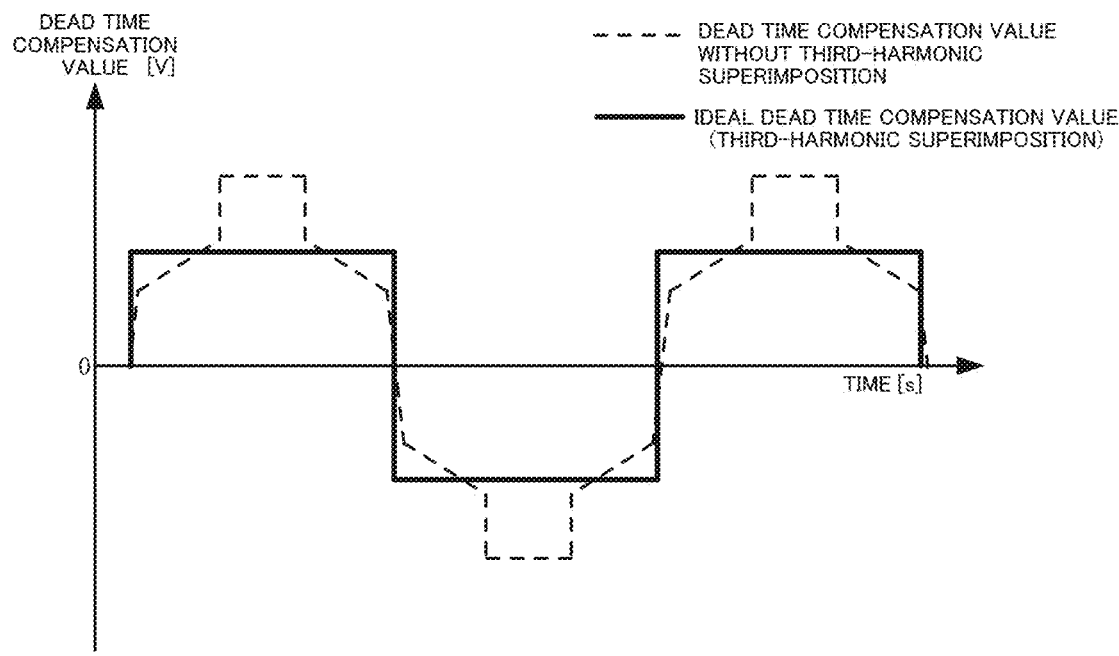
FIG. 38 is a waveform chart showing an effect of the space vector modulation.

In a case that the space vector modulation is not performed, the dead time compensation of the present invention is applied on the dq-axis, and the dead time compensation value waveform (the U-phase waveform) that the dq-axis/three-phase converting is performed to only the dead time compensation value is shown in a waveform represented by a broken line of FIG. 38 that the third-order component is removed. The same phenomena are exhibited in the V-phase and the W-phase. By applying the space vector modulation instead of the dq-axes/three-phase converting, the third-harmonic can be superimposed on the three-phase signals, the third-order component that is removed by the three-phase converting can be compensated, and the ideal dead time compensation waveform that is shown in a solid line of FIG. 38 can be generated.

Figure 39:
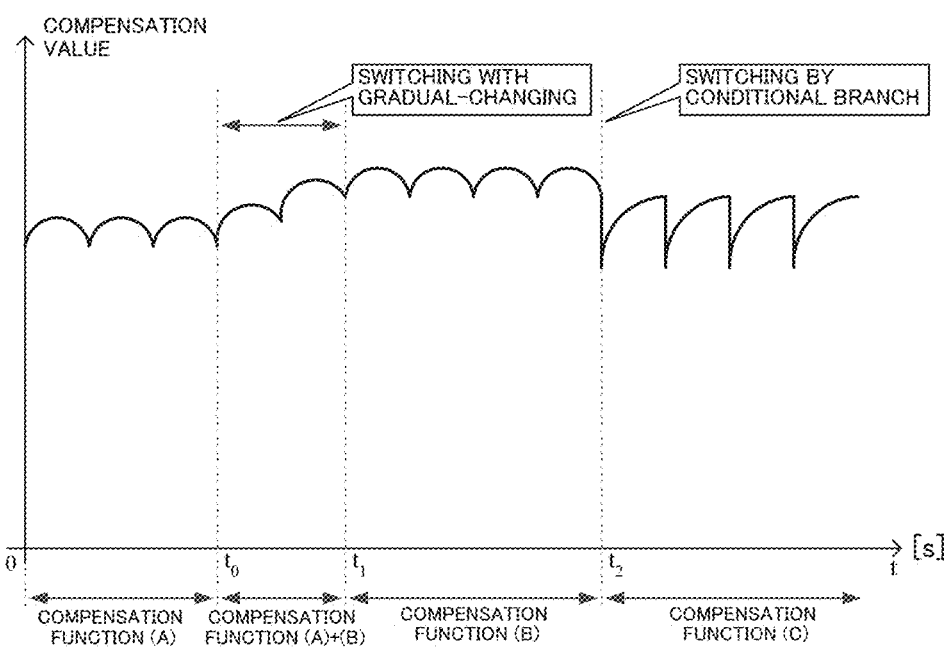
FIG. 39 is a waveform chart showing an example of a switch operation in the dead time compensation value of the present invention.

FIG. 39 shows the switch behaviors of the dead time compensation functions (A), (B) and (C) according to the first embodiment of the present invention. The electric power steering apparatus operates the dead time compensation function (A) until the time point $t_0$. The switch by the gradual-changing is occurred at the time point $t_0$. The electric power steering apparatus operates the dead time compensation function "(A)+(B)" from the time point $t_0$ to the time point $t_1$, and the operation is completely switched to the dead time compensation function (B) at the time point $t_1$, and is instantaneously switched to the dead time compensation function (C) by the conditional branch at the time point $t_2$.

When the operation is switched to the dead time compensation having a different characteristic (from the time point $t_0$ to the time point $t_1$), the differences of the compensation amount and the phase are existed. In a case that the operation is simply switched from the dead time compensation function (A) to the dead time compensation function (B), the deviation in a step form is occurred in the compensation value due to the difference of the characteristic and then the torque ripple is occurred. For example, in a case that the compensation amount of the dead time compensation function (B) in switching is set to "1.00", the compensation amount of the dead time compensation function (A) is in a range of "0.92" to "0.95", and both are different. Particularly, in the low load and low speed steering in which the current amount flowing to the motor is small, the influence of the dead time compensation amount is large (this is because the dead time compensation voltage is higher than the command voltage such as the PI-control). Even in a case that the deviation in a small step form is occurred, the deviation makes the torque ripple be occurred. In the first embodiment, the two dead time compensation values are switched using the gradual-changing. By setting the transition period and making the deviation be a sweeping shape, the torque ripple is not occurred and the driver who steers the handle does not perceive when the compensation function is switched.

For example, the dead time compensation function (A) is a terminal voltage feedback-type dead time compensation function, and can perform the accurate compensation for automatically calculating the optimal compensation sign and the optimal compensation amount in the low load and low speed steering state that the estimation of the compensation sign and the adjustment of the compensation amount are difficult (in a state that the handle is slowly steered to the left or to the right near the on-center position). The dead time compensation function (B) is an angle feedforward-type dead time compensation function, and can perform the accurate compensation because the ideal dead time compensation value is incorporated into the compensation value in feedforward in the low speed and middle speed steering state that the d-axis current is not needed (in a state that the handle is steered at the constant velocity, is gradually steered forward or the like). Since the dead time compensation value is calculated depending on the angle, in the steering load regions except for the low load steering region (for example, the region that the current command value is 0 [A] to 4 [A]), even in a case that the noise or the small ripple is existed in the detection current, the stable compensation can be performed without being affected to the calculation of the compensation value.

Figure 40:
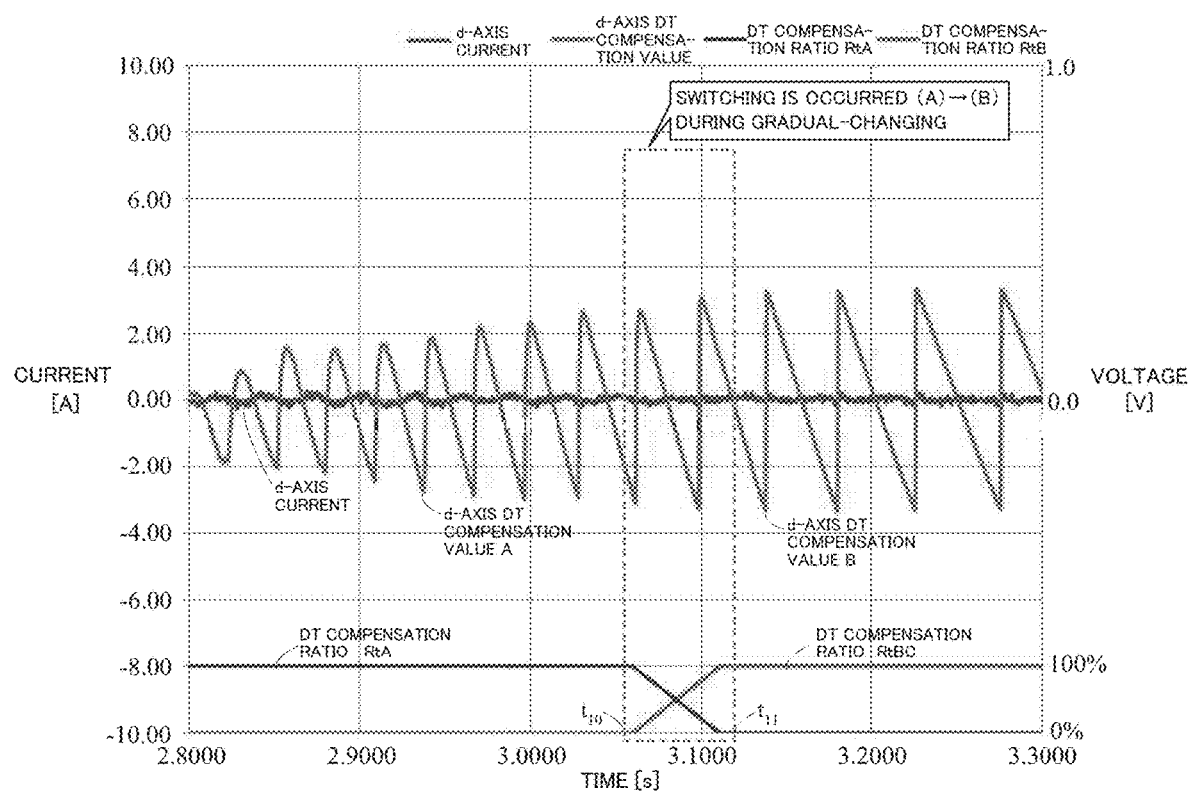
FIG. 40 is a waveform chart showing an effect of the present invention (the first embodiment)
Figure 41:
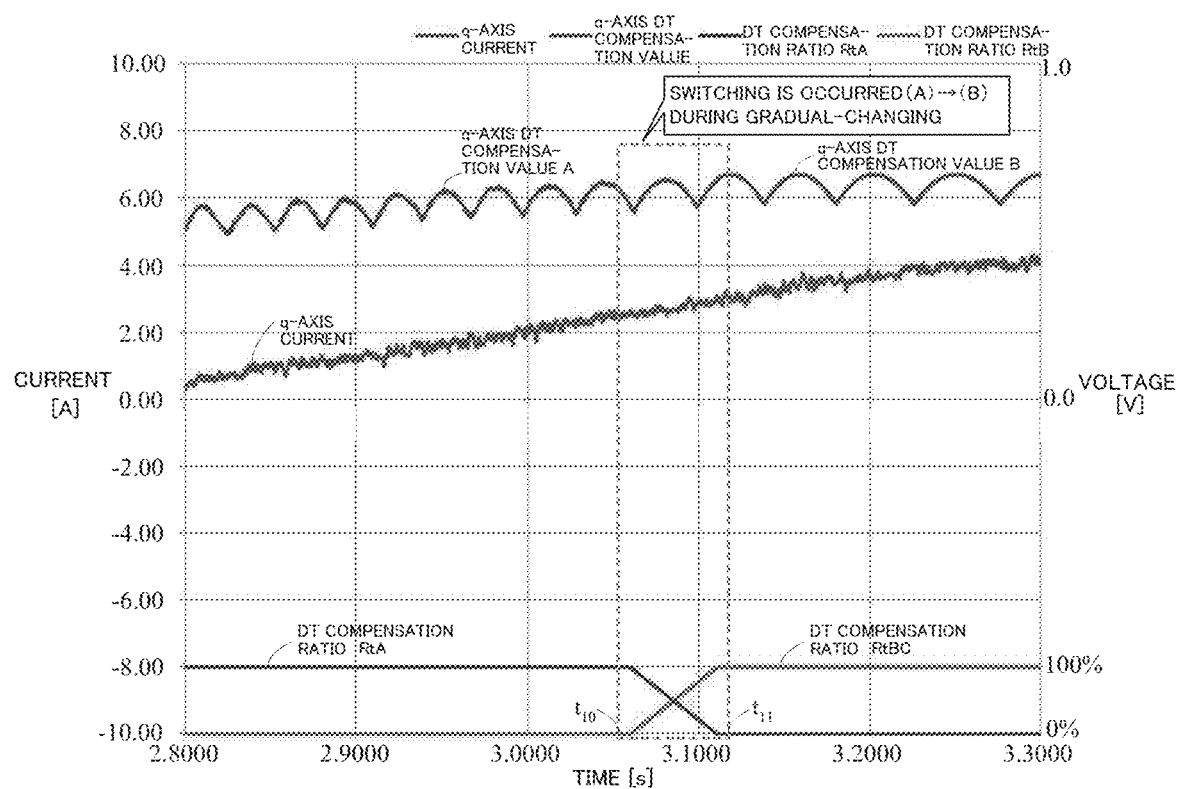
FIG. 41 is a waveform chart showing an effect of the present invention (the first embodiment)
Figure 42:
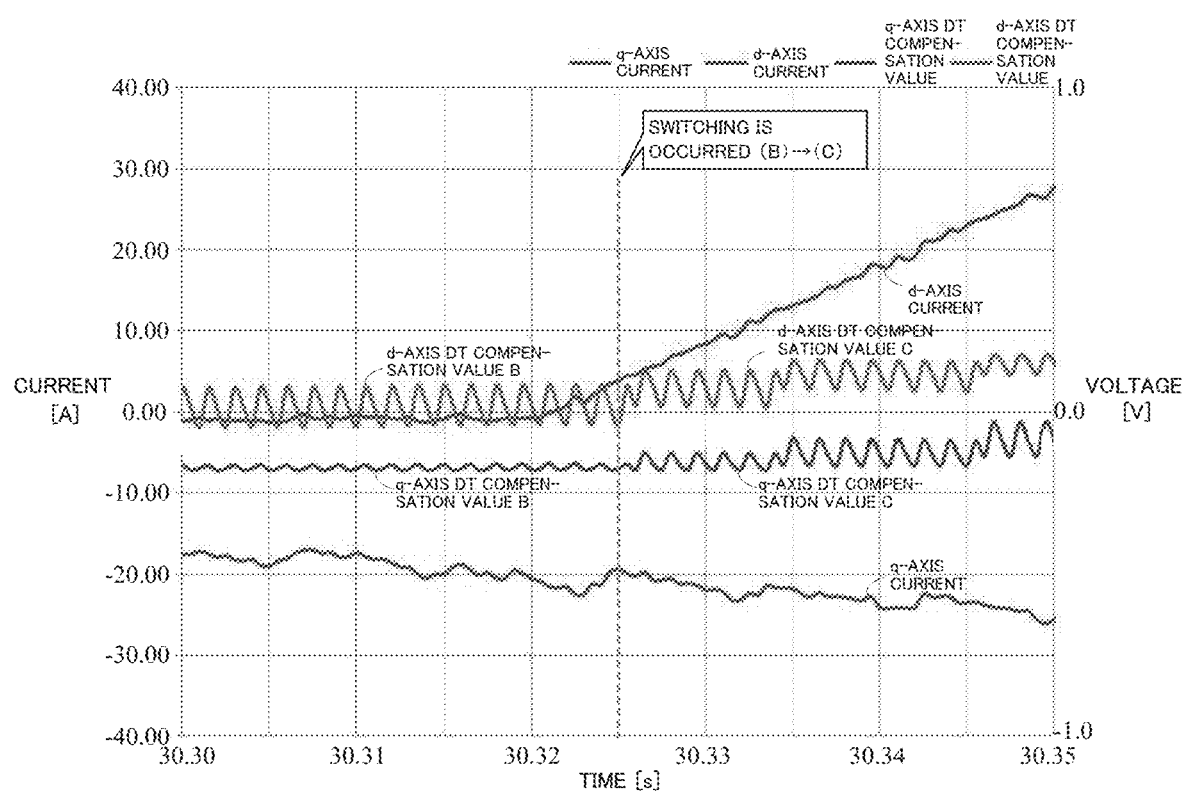
FIG. 42 is a waveform chart showing an effect of the present invention (the first embodiment)

FIGS. 40 to 42 show validation results of the present invention in a bench test apparatus that the actual vehicle is simulated. FIG. 40 shows the d-axis current and the d-axis dead time compensation value, and FIG. 41 shows the q-axis current and the q-axis dead time compensation value. In the low speed and low load steering state, since the dead time compensation of the present invention shown in FIGS. 40 and 41 is performed, even when the dead time compensation value is switched from "A" to "B", it is confirmed that the distortion in a step form is not occurred in the d-axis and q-axis dead time compensation values and the distortion is not occurred in the waveforms of the d-axis and q-axis currents. It is also understood that the torque ripple in switching is not occurred in steering the handle. In a state that steering forward is performed from the middle speed to the high speed, as shown in FIG. 42, when the dead time compensation of the present invention is adapted and the dead time compensation value is switched, it is confirmed that the waveform distortions of the d-axis and q-axis currents due to the influence of the dead time are not occurred even in a case that the current control characteristic is changed when the d-axis current begins to flow to the motor.

Figure 43:
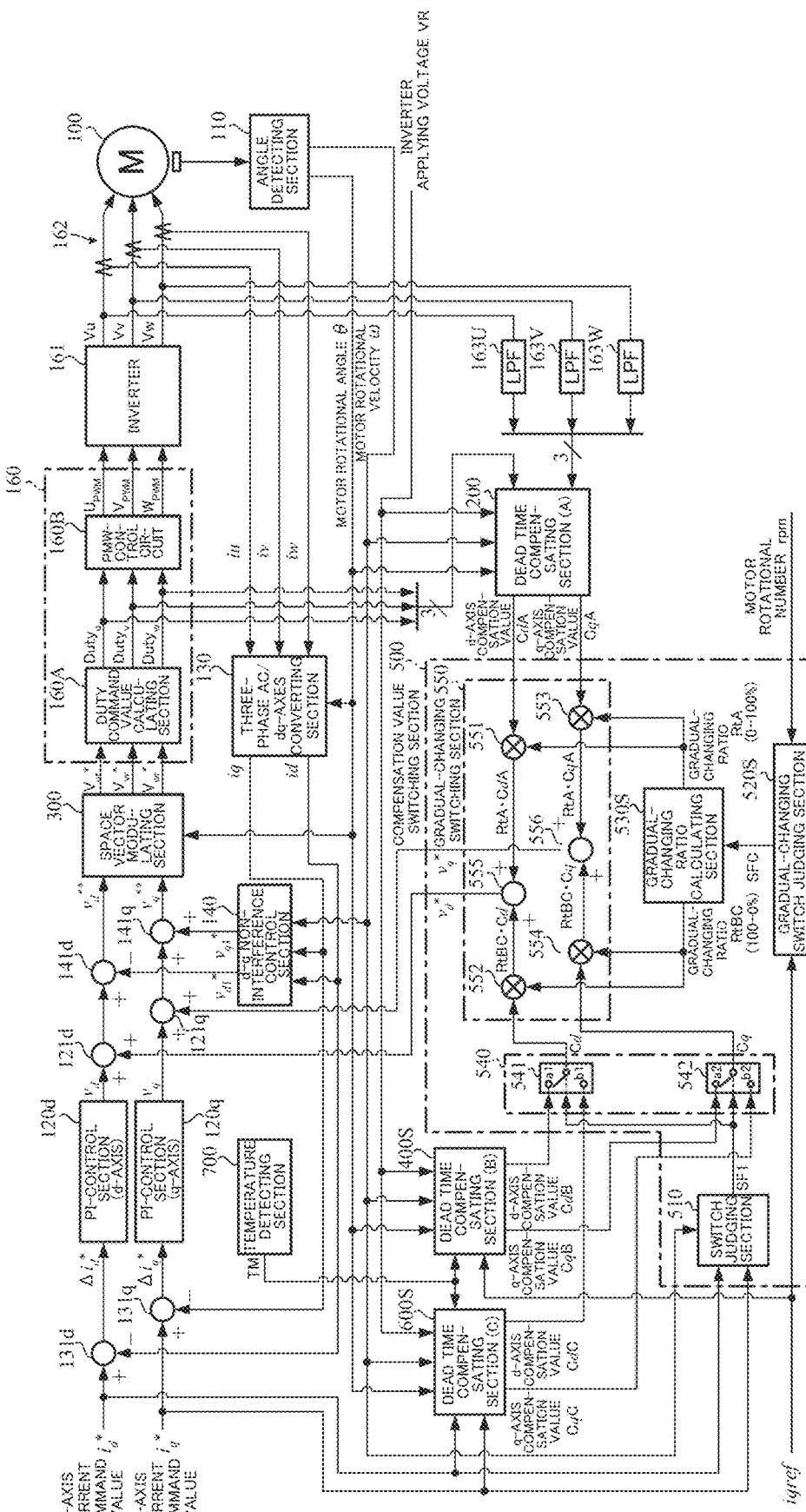
FIG. 43 is a block diagram showing a configuration example (the second embodiment) of the present invention.

Next, the second embodiment of the present invention will be described with reference to FIG. 43. FIG. 43 is corresponding to FIG. 5, the same reference numerals are assigned to the same elements and the detailed explanation is omitted.

In the second embodiment, a temperature detecting section 700 which detects the temperature of the power device of the control unit (the ECU), the temperature of the inverter or the temperature near the inverter by the known method is disposed. The dead time compensating section (B) 400 and the dead time compensating section (C) 600 are replaced with the dead time compensating section (B) 400S and the dead time compensating section (C) 600S, respectively. The temperature TM detected at the temperature detecting section 700 is inputted into the dead time compensating section (B) 400S and the dead time compensating section (C) 600S. The gradual-changing switch judging section 520 and the gradual-changing ratio calculating section 530 of the first embodiment by which the gradual-changing section is constituted, are replaced with the gradual-changing switch judging section 520S and the gradual-changing ratio calculating section 530S, respectively. The motor rotational number rpm is inputted into the gradual-changing switch judging section 520S, and can easily be calculated by the motor rotational velocity co in an internal calculation.

Figure 44:
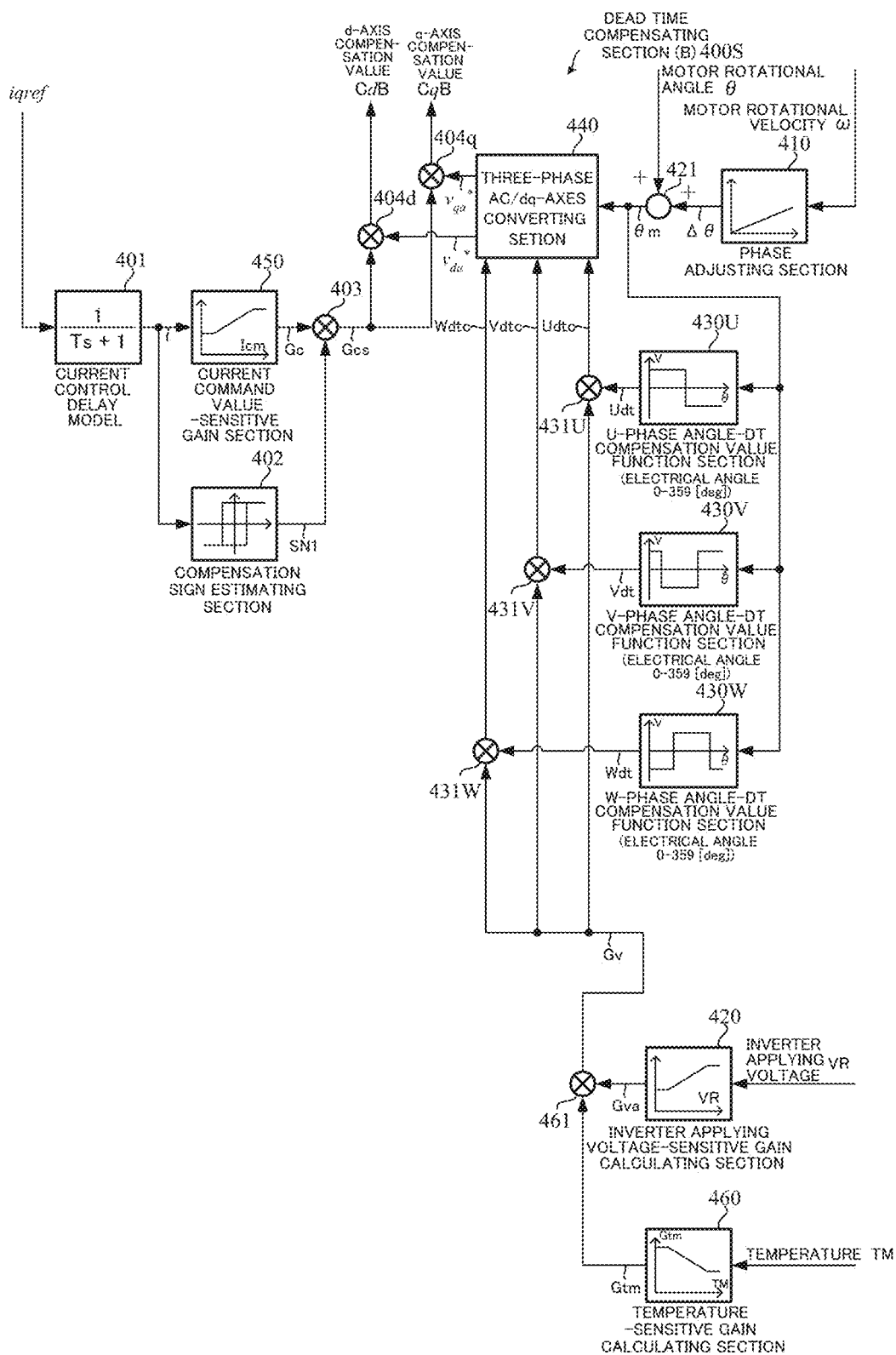
FIG. 44 is a block diagram showing a configuration example (the second example) of a dead time compensating section (B)
Figure 45:
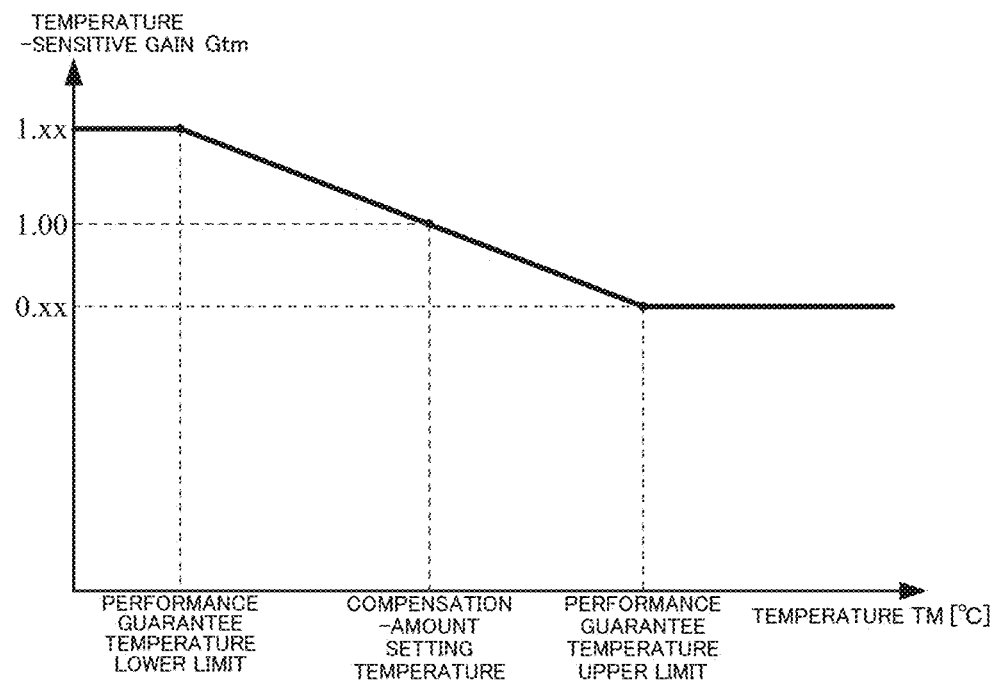
FIG. 45 is a characteristic diagram showing a characteristic example of a temperature-sensitive gain calculating section.
Figure 46:
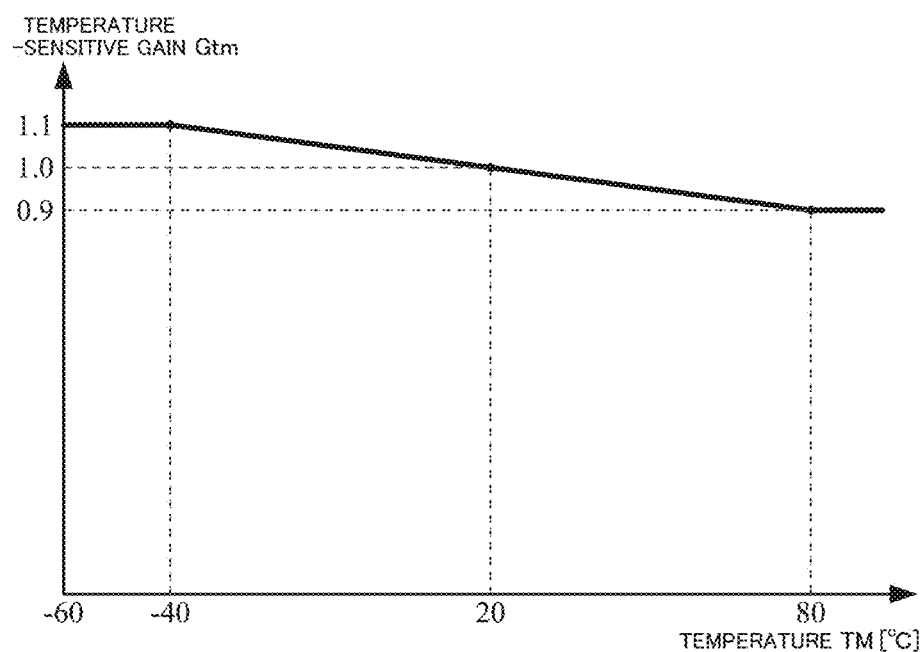
FIG. 46 is a characteristic diagram showing a characteristic example of the temperature-sensitive gain calculating section.

The configuration example (the second example) of the dead time compensating section (B) 400S is shown in FIG. 44, the temperature TM from the temperature detecting section 700 is inputted into a temperature-sensitive gain calculating section 460 and the calculated temperature-sensitive gain Gtm is inputted into the multiplying section 461. As shown in FIG. 45, the temperature-sensitive gain calculating section 460 calculates the temperature-sensitive gain Gtm at the three points that are a compensation-amount setting temperature, a performance guarantee temperature upper limit and a performance guarantee temperature lower limit. Setting the value of the compensation-amount setting temperature as a reference value "1.00", the ratio to the performance guarantee temperature upper limit and the ratio to the performance guarantee temperature lower limit are respectively calculated, and the temperature-sensitive gain Gtm is obtained. The ratio among the three points is generated by linear interpolation calculation or the table to the temperature TM. The limits to the performance guarantee temperature upper limit and the performance guarantee temperature lower limit may be set. In a case that the temperature characteristic of the control unit (the inverter) is complicated, the contact points may increase and the curve interpolation table may be used. In a case that the characteristic example of the temperature-sensitive gain Gtm that the compensation-amount setting temperature is set to "+20" degrees Celsius, the performance guarantee temperature lower limit is set to "−40" degrees Celsius, the performance guarantee temperature upper limit is set to "+80" degrees Celsius, the required gain at "−40" degrees Celsius increases 10% to the gain at "+20" degrees Celsius and the required gain at "+80" degrees Celsius decreases 10% to the gain at "+20" degrees Celsius, is set, the characteristic table of the temperature-sensitive gain Gtm is shown in FIG. 46.

The temperature-sensitive gain Gtm from the temperature-sensitive gain calculating section 460 is inputted into the multiplying section 461 and is multiplied with the inverter applying voltage-sensitive gain Gva from the inverter applying voltage-sensitive gain calculating section 420 and the voltage-sensitive gain $G_v$ which is a multiplied result is inputted into the multiplying sections 431U, 431V and 431W. The following operations of the compensation value calculation which are the same as those of the first embodiment are performed.

Figure 47:
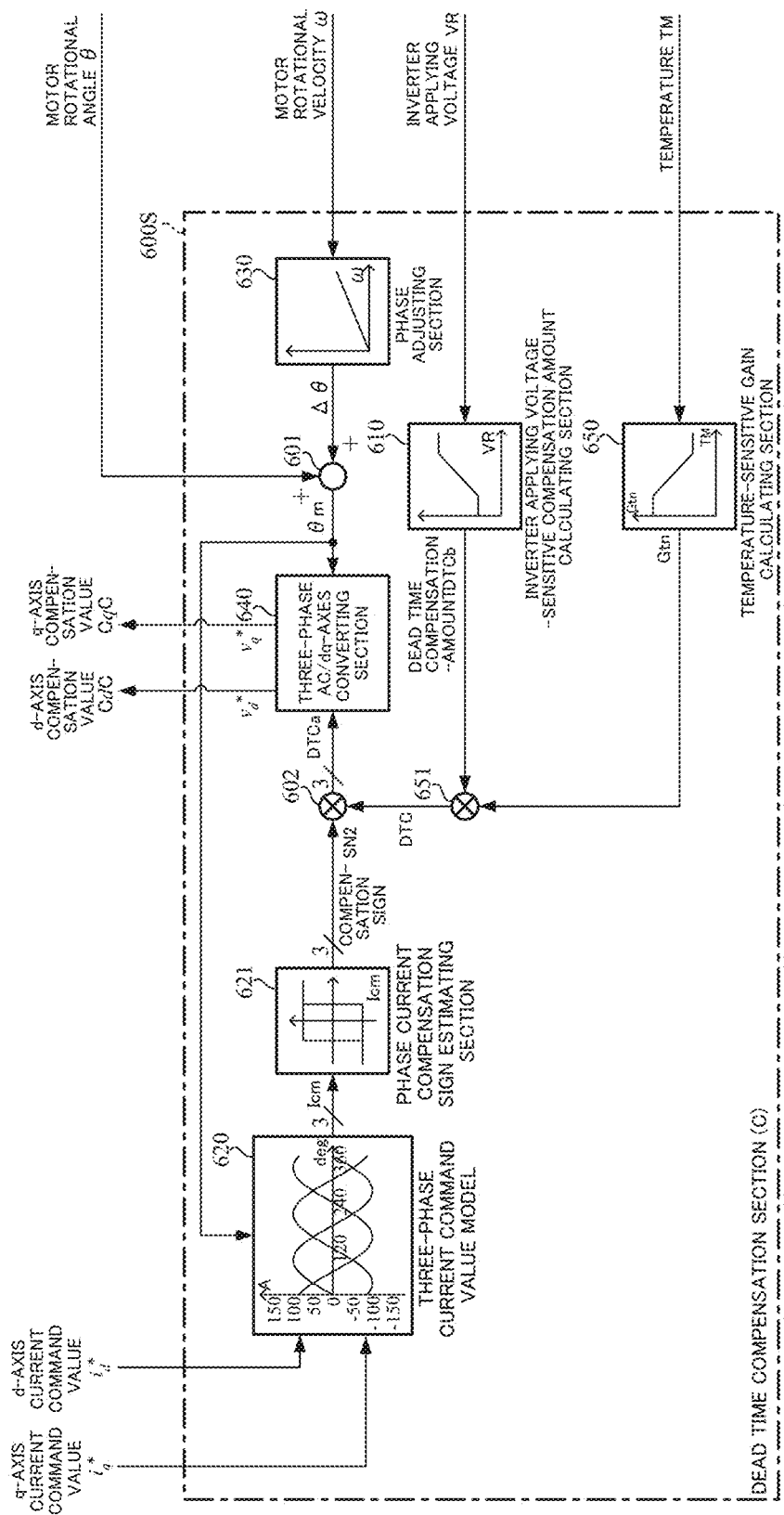
FIG. 47 is a block diagram showing a configuration example (the second example) of a dead time compensating section (C)
Figure 48:
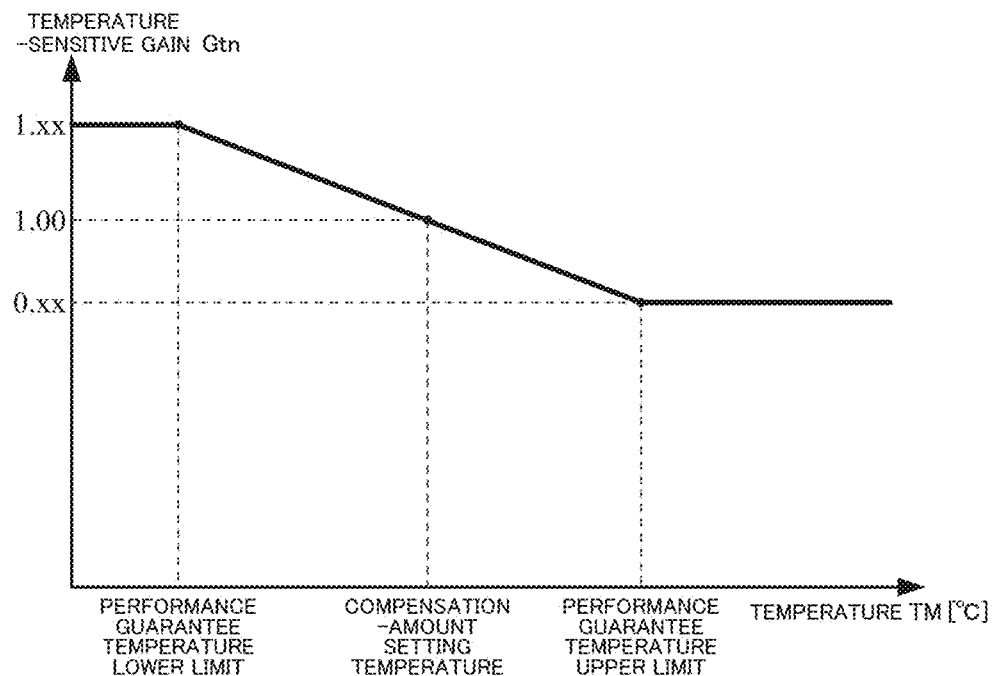
FIG. 48 is a characteristic diagram showing a characteristic example of the temperature-sensitive gain calculating section.
Figure 49:
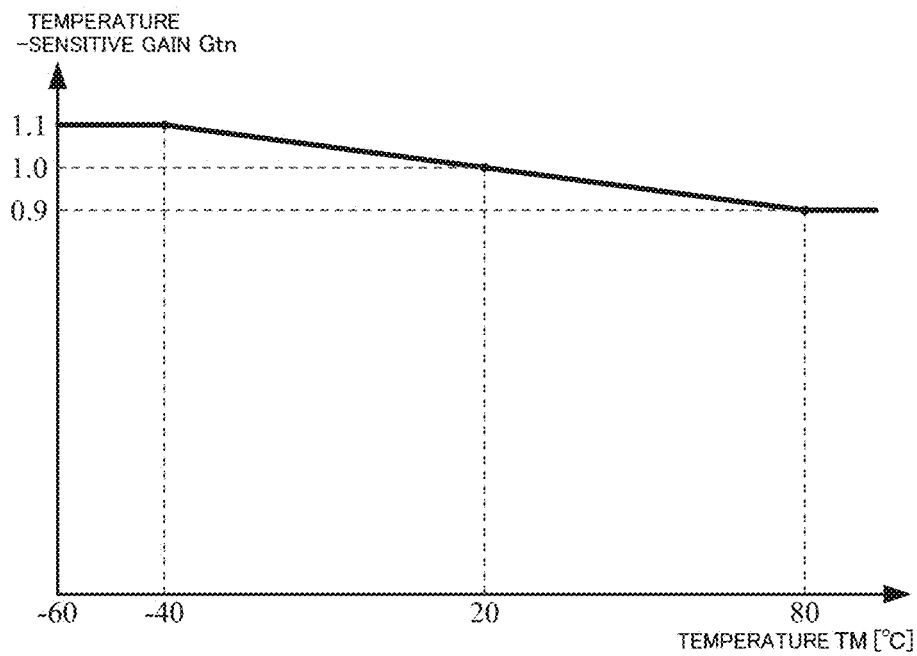
FIG. 49 is a characteristic diagram showing a characteristic example of the temperature-sensitive gain calculating section.

FIG. 47 shows the configuration example (the second example) of the dead time compensating section (C) 600S, the temperature TM from the temperature detecting section 700 is inputted into the temperature-sensitive gain calculating section 650 and the calculated temperature-sensitive gain Gtn is inputted into the multiplying section 651. The characteristic of the temperature-sensitive gain calculating section 650 is almost the same as that of the temperature-sensitive gain calculating section 460, is shown by the characteristic of FIG. 48 and the characteristic table of FIG. 49.

The temperature-sensitive gain Gtn from the temperature-sensitive gain calculating section 650 is inputted into the multiplying section 651 and is multiplied with the dead time compensation amount DTCb from the inverter applying voltage-sensitive gain calculating 610 and the dead time compensation amount DTC which is a multiplied result is inputted into the multiplying section 602. The following operations of the compensation value calculation which are the same as those of the first embodiment are performed.

Figure 50:
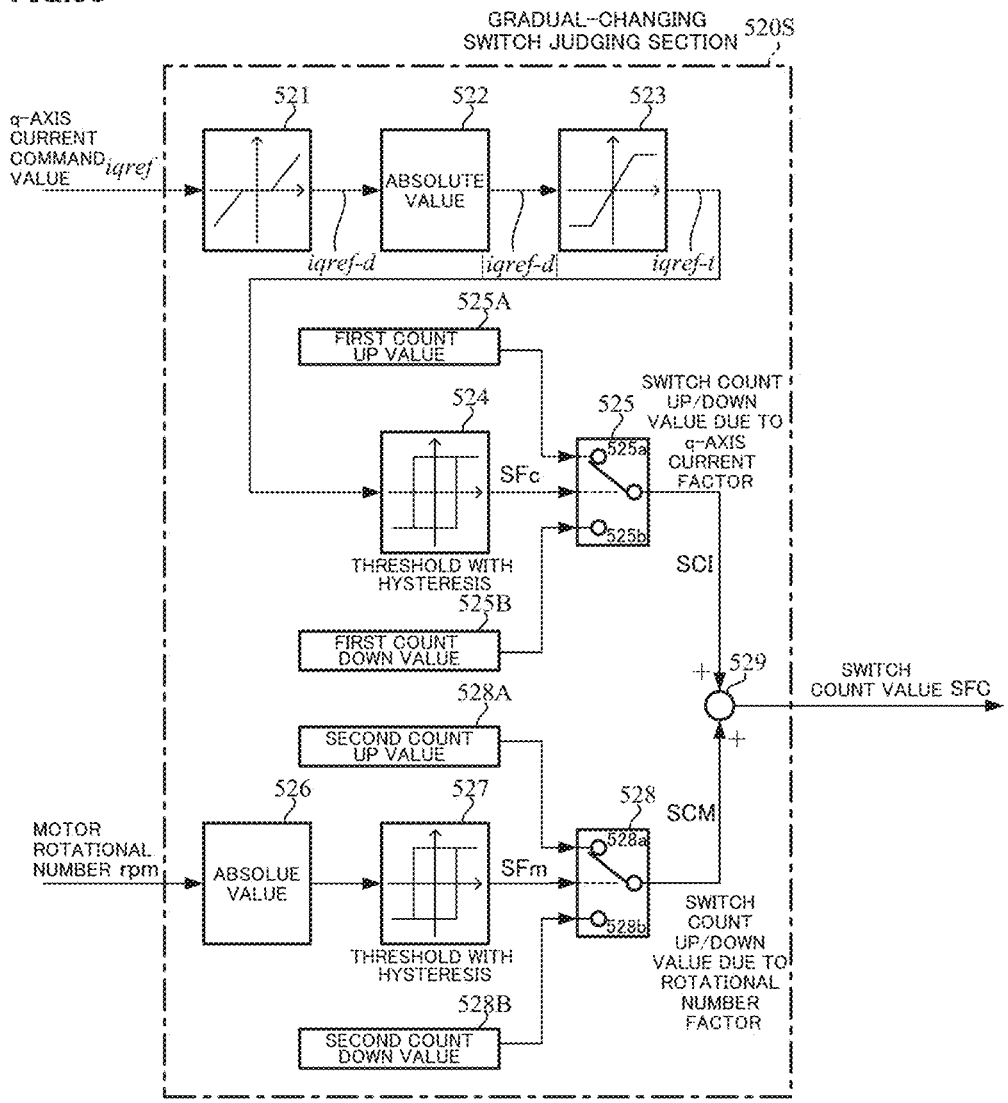
FIG. 50 is a block diagram showing a configuration example of the gradual-changing switch judging section (the second example)

The configuration example (the second example) of the gradual-changing switch judging section 520S is shown in FIG. 50 corresponding to FIG. 26 which shows the first example. The q-axis current command value iqref and the motor rotational number rpm are inputted into the gradual-changing switch judging section 520S of the second example, and the gradual-changing switch judging section 520S is divided into the system of the q-axis current command value iqref and the system of the motor rotational number rpm. In the system of the q-axis current command value iqref, as well as FIG. 26, the q-axis current command value iqref is processed at the dead band section 521, the absolute value section 522 and the limiter 523, the steering assist command value iqref-t from the limiter 523 is inputted into the threshold section 524 having the hysteresis characteristic for stabilizing the output, and the threshold section 524 outputs the UP/DOWN judgment flag SFc based on the magnitude relationship to the predetermined threshold. The UP/DOWN judgment flag SFc is inputted into the switch section 525, and switches to the COUNT-UP value 525A which is inputted into the contact point 525a or the COUNT-DOWN value 525B which is inputted into the contact point 525b. The switch section 525 outputs the switch count UP/DOWN value SCI due to the q-axis current factor. In the system of the motor rotational number rpm, the absolute value |rpm| of the motor rotational number rpm is calculated at the absolute section 526 and is inputted into the threshold section 527 having the hysteresis characteristic for stabilizing the output, and the threshold section 527 outputs the UP/DOWN judgment flag SFm based on the magnitude relationship to the predetermined threshold. The UP/DOWN judgment flag SFm is inputted into the switch section 528, and switches to the COUNT-UP value 528A which is inputted into the contact point 528a or the COUNT-DOWN value 528B which is inputted into the contact point 528b. The switch section 528 outputs the switch count UP/DOWN value SCM due to the rotational number factor. The switch count UP/DOWN value SCI and the switch count UP/DOWN value SCM are added at the adding section 529, and the switch count value SFC is outputted from the adding section 529 and is inputted into the gradual-changing ratio calculating section 530S.

Figure 51:
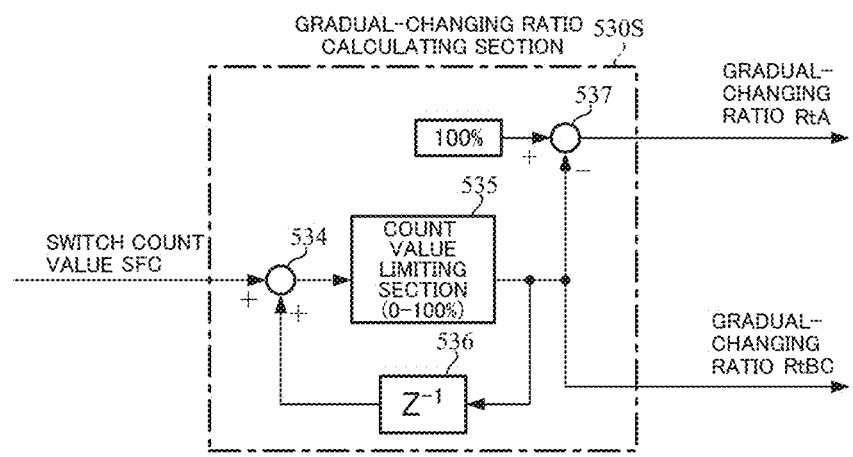
FIG. 51 is a block diagram showing a configuration example of the gradual-changing ratio calculating section (the second example)

FIG. 51 shows a configuration example of the gradual-changing ratio calculating section 530S. The UP/DOWN judgment flag SF2 is inputted into the adding section 534 and is added to the previous value of the gradual-changing ratio RtBC from the holding unit ($Z^{-1}$) 536, the maximum value of the added value is limited at the counting value limiting section (0% to 100%) 535, and the limited added value is outputted as the gradual-changing ratio RtBC (%), is subtraction-inputted into subtraction-inputted into the subtracting section 537 and is inputted into the adding section 534 via the holding unit ($Z^{-1}$) 536. The gradual-changing ratio RtBC is inputted into the subtracting section 537, and the subtracting section 537 outputs the gradual-changing ratio RtA (%) obtained by subtracting the gradual-changing ratio RtBC from the fixed value 100%.

The operation examples of the second embodiment are the same as those of the first embodiment in FIG. 29 except for a part of the temperature correction. Namely, the temperature detecting section 700 detects the temperature of the inverter or the like, the temperature TM is inputted into the dead time compensating section (B) 400S and the dead time compensating section (C) 600S, and the temperature-corrected compensation values (B) and (C) are outputted (Steps S12 and S13).

The effects of the second embodiment will be described by using the validation results in the bench test apparatus that the actual vehicle is simulated as follows.

Figure 53A:
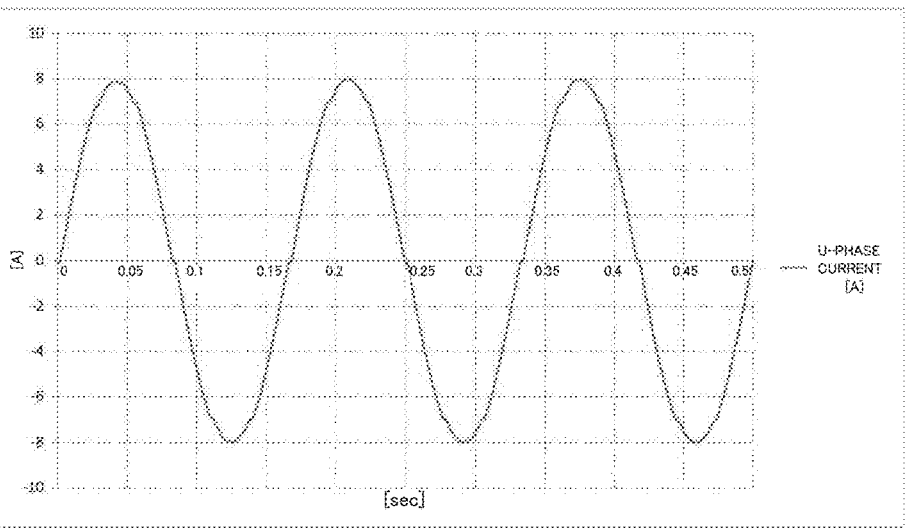
FIGS. 53A, 53B and 53C are waveform charts showing current waveform examples in a case that the temperature compensation is not performed.
Figure 53B:
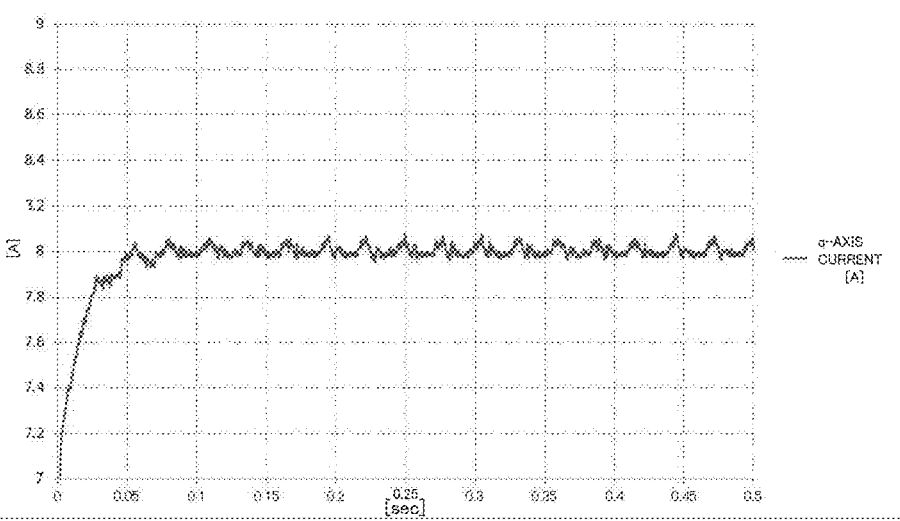
Figure 53C:
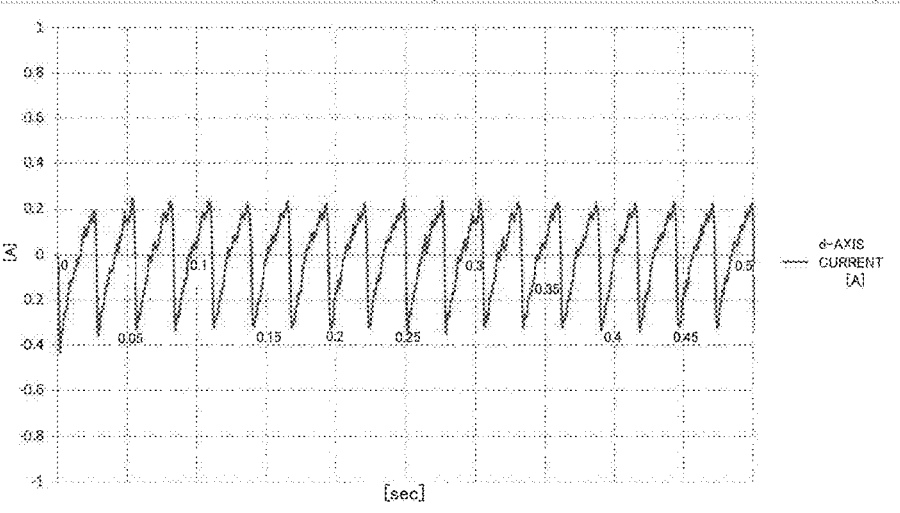
Figure 54A:
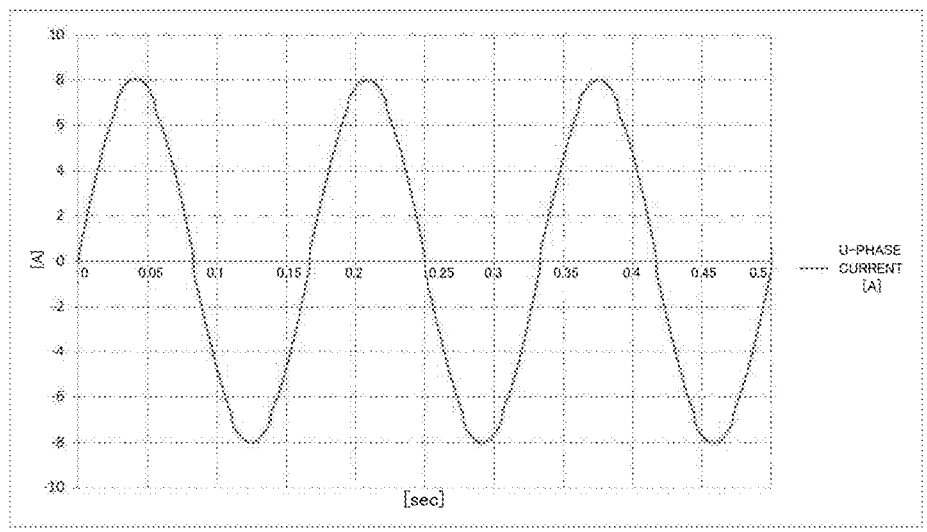
FIGS. 54A, 54B and 54C are waveform charts showing current waveform examples in a case that the temperature compensation is not performed.
Figure 54B:
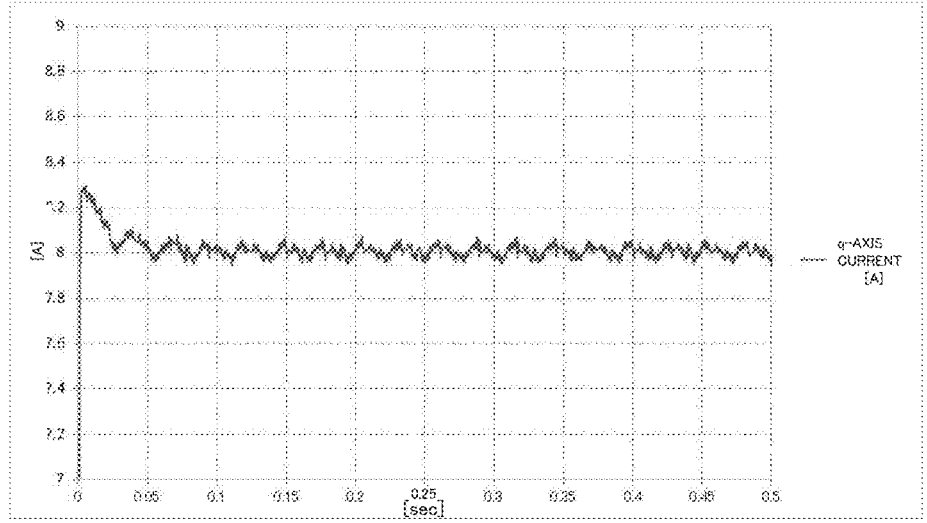
Figure 54C:
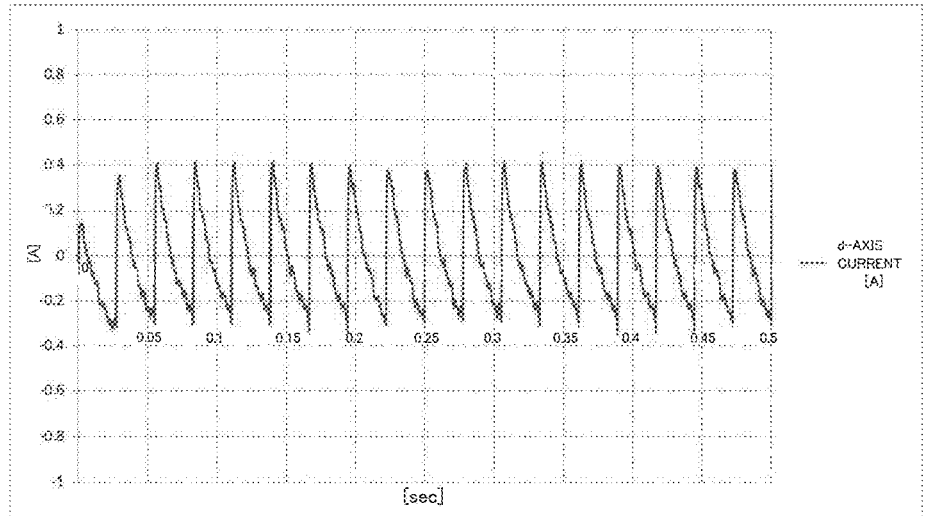

FIGS. 52A, 52B and 52C are the results in a case that the temperature is +20 degrees Celsius and the temperature correction is not performed. FIG. 52A shows the U-phase current waveform, FIG. 52B shows the q-axis current waveform and FIG. 52C shows the d-axis current waveform. As shown in FIGS. 52A, 52B and 52C, since the compensation amount is appropriate in a case that the temperature condition is "+20" degrees Celsius, the distortion of the current waveforms due to the dead time is not almost existed. FIGS. 53A, 53B and 53C are the results in a case that the temperature is "−40" degrees Celsius and the temperature correction is not performed. FIG. 53A shows the U-phase current waveform, FIG. 53B shows the q-axis current waveform and FIG. 53C shows the d-axis current waveform. As shown in FIGS. 53A, 53B and 53C, since the compensation amount is inadequate in a case that the temperature condition is "−40" degrees Celsius, the U-phase current has the recess-form distortion near "0" [A], and the wave-form distortion in the q-axis current and the sawtooth-form distortion in the d-axis current are occurred. FIGS. 54A, 54B and 54C are the results in a case that the temperature is "+80" degrees Celsius and the temperature correction is not performed. FIG. 54A shows the U-phase current waveform, FIG. 54B shows the q-axis current waveform and FIG. 54C shows the d-axis current waveform. As shown in FIGS. 54A, 54B and 54C, since the compensation amount is overcompensated, the U-phase current has the projection-form distortion near "0" [A], and the wave-form distortion in the q-axis current and the sawtooth-form distortion in the d-axis current are occurred.

In contrast with the above results in a case that the temperature compensation is not performed, FIGS. 55A to 57C show the validation results in a case that the temperature correction of the second embodiment is performed.

Figure 55A:
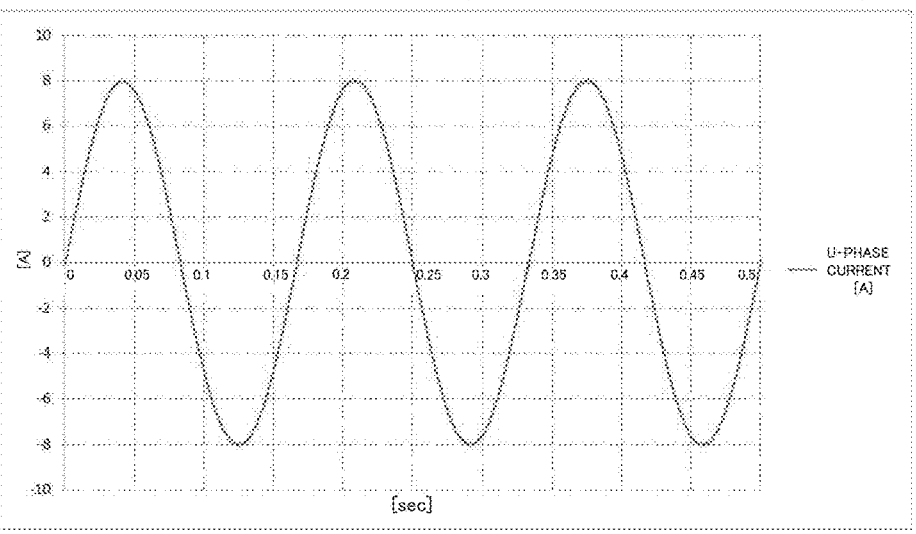
FIGS. 55A, 55B and 55C are waveform charts showing an effect of the present invention (the second embodiment)
Figure 55B:
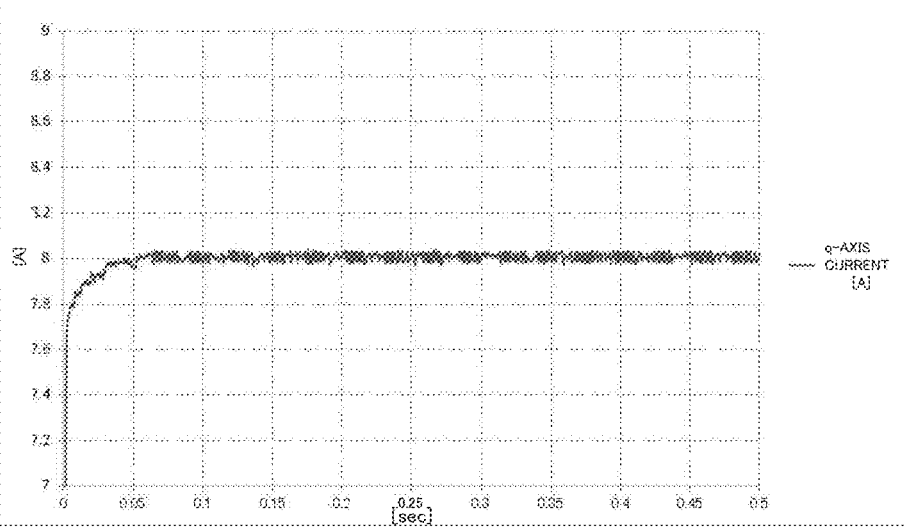
Figure 55C:
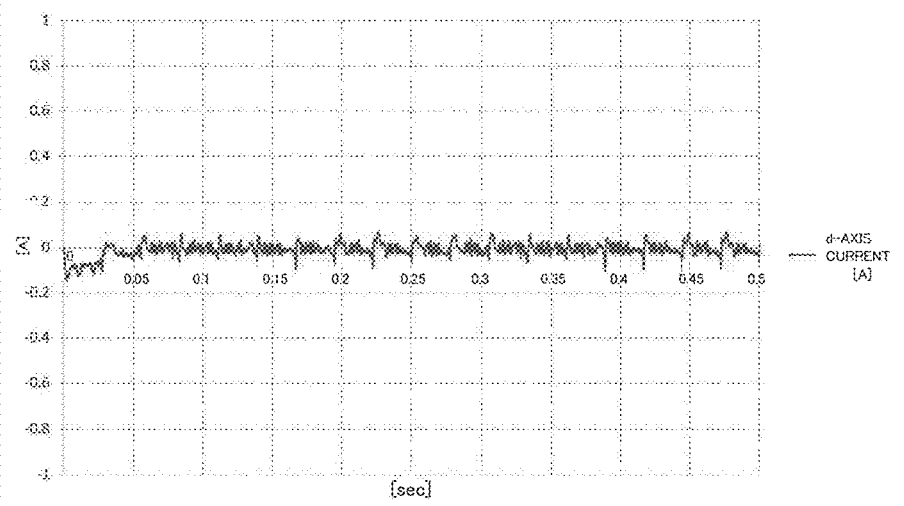
Figure 56A:
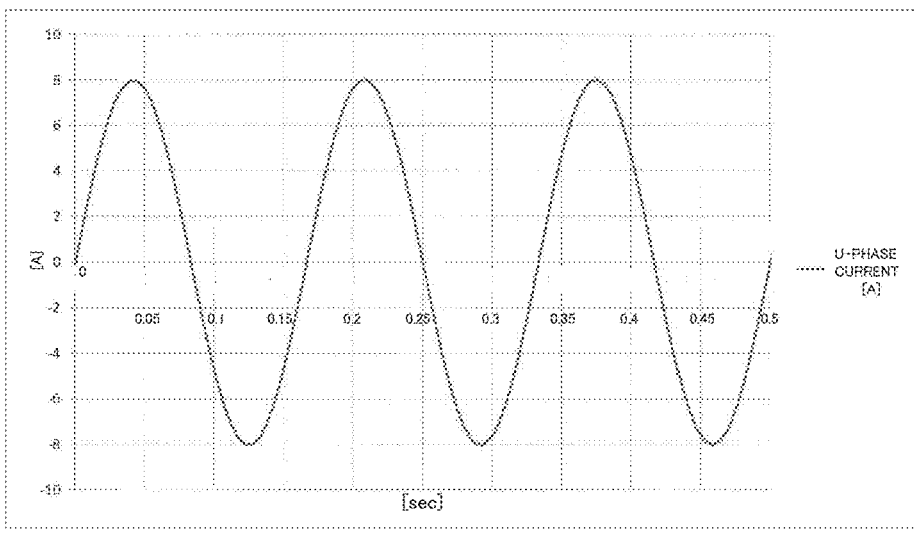
FIGS. 56A, 56B and 56C are waveform charts showing an effect of the present invention (the second embodiment)
Figure 56B:
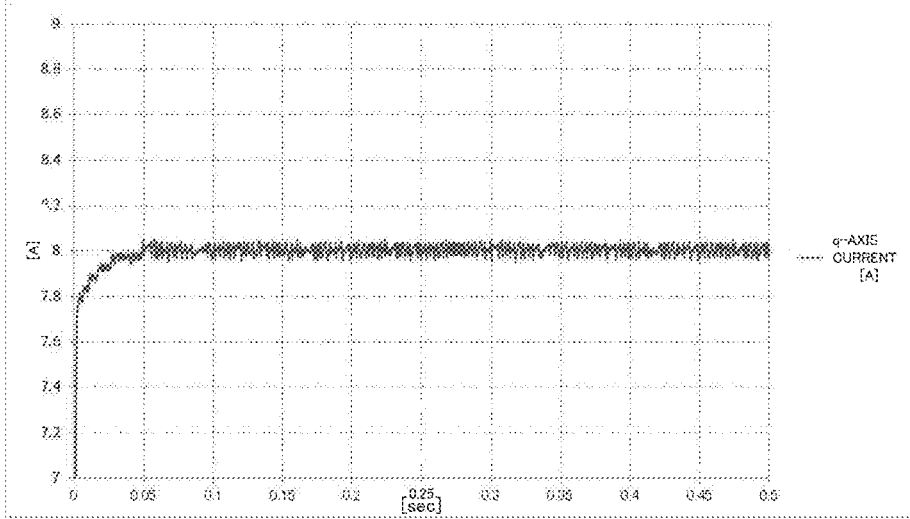
Figure 56C:
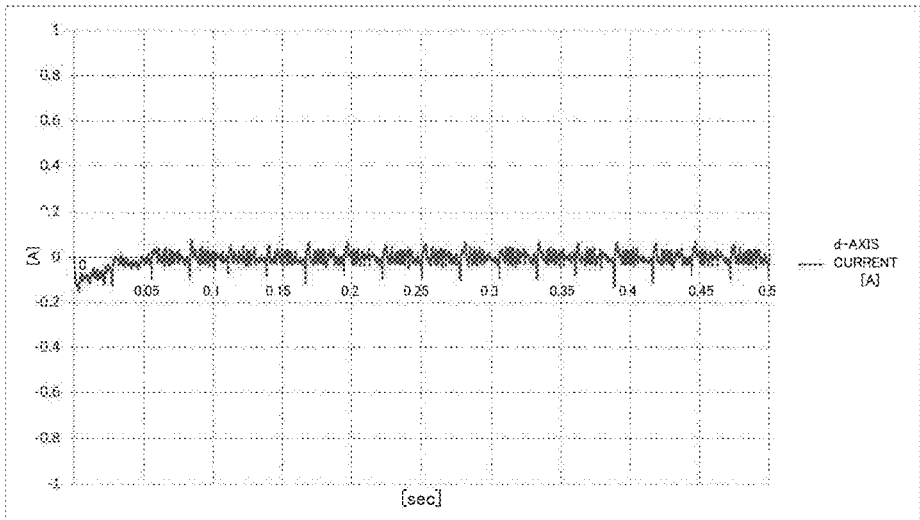
Figure 57A:
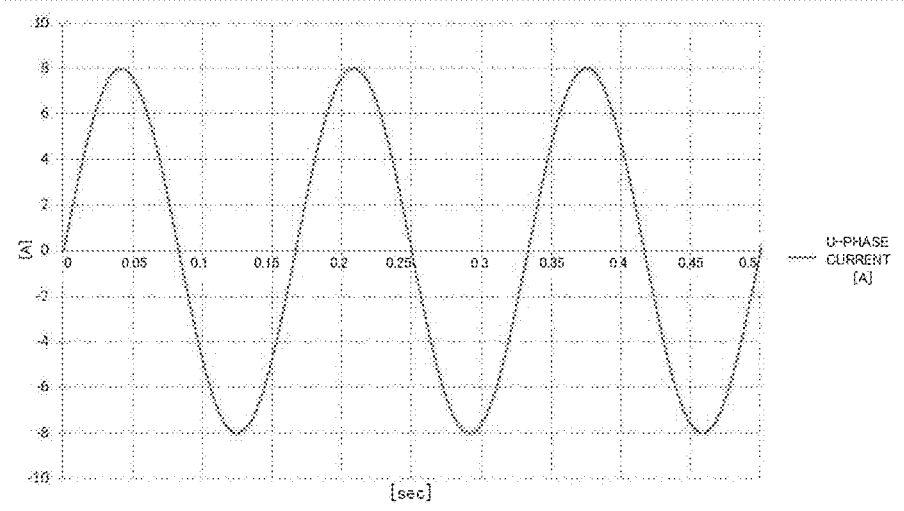
FIGS. 57A, 57B and 57C are waveform charts showing an effect of the present invention (the second embodiment).
Figure 57B:
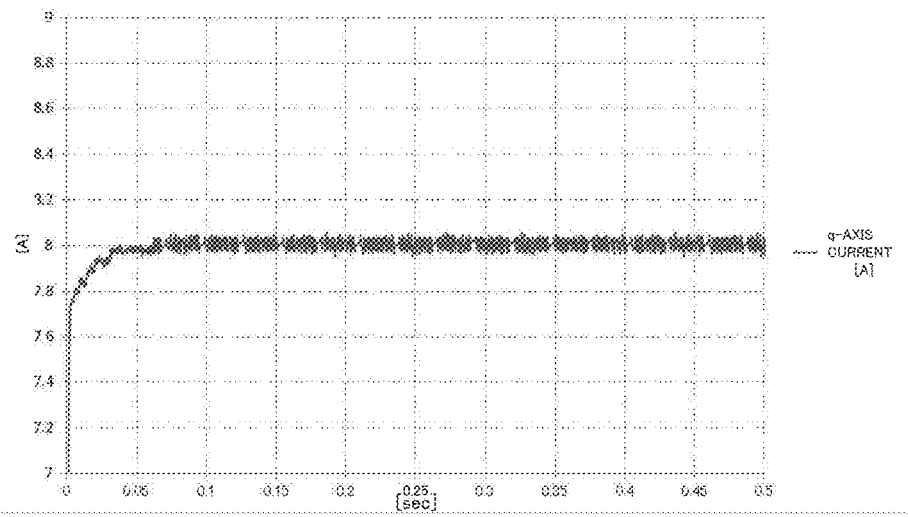
Figure 57C:
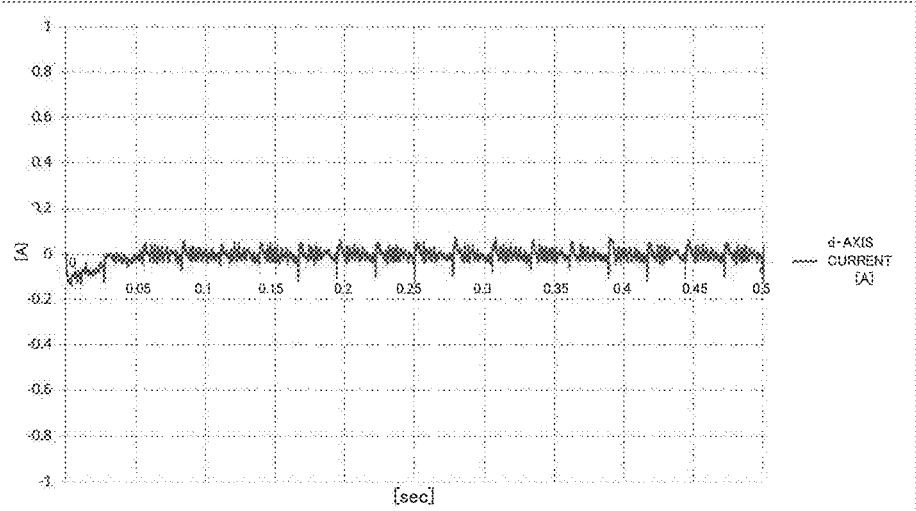

FIGS. 55A, 55B and 55C are the results in a case that the temperature is "+20" degrees Celsius and the temperature correction is performed. FIG. 55A shows the U-phase current waveform, FIG. 55B shows the q-axis current waveform and FIG. 55C shows the d-axis current waveform. As shown in FIGS. 55A, 55B and 55C, since the temperature correction is adapted and the compensation amount is corrected depending on the temperature, in a case that the temperature condition is "+20" degrees Celsius, the distortion of the waveforms due to the dead time is not almost existed as well as a case that the temperature correction is not performed. That is, contradiction against the temperature correction adaptation is not existed. FIGS. 56A, 56B and 56C are the results in a case that the temperature is "−40" degrees Celsius and the temperature correction is performed. FIG. 56A shows the U-phase current waveform, FIG. 56B shows the q-axis current waveform and FIG. 56C shows the d-axis current waveform. As shown in FIGS. 56A, 56B and 56C, since the temperature correction is adapted and the compensation amount is corrected depending on the temperature, in a case that the temperature is "−40" degrees Celsius, it can be confirmed that the waveform distortion of the U-phase current, the d-axis current and the q-axis current is improved and the torque ripple is also improved (the ripple is reduced in the d-axis current and the q-axis current and the phase currents are almost the sinusoidal waveform). FIGS. 57A, 57B and 57C are the results in a case that the temperature is "+80" degrees Celsius and the temperature correction is performed. FIG. 57A shows the U-phase current waveform, FIG. 57B shows the q-axis current waveform and FIG. 57C shows the d-axis current waveform. As shown in FIGS. 57A, 57B and 57C, since the temperature correction is adapted and the compensation amount is corrected depending on the temperature, in a case that the temperature is "+80" degrees Celsius, it can be confirmed that the waveform distortion of the U-phase current, the d-axis current and the q-axis current is improved and the torque ripple is also improved (the ripple is reduced in the d-axis current and the q-axis current and the phase currents are almost the sinusoidal waveform).

EXPLANATION OF REFERENCE NUMERALS 1 handle
2 column shaft (steering shaft, handle shaft)
10 torque sensor
12 vehicle speed sensor
20, 100 motor
30 control unit (ECU)
31 steering assist command value calculating section
35 PI-control section
36, 160 PWM-control section
37, 161 inverter
110 angle detecting section
130, 260, 440, 640 three-phase AC/dq-axes converting section
140 d-q non-interference control section
200 dead time compensating section (A)
210 midpoint voltage estimating section
220 respective phase applying voltage calculating section
230 voltage detection delay model
250 compensation-amount limiting section
300 space vector modulating section
301 two-phase/three-phase converting section
302 third-harmonic superimposition section
400, 400S dead time compensating section (B)
401 current control delay model
410, 630 phase adjusting section
460, 650 temperature-sensitive gain calculating section
500 compensation value switching section
510 switch judging section
520, 520S gradual-changing switch judging section
530, 530S gradual-changing ratio calculating section 540 conditional branch section
550 gradual-changing switching section
600, 600S dead time compensating section (C)
620 three-phase current command value model
621 phase current compensation sign estimating section
700 temperature detecting section

The invention claimed is:

1. An electric power steering apparatus of a vector control system that calculates dq-axis steering assist command values based on at least a steering torque, calculates dq-axis current command values from said dq-axis steering assist command values, converts dq-axis voltage command values calculated from said dq-axis current command values into duty command values of three phases, drives and controls a three-phase brushless motor by an inverter of a pulse width modulation (PWM) control, and applies an assist torque to a steering system of a vehicle, comprising:
 a first compensation function to perform a dead time compensation "A" based on respective phase motor terminal voltages and said duty command values;
 a second compensation function to perform a dead time compensation "B" based on said dq-axis steering assist command values; and
 a third compensation function to perform a dead time compensation "C" based on said dq-axis current command values,
 wherein switches of said first compensation function, said second compensation function and said third compensation function are performed by using a conditional branch due to software and a gradual-changing switch,
 wherein dq-axis dead time compensation values are calculated, and
 wherein said dq-axis voltage command values are compensated by said dq-axis dead time compensation values.

2. The electric power steering apparatus according to claim 1, wherein said gradual-changing switch is used in a case that a switch difference of a compensation amount in a switching time is small and said conditional branch is used in a case that a quickness of switch timing is needed.

3. The electric power steering apparatus according to claim 1,
 wherein a motor rotational angle, a motor rotational velocity and an inverter applying voltage are further used in calculations of said first compensation function, said second compensation function and said third compensation function.

4. The electric power steering apparatus according to claim 1, further comprising:
 a temperature detecting section to detect a temperature of said inverter or a temperature near said inverter,
 wherein said temperature detecting section performs dead time corrections of said dead time compensation "B" and said dead time compensation "C" based on said temperature.

5. An electric power steering apparatus of a vector control system that calculates dq-axis steering assist command values based on at least a steering torque, calculates dq-axis current command values from said dq-axis steering assist command values, converts dq-axis voltage command values calculated from said dq-axis current command values into duty command values of three phases, drives and controls a three-phase brushless motor by an inverter of a pulse width modulation (PWM) control, and applies an assist torque to a steering system of a vehicle, comprising:
 a dead time compensating section "A" to calculate a compensation value "CA" based on respective phase motor terminal voltages, said duty command values, a motor rotational angle, a motor rotational velocity and an inverter applying voltage;
 a dead time compensating section "B" to calculate a compensation value "CB" based on said dq-axis steering assist command values, said motor rotational angle, said motor rotational velocity and said inverter applying voltage;
 a dead time compensating section "C" to calculate a compensation value "CC" based on said dq-axis current command values, said motor rotational angle, said motor rotational velocity and said inverter applying voltage; and
 a compensation value switching section to input said compensation value "CA", said compensation value "CB", said compensation value "CC", and a switch condition which is determined by said dq-axis steering assist command values, said dq-axis current command values and said motor rotational velocity, to perform a switching of said compensation value "CA", said compensation value "CB" and said compensation value "CC" using a conditional branch due to software and a gradual-changing switch depending on a judged condition, and to calculate dq-axis dead time compensation values,
 wherein said dq-axis voltage command values are compensated by said dq-axis dead time compensation values.

6. The electric power steering apparatus according to claim 5,
 wherein said compensation value switching section comprises:
 a switch judging section to input said dq-axis current command values and said motor rotational velocity, perform a switch judgment and output a switch judgment flag;
 a conditional branch section to input said compensation values "CB" and "CC" and output dq-axis compensation values "CD" using said conditional branch based on said switch judgment flag;
 a gradual-changing section to judge said gradual-changing switch based on said dq-axis steering assist command values and calculate gradual-changing ratios; and
 a gradual-changing switching section to input said compensation value "CA" and said dq-axis compensation values "CD" and calculate and output said dq-axis dead time compensation values using said gradual-changing ratios.

7. The electric power steering apparatus according to claim 6,
 wherein said gradual-changing section comprises:
 a gradual-changing switch judging section to judge said gradual-changing switch based on said dq-axis steering assist command values and output an UP-DOWN judgment flag; and
 a gradual-changing ratio calculating section to calculate said gradual-changing ratios based on said UP-DOWN judgment flag.

8. The electric power steering apparatus according to claim 7,
 wherein said gradual-changing ratios are a gradual-changing ratio "RA" for said compensation value "CA" and a gradual-changing ratio "RBC" for said compensation values "CB" and "CC", and wherein said gradual-changing switching section comprises:
a first multiplying section to multiply said compensation value "CA" with said gradual-changing ratio "RA";
a second multiplying section to multiply said dq-axis command "CD" with said gradual-changing ratio "RBC"; and
an adding section to add with a multiplied result of said first multiplying section and a multiplied result of said second multiplying section and output said dq-axis dead time compensation values.

9. An electric power steering apparatus of a vector control system that calculates dq-axis steering assist command values based on at least a steering torque, calculates dq-axis current command values from said dq-axis steering assist command values, converts dq-axis voltage command values calculated from said dq-axis current command values into duty command values of three phases, drives and controls a three-phase brushless motor by an inverter of a pulse width modulation (PWM) control, and applies an assist torque to a steering system of a vehicle, comprising:
a temperature detecting section to detect a temperature of said inverter or a temperature near said inverter;
a dead time compensating section "A" to calculate a compensation value "CA" based on respective phase motor terminal voltages, said duty command values, a motor rotational angle, a motor rotational velocity and an inverter applying voltage;
a dead time compensating section "B" to calculate a compensation value "CB" based on said dq-axis steering assist command values, said motor rotational angle, said motor rotational velocity, said inverter applying voltage and said temperature;
a dead time compensating section "C" to calculate a compensation value "CC" based on said dq-axis current command values, said motor rotational angle, said motor rotational velocity, said inverter applying voltage and said temperature; and
a compensation value switching section to input said compensation value "CA", said temperature-corrected compensation value "CB", said temperature-corrected compensation value "CC", and a switch condition which is determined by said dq-axis steering assist command values, said dq-axis current command values and said motor rotational velocity, to perform a switching of said compensation value "CA", said compensation value "CB" and said compensation value "CC" using a conditional branch due to software and a gradual-changing switch based on said steering assist command values and a motor rotational number, and to calculate dq-axis dead time compensation values,
wherein said dq-axis voltage command values are compensated by temperature-corrected dq-axis dead time compensation values.

10. The electric power steering apparatus according to claim 9,
wherein said gradual-changing switch comprises:
a gradual-changing switch judging section to input said steering assist command value and said motor rotational number and output a switch counting value; and
a gradual-changing ratio calculating section to input said switch counting value and calculate a gradual-changing switch ratio.

11. The electric power steering apparatus according to claim 10,
wherein said gradual-changing switch judging section comprises:

a current factor section to output a q-axis current-factor switch COUNT-UP value or a q-axis current-factor switch COUNT-DOWN value based on said dq-axis steering assist command values;
a rotational number factor section to output a rotational number-factor switch COUNT-UP value or a rotational number-factor switch COUNT-DOWN value based on said motor rotational number; and
an adding section to output a switch counting value by adding with said q-axis current-factor switch COUNT-UP value or said q-axis current-factor switch COUNT-DOWN value and said rotational number-factor switch COUNT-UP value or said rotational number-factor switch COUNT-DOWN value.

12. The electric power steering apparatus according to claim 10,
wherein said gradual-changing ratio calculating section comprises:
a counting-value limiting section to input an added value which is added with said switch counting value and a previous value of a second gradual-changing ratio; and
a subtracting section to output a first gradual-changing ratio which is calculated by subtracting said second gradual-changing ratio from a fixed value 100%.

13. An electric power steering apparatus of a vector control system that calculates dq-axis steering assist command values based on at least a steering torque, calculates dq-axis current command values from said dq-axis steering assist command values, converts dq-axis voltage command values calculated from said dq-axis current command values into duty command values of three phases, drives and controls a three-phase brushless motor by an inverter of a pulse width modulation (PWM) control, and applies an assist torque to a steering system of a vehicle, comprising:
a first compensation function to perform a dead time compensation "A" based on respective phase motor terminal voltages and said duty command values;
a second compensation function to perform a dead time compensation "B" based on said dq-axis steering assist command values; and
a third compensation function to perform a dead time compensation "C" based on said dq-axis current command values,
wherein switches of said first compensation function, said second compensation function and said third compensation function are performed by using a conditional branch due to software and a gradual-changing switch based on said dq-axis steering assist command values and a motor rotational number,
wherein said gradual-changing switch is performed by a nonlinear function,
wherein dq-axis dead time compensation values after said conditional branch and said gradual-changing switch are performed are calculated, and
wherein said dq-axis voltage command values are compensated by said dq-axis dead time compensation values.

14. The electric power steering apparatus according to claim 13,
wherein said nonlinear function comprises a gradual-changing ratio characteristic conversion table having a nonlinear characteristic which is disposed at a subsequent stage of a counting-value limiting section after switching to a COUNT-UP value or a COUNT-DOWN value.

15. The electric power steering apparatus according to claim 13, wherein said nonlinear function comprises:
a COUNT-UP value calculation processing section which is sensitive to a motor rotational number and has a nonlinear characteristic; and
a COUNT-DOWN value calculation processing section which is sensitive to a motor rotational number and has a nonlinear characteristic, and
serves as an output switch between said COUNT-UP value calculation processing section and said COUNT-DOWN value calculation processing section.

16. The electric power steering apparatus according to claim 13, further comprising a temperature detecting section to detect a temperature of said inverter or a temperature near said inverter,
wherein said temperature detecting section corrects said second compensation function and said third compensation function based on said temperature.

* * * * *